United States Patent
Ulyanov et al.

(10) Patent No.: US 6,216,083 B1
(45) Date of Patent: Apr. 10, 2001

(54) SYSTEM FOR INTELLIGENT CONTROL OF AN ENGINE BASED ON SOFT COMPUTING

(75) Inventors: Sergei V. Ulyanov; Shigeki Hashimoto; Masashi Yamaguchi, all of Shizuoka (JP)

(73) Assignee: Yamaha Motor Co., Ltd., Shizuoka (JP)

(*) Notice: Subject to any disclaimer, the term of this patent is extended or adjusted under 35 U.S.C. 154(b) by 0 days.

(21) Appl. No.: 09/176,987

(22) Filed: Oct. 22, 1998

(51) Int. Cl.[7] ............................. F02D 41/14; G06F 19/00
(52) U.S. Cl. ............................................. 701/106; 701/115
(58) Field of Search .................................... 701/106, 109, 701/115; 123/674, 675

(56) References Cited

U.S. PATENT DOCUMENTS 5,361,628 * 11/1994 Marko et al. .......................... 73/116
5,539,638 * 7/1996 Keeler et al. ........................ 123/672

* cited by examiner

Primary Examiner—Andrew M. Dolinar
(74) Attorney, Agent, or Firm—Knobbe, Martens, Olson & Bear, LLP.

(57) ABSTRACT

A reduced control system suitable for control of an engine as a nonlinear plant is described. The reduced control system is configured to use a reduced sensor set for controlling the plant without significant loss of control quality (accuracy) as compared to an optimal control system with an optimum sensor set. The control system calculates the information content provided by the reduced sensor set as compared to the information content provided by the optimum set. The control system also calculates the difference between the entropy production rate of the plant and the entropy production rate of the controller. A genetic optimizer is used to tune a fuzzy neural network in the reduced controller. A fitness function for the genetic optimizer provides optimum control accuracy in the reduced control system by minimizing the difference in entropy production while maximizing the sensor information content.

14 Claims, 10 Drawing Sheets

SYSTEM FOR INTELLIGENT CONTROL OF AN ENGINE BASED ON SOFT COMPUTING

BACKGROUND OF THE INVENTION

1. Field of the Invention

The disclosed invention relates generally to engine control systems, and more particularly to electronic control systems for internal combustion engines.

2. Description of the Related Art

Feedback control systems are widely used to maintain the output of a dynamic system at a desired value in spite of external disturbance forces that would move the output away from the desired value. For example, a household furnace controlled by a thermostat is an example of a, feedback control system. The thermostat continuously measures the air temperature of the house, and when the temperature falls below a desired minimum temperature, the thermostat turns the furnace on. When the furnace has warmed the air above the desired minimum temperature, then the thermostat turns the furnace off. The thermostat-furnace system maintains the household temperature at a constant value in spite of external disturbances such as a drop in the outside air temperature. Similar types of feedback control are used in many applications.

A central component in a feedback control system is a controlled object, otherwise known as a process "plant," whose output variable is to be controlled. In the above example, the plant is; the house, the output variable is the air temperature of the house, and the disturbance is the flow of heat through the walls of the house. The plant is controlled by a control system. In the above example, the control system is the thermostat in combination with the furnace. The thermostat-furnace system uses simple on-off feedback control to maintain the temperature of the house. In many control environments, such as motor shaft position or motor speed control systems, simple on-off feedback control is insufficient. More advanced control systems rely on combinations of proportional feedback control, integral feedback control, and derivative feedback control.

The PID control system is a linear control system that is based on a dynamic model of the plant. In classical control systems, a linear dynamic model is obtained in the form of dynamic equations, usually ordinary differential equations. The plant is assumed to be relatively linear, time invariant, and stable. However, many real-world plants are time varying, highly nonlinear, and unstable. For example, the dynamic model may contain parameters (e.g., masses, inductances, aerodynamic coefficients, etc.) which are either poorly known or depend on a changing environment. If the parameter variation is small and the dynamic model is stable, then the PID controller may be sufficient. However, if the parameter variation is large, or if the dynamic model is unstable, then it is common to add adaptation or intelligent (AI) control to the PID control system.

AI control systems use an optimizer, typically a nonlinear optimizer, to program the operation of the PID controller and thereby improve the overall operation of the control system. The optimizers used in many AI control systems rely on a genetic algorithm. Using a set of inputs, and a fitness function, the genetic algorithm works in a manner similar to process of evolution to arrive at a solution which is, hopefully, optimal. The genetic algorithm generates sets of chromosomes (corresponding to possible solutions) and then sorts the chromosomes by evaluating each solution using the fitness function. The fitness function determines where each solution ranks on a fitness scale. Chromosomes which are more fit, are those chromosomes which correspond to solutions that rate high on the fitness scale. Chromosomes which are less fit, are those chromosomes which correspond to solutions that rate low on the fitness scale. Chromosomes that are more fit are kept (survive) and chromosomes that are less fit are discarded (die). New chromosomes are created to replace the discarded chromosomes. The new chromosomes are created by crossing pieces of existing chromosomes and by introducing mutations.

The PID controller has a linear transfer function and thus is based upon a linearized equation of motion for the plant. Prior art genetic algorithms used to program PID controllers typically use simple fitness functions and thus do not solve the problem of poor controllability typically seen in linearization models. As is the case with most optimizers, the success or failure of the optimization often ultimately depends on the selection of the performance (fitness) function.

Evaluating the motion characteristics of a nonlinear plant is often difficult, in part due to the lack of a general analysis method. Conventionally, when controlling a plant with nonlinear motion characteristics, it is common to find certain equilibrium points of the plant and the motion characteristics of the plant are linearized in a vicinity near an equilibrium point. Control is then based on evaluating the pseudo (linearized) motion characteristics near the equilibrium point. This. technique works poorly, if at all, for plants described by models that are unstable or dissipative.

SUMMARY OF THE INVENTION

The present invention solves these and other problems by providing a new AI control system that allows a reduced number of sensors to be used without a significant loss in control accuracy. The new AI control system is self-organizing and uses a fitness (performance) function that are based on the physical laws of minimum entropy and maximum sensor information. The self-organizing control system may be used to control complex plants described by nonlinear, unstable, dissipative models. The reduced control system is configured to use smart simulation techniques for controlling the plant despite the reduction in the number of sensor number without significant loss of control quality (accuracy) as compared to an optimal control system. In one embodiment, the reduced control system comprises a neural network that is trained by a genetic analyzer. The genetic analyzer uses a fitness function that maximizes information while minimizing entropy production.

In one embodiment, the reduced control system is applied to an internal combustion engine to provide control without the use of extra sensors, such as, for example, an oxygen sensor. The reduced control system develops a reduced control signal from a reduced sensor set. The reduced control system is trained by a genetic analyzer that uses a control signal developed by an optimized control system. The optimized control system provides an optimum control signal based on data obtained from temperature sensors, air-flow sensors, and an oxygen sensor. In an off-line learning mode, the optimum control signal is subtracted from a reduced control signal (developed by the reduced control system) and provided to an information calculator. The information calculator provides an information criteria to the genetic analyzer. Data from the reduced sensor set is also provided to an entropy model, which calculates a physical criteria based on entropy. The physical criteria is also provided to the genetic analyzer. The genetic analyzer uses both the information criteria and the physical criteria to develop a training signal for the reduced control system.

In one embodiment, a reduced control system is applied to a vehicle suspension to provide control of the suspension system using data from a reduced number of sensors. The reduced control system develops a reduced control signal from a reduced sensor set. The reduced control system is trained by a genetic analyzer that uses a control signal developed by an optimized control system. The optimized control system provides an optimum control signal based on data obtained from a plurality of angle and position sensors. In an off-line learning mode, the optimum control signal is subtracted from a reduced control signal (developed by the reduced control system) and provided to an information calculator. In one embodiment, the reduced control system uses a vertical accelerometer mounted near the center of the vehicle. The information calculator provides an information criteria to the genetic analyzer. Data from the reduced sensor set is also provided to an entropy model, which calculates a physical criteria based on entropy. The physical criteria is also provided to the genetic analyzer. The genetic analyzer uses both the information criteria and the physical criteria to develop a training signal for the reduced control system.

In one embodiment, the invention includes a method for controlling a nonlinear object (a plant) by obtaining an entropy production difference between a time differentiation ($dS_u/dt$) of the entropy of the plant and a time differentiation ($dS_c/dt$) of the entropy provided to the plant from a controller. A genetic algorithm that uses the entropy production difference as a fitness (performance) function evolves a control rule for a low-level controller, such as a PID controller. The nonlinear stability characteristics of the plant are evaluated using a Lyapunov function. The evolved control rule may be corrected using further evolutions using an information function that compares the information available from an optimum sensor system with the information available from a reduced sensor system. The genetic analyzer minimizes entropy and maximizes sensor information content.

In some embodiments, the control method may also include evolving a control rule relative to a variable of the controller by means of a genetic algorithm. The genetic algorithm uses a fitness function based on a difference between a time differentiation of the entropy of the plant ($dS_u/dt$) and a time differentiation ($dS_c/dt$) of the entropy provided to the plant. The variable may be corrected by using the evolved control rule.

In another embodiment, the invention comprises an AI control system adapted to control a nonlinear plant. The AI control system includes a simulator configured to use a thermodynamic model of a nonlinear equation of motion for the plant. The thermodynamic model is based on EL Lyapunov function (V), and the simulator uses the function V to analyze control for a state stability of the plant. The AI control system calculates an entropy production difference between a time differentiation of the entropy of said plant ($dS_u/dt$) and a time differentiation ($dS_c/dt$) of the entropy provided to the plant by a low-level controller that controls the plant. The entropy production difference is used by a genetic algorithm to obtain an adaptation function in which the entropy production difference is minimized. The genetic algorithm provides a teaching signal to a fuzzy logic classifier that determines a fuzzy rule by using a learning process. The fry logic controller is also configured to form a control rule that sets a control variable of the low-level controller.

In one embodiment, the low-level controller is a linear controller such as a PID controller. The learning processes may be implemented by a fuzzy neural network configured to form a look-up table for the fuzzy rule.

In yet another embodiment, the invention comprises a new physical measure of control quality based on minimum production entropy and using this measure for a fitness function of genetic algorithm in optimal control system design. This method provides a local entropy feedback loop in the control system. The entropy feedback loop provides for optimal control structure design by relating stability of the plant (using a Lyapunov function) and controllability of the plant (based on production entropy of the control system). The control system is applicable to all control systems, including, for example, control systems for mechanical systems, bio-mechanical systems, robotics, electromechanical systems, etc.

BRIEF DESCRIPTION OF THE DRAWINGS

The advantages and features of the disclosed invention will readily be appreciated by persons skilled in the art from the following detailed description when read in conjunction with the drawings listed below.

DETAILED DESCRIPTION OF THE PREFERRED EMBODIMENT

A feedback control system is commonly used to control an output variable of a process or plant in the face of some disturbance. Linear feedback control systems typically use combinations of proportional feedback control, integral feedback control, and derivative feedback control. Feedback that is the sum of proportional plus integral plus derivative feedback is often referred to as PID control. The Laplace transform of an output u(s) of a PID controller is given by:

$$u(s) = G(s)e(s) = \left[k_1 + \frac{k_2}{s} + k_3 s\right] e(s) \quad (1)$$

In the above equation, G(s) is the transfer function of the PID controller, e(s) is the controller input, u(s) is the controller output, $k_1$ is the coefficient for proportional feedback, $k_2$ is; the coefficient for integral feedback, and $k_3$ is the coefficient for derivative feedback. The coefficients $k_i$ may be represented by a coefficient vector K, where $K=[k_1, k_2, k_3]$. The vector K is commonly called a Coefficient Gain Schedule (CGS). The values of the coefficients K used in the linear PID control system are based on a dynamic model of the plant. When the plant is unstable, nonlinear, and/or time-variant, then the coefficients in K are often controlled by an AI control system.

Figure 1:
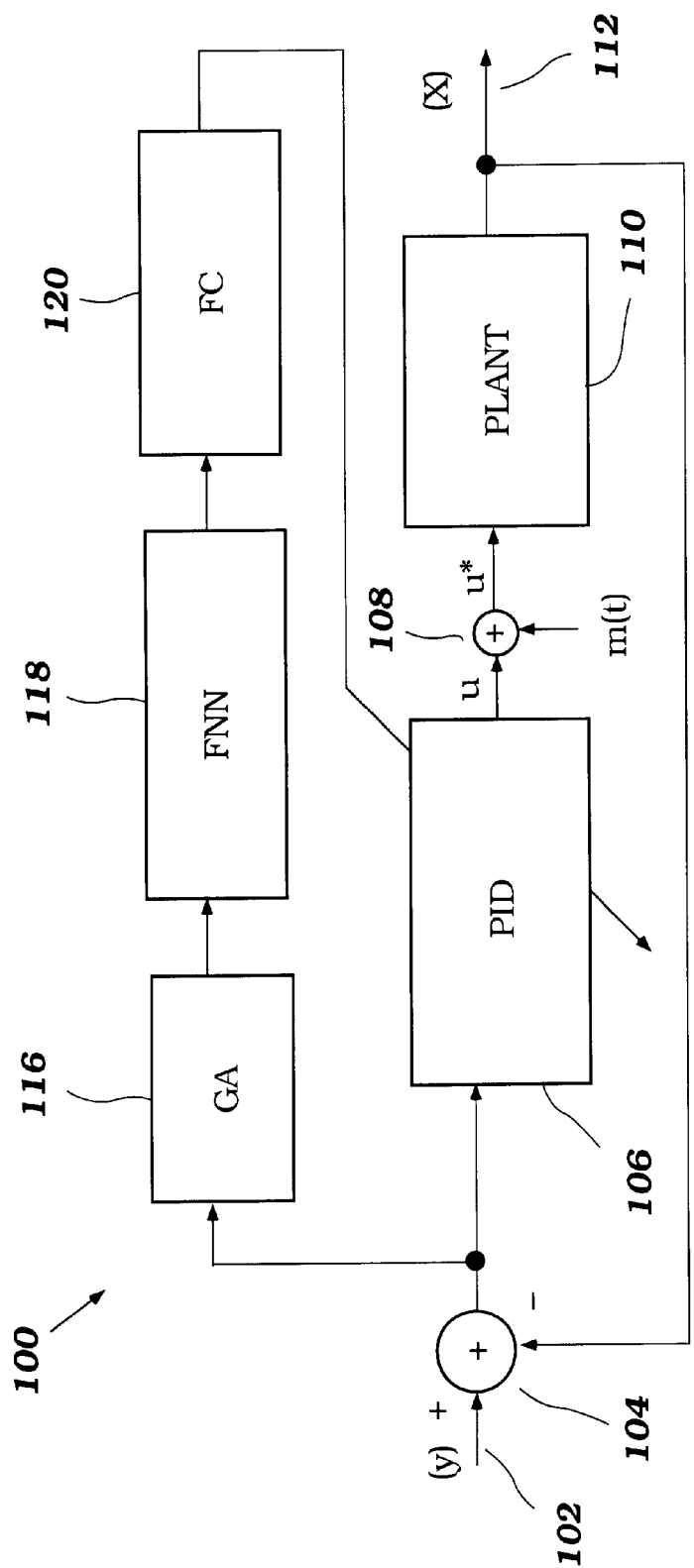
FIG. 1 is a block diagram showing an example of an AI control method in the prior art.

FIG. 1 shows a typical prior art AI control system 100. An input y(t) of the control system 100 is provided to a plus input of an adder 104 and an output x(t) of a plant 110 is provided to a minus input of the adder 104. An output of the adder 104 is provided as an error signal e(t) to an error signal input of a PID controller 106. An output u(t) of the PID controller 106 is provided to a first input of an adder 108. A disturbance m(t) is provided to a second input of the adder 108. An output u*(t) of the adder 108 is provided to an input of the plant 110. The plant 110 has a transfer function H(s) and an output x(t), where x(t)⇋X(s) (where the symbol⇋denotes the Laplace transform) and X(s)=H(s)u*(s). An output of the genetic algorithm 116 is provided to an input of a Fuzzy logic Neural Network (FNN) 118 and an output of the fuzzy neural network 118 is provided to a Fuzzy Controller (FC) 120. An output of the fuzzy controller 120 is a set of coefficients K, which are provided to a coefficient input of the PID controller 106.

The error signal e(t) provided to the PID controller 106 is the difference between the desired plant output value y(t) and the actual plant output value x(t). The PID controller 106 is designed to minimize the error represented by e(t) (the error being the difference between the desired and actual output signal signals). The PID controller 106 minimizes the error e(t) by generating an output signal u(t) which will move the output signal x(t) from the plant 110 closer to the desired value. The genetic algorithm 116, fuzzy neural network 118, and fuzzy controller 120 monitor the error signal e(t) and modify the gain schedule K of the PID controller 106 in order to improve the operation of the PID controller 106.

The PID controller 106 constitutes a reverse model relative to the plant 110. The genetic algorithm 116 evolves an output signal a based on a performance function $f$. Plural candidates for α are produced and these candidates are paired according to which plural chromosomes (parents) are produced. The chromosomes are evaluated and sorted from best to worst by using the performance function $f$. After the evaluation for all parent chromosomes, good offspring chromosomes are selected from among the plural parent chromosomes, and some offspring chromosomes are randomly selected. The selected chromosomes are crossed so as to produce the parent chromosomes for the next generation. Mutation may also be provided. The second-generation parent chromosomes are also evaluated (sorted) and go through the same evolutionary process to produce the next-generation (i.e., third-generation) chromosomes. This evolutionary process is continued until it reaches a predetermined generation or the evaluation function $f$ finds a chromosome with a certain value. The outputs of the genetic algorithm are the chromosomes of the last generation. These chromosomes become input information a provided to the fuzzy neural network 118.

In the fuzzy neural network 118, a fuzzy rule to be used in the fuzzy controller 120 is selected from a set of rules. The selected rule is determined based on the input information a from the genetic algorithm 116. Using the selected rule, the fuzzy controller 120 generates a gain lo schedule K for the PID controller 106. The vector coefficient gain schedule K is provided to the PID controller 106 and thus adjusts the operation of the PID controller 106 so that the PID controller 106 is better able to minimize the error signal e(t).

Although the AI controller 100 is advantageous for accurate control in regions near linearized equilibrium points, the accuracy deteriorates in regions away from the linearized equilibrium points. Moreover, the AI controller 100 is typically slow or even unable to catch up with changes in the environment surrounding the plant 110. The PID controller 106 has a linear transfer function G(s) and thus is based upon a linearized equation of motion for the plant 110. Since the evaluation function $f$ used in the genetic algorithm 116 is only based on the information related to the input e(t) of the linear PID controller 106, the controller 100 does not solve the problem of poor controllability typically seen in linearization models. Furthermore, the output results, both in the gain schedule K and the output x(t) often fluctuate greatly, depending on the nature of the performance functions used in the genetic algorithm 116. The genetic algorithm 116 is a nonlinear optimizer that optimizes the performance function $f$. As is the case with most optimizers, the success or failure of the optimization often ultimately depends on the selection of the performance function $f$.

Figure 2:
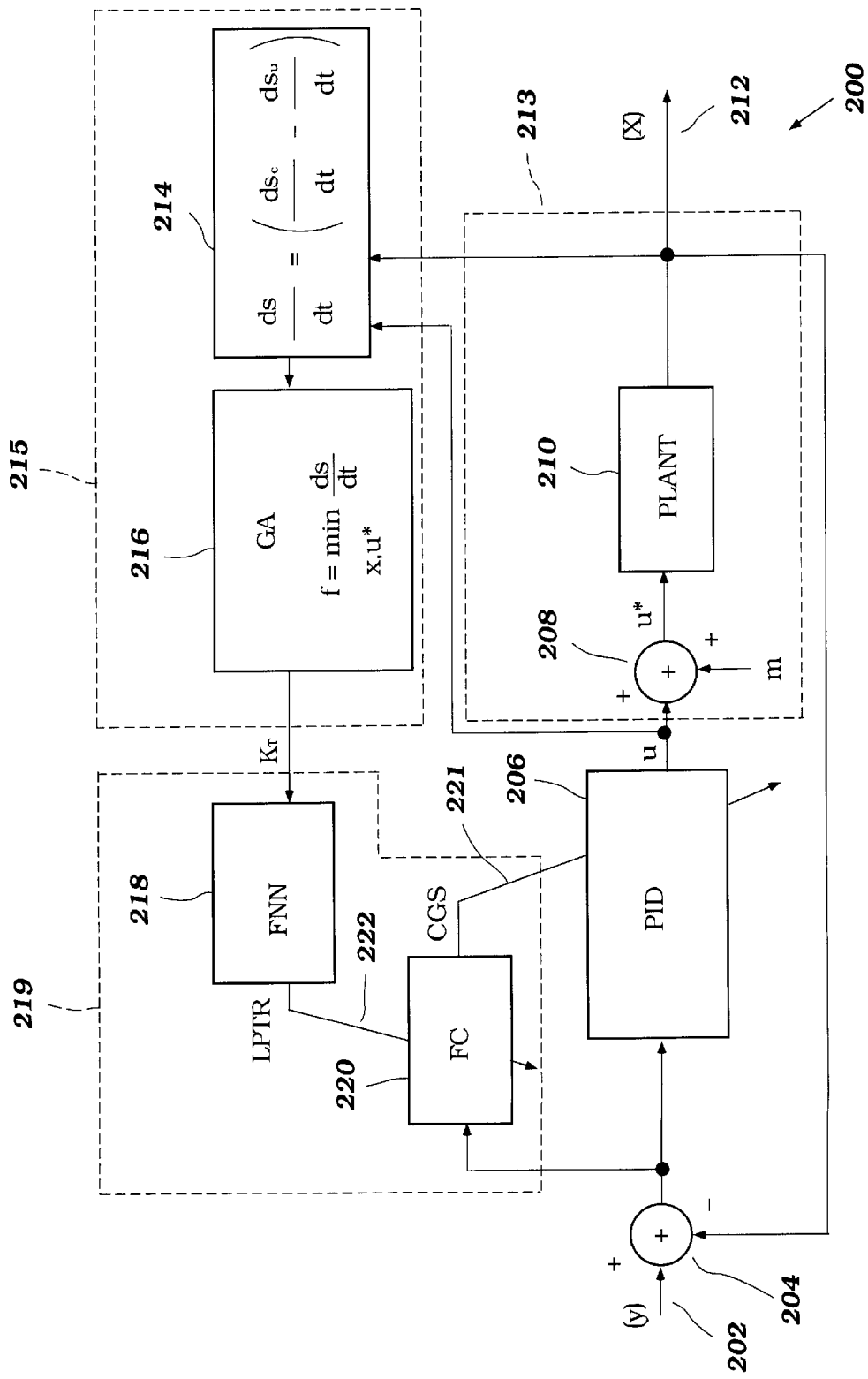
FIG. 2 is a block diagram showing an embodiment of an AI control method in accordance with one aspect of the present invention.

The present invention solves these and other problems by providing a new AI control system 200 shown in FIG. 2. Unlike prior AI control systems, the control system 200 is self-organizing and uses a new performance function $f$, which is based on the physical law of minimum entropy. An input y(t) of the control system 200 is provided to a plus input of an adder 204 and an output x(t) of a plant 210 is provided to a minus input of the adder 204. An output of the adder 204 is provided as an error signal e(t) to an error signal input of a PID controller 206 and to an input of a fuzzy controller 220. An output u(t) of the PID controller 206 is provided to a first input of an adder 208 and to a first input of an entropy calculator (EC) 214. A disturbance m(t) is provided to a second input of the adder 208. An output u*(t) of the adder 208 is provided to am input of the plant 210. The plant 210 has a transfer function H(s) and an output x(t), such that X(s)=H(s)u*(s), where x(t)⇋X(s). The output x(t) is provided to a second input of the entropy calculator 214 and to the minus input of the adder 204. An output of the entropy calculator 214 is provided to an input of a genetic algorithm 216 and an output of the genetic algorithm 216 is provided to an input of a Fuzzy logic Neural Network (FNN) 218. An output of the fuzzy neural network 218 is provided to a rules selector input 222 of the fuzzy controller 220. A Coefficient Gain Schedule (CGS) output 212 of the fuzzy controller 222 is provided to a gain schedule input of the PID 206.

The combination of the genetic algorithm 216 and the entropy calculator 214 comprises a Simulation System of Control Quality 215. The combination of the fuzzy neural network 218 and the fuzzy controller 220 comprises a Fuzzy Logic Classifier System FLCS 219. The combination of the plant 210 and the adder 208 comprises a disturbed plant model 213. The disturbed plant signal u*(t)=u(t)+m(t), and the disturbance m(t) are typically unobservable.

The error signal e(t) provided to the PID controller 206 is the difference between the desired plant output value y(t) and the actual plant output value x(t). The PID controller 206 is designed to minimize the error represented by e(t). The PID controller 206 minimizes the error e(t) by generating an output signal u(t) which will move the output signal x(t) from the plant 210 closer to the desired value. The fuzzy controller 220 monitors the error signal e(t) and modifies the gain schedule K of the PID controller 206 according to a fuzzy control rule selected by the fuzzy neural network 218.

The genetic algorithm 216 provides a teaching signal $K_T$ to the fuzzy neural network 218. The teaching signal $K_T$ is a global optimum solution of a coefficient gain schedule K generated by the genetic algorithm 216. The PID controller 206 constitutes a reverse model relative to the plant 210. The genetic algorithm 216 evolves an output signal a based on a performance function $f$. Plural candidates for a are produced and these candidates are paired by which plural chromosomes (parents) are produced. The chromosomes are evaluated and sorted from best to worst by using the performance function $f$. After the evaluation for all parent chromosomes, good offspring chromosomes are selected from among the plural parent chromosomes, and some offspring chromosomes are randomly selected. The selected chromosomes are crossed so as to produce the parent chromosomes for the next generation. Mutation is also employed. The second-generation parent chromosomes are also evaluated (sorted) and go through the same evolutionary process to produce the next-generation (i.e., third-generation) chromosomes. This evolutionary process is continued until it reaches a predetermined generation or the evaluation function $f$ finds a chromosome with a certain value. Then, a component from a chromosome of the last generation becomes a last output, i.e., input information α provided to the fuzzy neural network 218.

In the fuzzy neural network 218, a filmy rule to be used in the fuzzy controller 220 is selected from a set of rules. The selected rule is determined based on the input information a from the genetic algorithm 216. Using the selected rule, the fuzzy controller 220 generates a gain schedule K for the PID controller 206. This is provided to the PID controller 206 and thus adjusts the operation of the PID controller 206 so that the PID controller 206 is better able to minimize the error signal e(t).

The fitness function $f$ for the genetic algorithm is given by $$f = \min \frac{dS}{dt} \tag{2}$$

where $$\frac{dS}{dt} = \left( \frac{dS_c}{dt} - \frac{dS_u}{dt} \right) \tag{3}$$

The quantity $dS_u/dt$ represents the rate of entropy production in the output x(t) of the plant 210. The quantity $dS_c/dt$ represents the rate of entropy production in the output u(t) of the PID controller 206.

Entropy is a concept that originated in physics to characterize the heat, or disorder, of a system. It can also be used to provide a measure of the uncertainty of a collection of events, or, for a random variable, a distribution of probabilities. The entropy function provides a measure of the lack of information in the probability distribution. To illustrate, assume that p(x) represents a probabilistic description of the known state of a parameter, that p(x) is the probability that the parameter is equal to z. If p(x) is uniform, then the parameter p is equally likely to hold any value, and an observer will know little about the parameter p. In this case, the entropy function is at its maximum. However, if one of the elements of p(z) occurs with a probability of one, then an observer will know the parameter p exactly and have complete information about p. In this case, the entropy of p(x) is at its minimum possible value. Thus, by providing a measure of uniformity, the entropy function allows quantification of the information on a probability distribution.

It is possible to apply these entropy concepts to parameter recovery by maximizing the entropy measure of a distribution of probabilities while constraining the probabilities so that they satisfy a statistical model given measured moments or data. Though this optimization, the distribution that has the least possible information that is consistent with the data may be found. In a sense, one is translating all of the information in the data into the form of a probability distribution. Thus, the resultant probability distribution contains only the information in the data without imposing additional structure. In general, entropy techniques are used to formulate the parameters to be recovered in terms of probability distributions and to describe the data as constraints for the optimization. Using entropy formulations, it is possible to perform a wide range of estimations, address ill-posed problems, and combine information from varied sources without having to impose strong distributional assumptions.

Entropy-based control of the plant in FIG. 2 is based on obtaining the difference between a time differentiation ($dS_u/dt$) of the entropy of the plant and a time differentiation ($dS_c/dt$) of the entropy provided to the plant from a low-level controller that controls the plant 210, and then evolving a control rule using a genetic algorithm. The time derivative of the entropy is called the entropy production rate. The genetic algorithm uses the difference between the entropy production rate of the plant ($dS_u/dt$ and the entropy production rate of the low-level controller ($dS_c/dt$) as a performance function. Nonlinear operation characteristics of the physical plant 210 are calculated by using a Lyapunov function The dynamic stability properties of the plant 210 near an equilibrium point can be determined by use of Lyapunov functions. Let V(x) be a continuously differentiable scalar function defined in a domain $D \subset R^\alpha$ that contains the origin. The function V(x) is said to be positive definite if V(0)=0 and V(x)>0 for x≠0. The function V(x) is said to be positive semidefinite if V(x)≧0 for all x. A function V(x) is said to be negative definite or negative semidefinite if –V(x) is positive definite or positive semidefinite, respectively. The derivative of V along the trajectories $\dot{x}=f(x)$ is given by:

$$\dot{V}(x) = \sum_{i=1}^{n} \frac{\partial V}{\partial x_i} \dot{x}_i = \frac{\partial V}{\partial x} f(x) \tag{4}$$

where $\partial V/\partial x$ is a row vector whose ith component is $\partial V/\partial x_i$ and the components of the n-dimensional vector $f(x)$ are locally Lipschitz functions of x, defined for all x in the domain D. The Lyapunov stability theorem states that the origin is stable if there is a continuously differentiable positive definite function V(x) so that $\dot{V}(x)$ is negative definite. A function V(x) satisfying the conditions for stability is called a Lyapunov function.

Calculation of the Lyapunov dynamic stability and entropy production for a closed nonlinear mechanical system is demonstrated by using the Holmes-Rand (Duffing-Van der Pol) nonlinear oscillator as an example. The Holmes-Rand oscillator is described by the equation:

$$\ddot{x} + (\alpha + \beta x^2)\dot{x} - \gamma x + x^3 = 0 \tag{5}$$

where α, 62, and γ are constant parameters. A Lyapunov function for the Holmes-Rand oscillator is given by:

$$V = \frac{1}{2}\dot{x}^2 + U(x), \quad (6)$$

where $$U = \frac{1}{4}x^4 - \frac{1}{2}\gamma x^2$$

Entropy production $d_iS/dt$ for the Holmes-Rand oscillator is given by the equation:

$$\frac{d_iS}{dt} = (\alpha + \beta x^2)\dot{x}^2 \quad (7)$$

Equation 5 can be rewritten as:

$$\ddot{x} + (\alpha + \beta x^2)\dot{x} + \frac{\partial U}{\partial x} = 0 \quad (8)$$

After multiplying both sides of the above equation by $\dot{x}$, then $dV/dt$ can be calculated as::

$$\frac{dV}{dt} = \ddot{x}\dot{x} + \frac{\partial U}{\partial x}\dot{x} = -\frac{1}{T}\frac{d_iS}{dt} \quad (9)$$

where T is a normalizing factor.

An interrelation between a Lyapunov function and the entropy production in an open dynamic system can be established by assuming a Lyapunov function of the form $$V = \frac{1}{2}\sum_{i=1}^{n}(q_i^2 + S^2) \quad (10)$$

where $S=S_u-S_c$, and the $q_i$ are generalized coordinates. It is possible to introduce the entropy function S in the Lyapunov function V because entropy S is also a scalar function of time. Differentiation of V with respect to time gives:

$$\frac{dV}{dt} = \sum_{i=1}^{6} q_i\dot{q}_i + S\dot{S} \quad (11)$$

In this case, $\dot{q}_i=\phi_i(q_i,\tau,t)$, $S=S_u-S_c$, $\dot{S}=\dot{S}_u-\dot{S}_c$ and thus:

$$\frac{dV}{dt} = \sum_{i=1}^{6} q_i\varphi_i(q_i, \tau, t) + (S_u - S_c)\left(\frac{dS_u}{dt} - \frac{dS_c}{dt}\right) \quad (12)$$

A special case occurs when $\beta=0$ and the Holmes-Rand oscillator reduces to a force-free Duffing oscillator, wherein:

$$\frac{d_iS}{dt} = -\alpha\dot{x}^2 \quad \text{(Duffing oscillator)} \quad (13)$$

A Van der Pol oscillator is described by the equation:

$$\ddot{x}+(x^2-1)\dot{x}+x=0 \quad (14)$$

and the entropy production is given by:

$$\frac{d_iS}{dt} = \frac{1}{T}(x^2 - 1)\dot{x}^2 \quad \text{(Van der Pol oscillator)} \quad (15)$$

For a micro-mobile robot in fluid, a mechanical model is given by:

$$m_1\ddot{x}_1 + C_d\frac{\rho}{2}A_1|\dot{x}_1|\dot{x}_1 + K_1(x_1 - x_0 - l_1\theta_0) - K_2(x_2 - x_1 - l_2\theta_1) = 0 \quad (16)$$

$$m_2\ddot{x}_2 + C_d\frac{\rho}{2}A_2|\dot{x}_2|\dot{x}_2 + K_2(x_2 - x_1 - l_2\theta_1) - K_3(x_3 - x_2 - l_3\theta_2) = 0 \quad (17)$$

$$m_3\ddot{x}_3 + C_d\frac{\rho}{2}A_3|\dot{x}_3|\dot{x}_3 + K_3(x_3 - x_2 - l_3\theta_2) = 0 \quad (18)$$

where:

$$\theta_{n+1} = -\frac{1}{2}\theta_n + \frac{3}{2}\frac{1}{l_{n+1}}(x_{n+1} - x_n) \quad (19)$$

Values for a particular micro-mobile robot are given in Table 1 below.

TABLE 1

| Item | Value | Units |
| --- | --- | --- |
| $m_1$ | $1.6 \times 10^{-7}$ | kg |
| $m_2$ | $1.4 \times 10^{-6}$ | kg |
| $m_3$ | $2.4 \times 10^{-6}$ | kg |
| $l_1$ | $2.0 \times 10^{-3}$ | m |
| $l_1$ | $4.0 \times 10^{-3}$ | m |
| $l_3$ | $4.0 \times 10^{-3}$ | m |
| $K_1$ | 61.1 | N/m |
| $K_2$ | 13.7 | N/m |
| $K_3$ | 23.5 | N/m |
| $A_1$ | $4.0 \times 10^{-6}$ | $m^2$ |
| $A_2$ | $2.4 \times 10^{-6}$ | $m^2$ |
| $A_3$ | $4.0 \times 10^{-6}$ | $m^2$ |
| $C_d$ | 1.12 | — |
| $\rho$ | 1000 | $Kg/m^3$ |

Entropy production for the micro-mobile robot is given by the equation:

$$\frac{dS_i}{dt} = \sum_{n=1}^{3} C_d\frac{\rho}{2}A_n|\dot{x}_n|\dot{x}_n^2 \quad (20)$$

and the Lyapunov Function is given by:

$$V = \sum_{i=1}^{3} m_i\frac{\dot{x}_i^2\rho}{2} + \sum_{i=1}^{3} \frac{K_i(x_i - x_{i-1} - l_i\theta_{i-1})^2}{2} + \frac{S^2}{2} \quad (21)$$

where $S=S_i-S_c$ and $S_c$ is the entropy of a controller with torque $\tau$.

The necessary and sufficient conditions for Lyapunov stability of a plant is given by the relationship:

$$\sum_i q_i\varphi_i(q_i, \tau, t) < (S_i - S_c)\left(\frac{dS_c}{dt} - \frac{dS_i}{dt}\right), \frac{dS_c}{dt} > \frac{dS_i}{dt} \quad (22)$$

According to the above equation, stability of a plant can be achieved with "negentropy" $S_c$ (in the terminology used by Brillouin) where a change of negentropy $dS_c/dt$ in the control system 206 is subtracted from a change of entropy $dS_i/dt$ in the motion of the plant 210.

The robust AI control system 200 provides improved control of mechanical systems in stochastic environments (e.g., active vibration control), intelligent robotics and electro-mechanical systems (e.g., mobile robot navigation, manipulators, collective mobile robot control), bio-mechanical systems (e.g., power assist systems, control of artificial replaced organs in medical systems as artificial lung ventilation), micro electromechanical systems (e.g., micro robots in fluids), etc.

The genetic algorithm realizes the search of optimal controllers with a simple structure using the principle of minimum entropy production. The fuzzy neural network controller offers a more flexible structure of controllers with a smaller torque, and the learning process produces less entropy. The fuzzy neural network controller gives a more flexible structure to controllers with smaller torque and the learning process produces less entropy than a genetic analyzer alone. Thus, an instinct mechanism produces less entropy than an intuition mechanism. However, necessary time for achieving an optimal control with learning process on fuzzy neural network (instinct) is larger than with the global search on genetic algorithm (intuition).

Realization of coordinated action between the look-up tables of the fuzzy controller 220 is accomplished by the genetic algorithm and the fuzzy neural network. In particular, the structure 200 provides a multimode fuzzy controller coupled with a linear or nonlinear neural network 218. The control system 200 is a realization of a self-organizing AI control system with intuition and instinct. In the adaptive controller 200, the feedback gains of the PID controller 210 are charged according to the quantum fuzzy logic, and approximate reasoning is provided by the use of nonlinear dynamic motion equations.

The fuzzy tuning rules for the gains $k_i$ are shaped by the learning system in the fuzzy neural network 218 with acceleration of fuzz rules on the basis of global inputs provided by the genetic algorithm 216. The control system 200 is thus a hierarchical, two-level control system that is intelligent "in small." The lower (execution) level is provided by a traditional PID controller 206, and the upper (coordination) level is provided by a KB (with fuzzy inference module in the form of production rules with different model of fuzzy implication) and fuzzification and de-fuzzification components, respectively.

The genetic algorithm 216 simulates an intuition mechanism of choosing the optimal structure of the PID controller 206 by using the fitness function, which is the measure of the entropy production, and the evolution function, which in this case is entropy.

Reduced Sensor Control Systems

In one embodiment, the entropy-based control system is applied to a reduced control system wherein the number of sensors has been reduced from that of an optimal system.

Figure 3A:
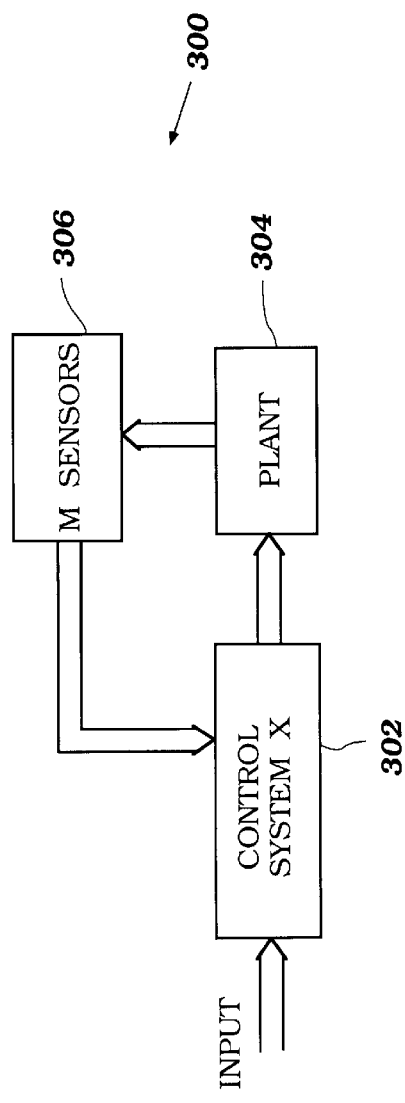
FIG. 3A is a block diagram of an optimal control system.

FIG. 3A shows an optimal control system x 302 controlling a plant 304. The optimal control system x produces an output signal x. A group of m sensors collect state information from the plant 304 and provide the state information as feedback to the optimal control system x 302. The control system x 302 is optimal not in the sense that it is perfect or best, but rather, the control system x 302 is optimal in the sense that it provides a desired control accuracy for controlling the output of the plant 304.

Figure 3B:
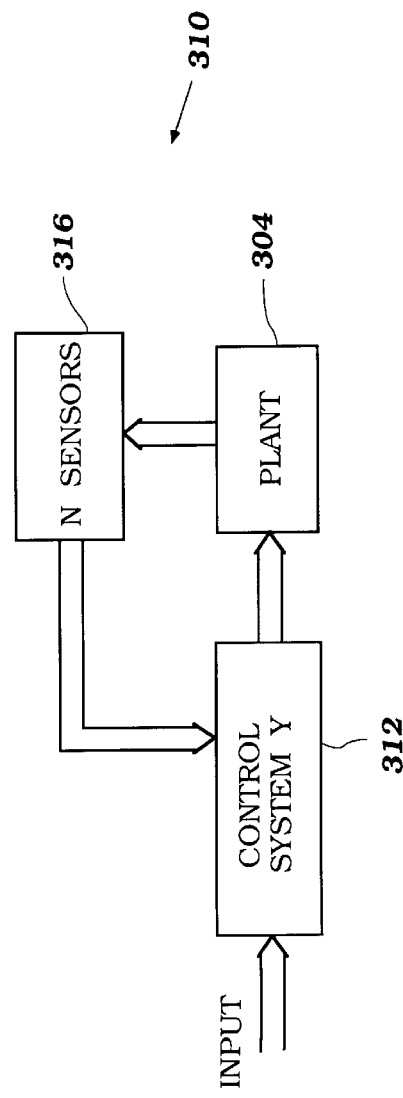
FIG. 3B is a block diagram of a reduced control system.

FIG. 3B shows a reduced control system y 312 controlling the plant 304. The reduced control system y 312 provides an output signal y. A group of n sensors (where n<m) collect state information from the plant 304 and provide the state information as feedback to the reduced control system x 312. The reduced control system 312 is reduced because it receives information from fewer sensors than the optimal control system 302 (n is less than m).

The reduced control system 312 is configured to use smart simulation techniques for controlling the plant 304 despite the reduction in the number of sensor number without significant loss of control quality (accuracy) as compared to the optimal control system 302. The plant 304 may be either stable or unstable, and the control system 312 can use either a complete model of the plant 304 or a partial model of the plant 304.

The reduced control system 312 provides reliability, sufficient accuracy, robustness of control, stability of itself and the plant 304, and lower cost (due, in part, to the reduced number of sensors needed for control). The reduced control system 312 is useful for robust intelligent control systems for plants such as, for example, suspension system, engines, helicopters, ships, robotics, micro electromechanical systems, etc.

In some embodiments, reduction in the number of sensors may be used, for example, to integrate sensors as intelligent systems (e.g., "sensor-actuator-microprocessor" with the preliminary data processing), and for simulation of robust intelligent control system with a reduced number of sensors.

The amount of information in the reduced output signal y (with n sensors) is preferably close to the amount of information in the optimal output signal. In other words, the reduced (variable) output y is similar to the optimal output x, such that (x≈y). The estimated accuracy of the output y as related to x is $M[(x-y)^2] \leq \epsilon^2$.

In some embodiments, the reduced control system 312 is adapted to minimize the entropy production in the control system 312 and in the plant 304.

Figure 4A:
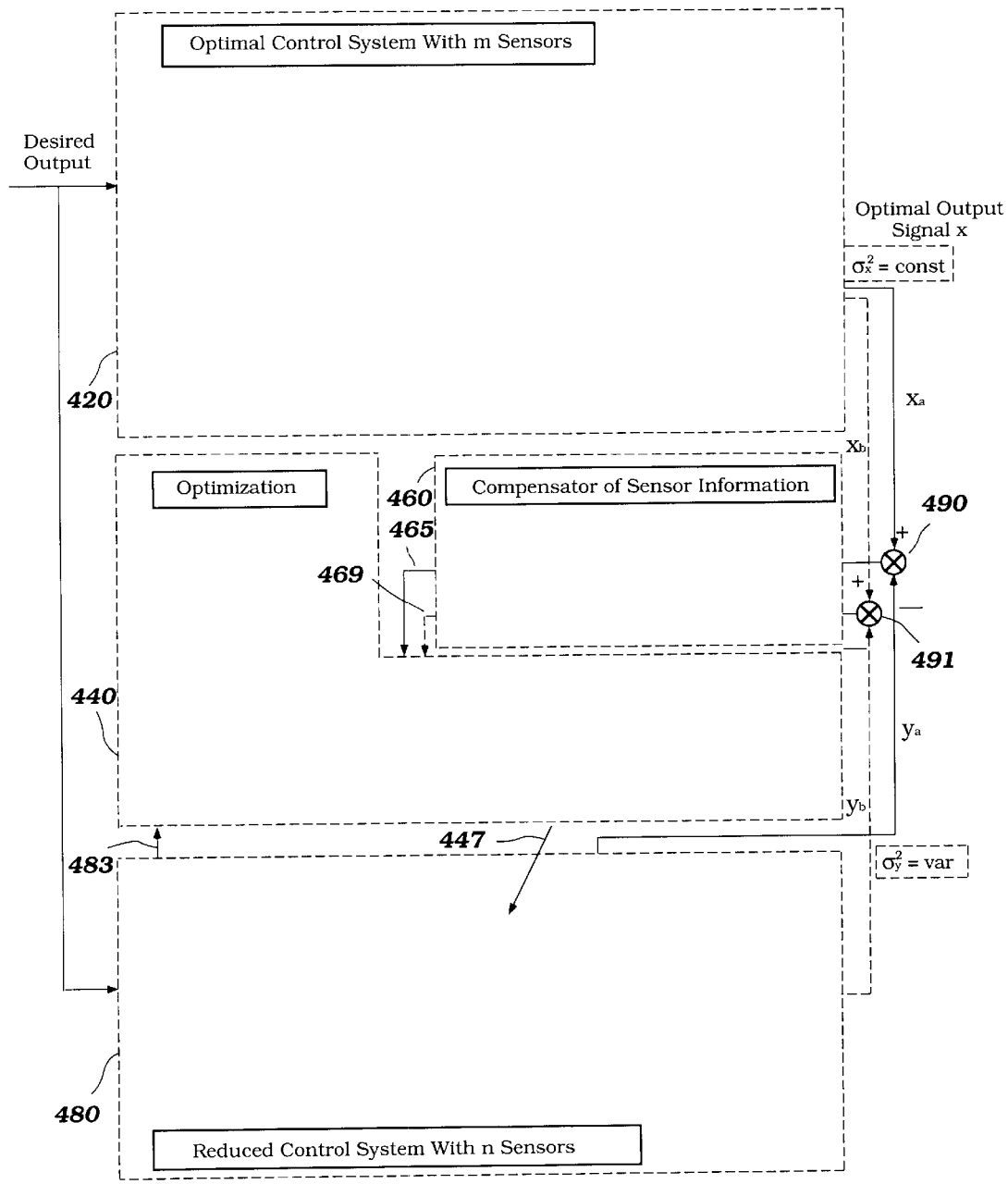
FIG. 4A is an overview block diagram of a reduced control system that uses entropy-based soft computing.
Figure 4B:
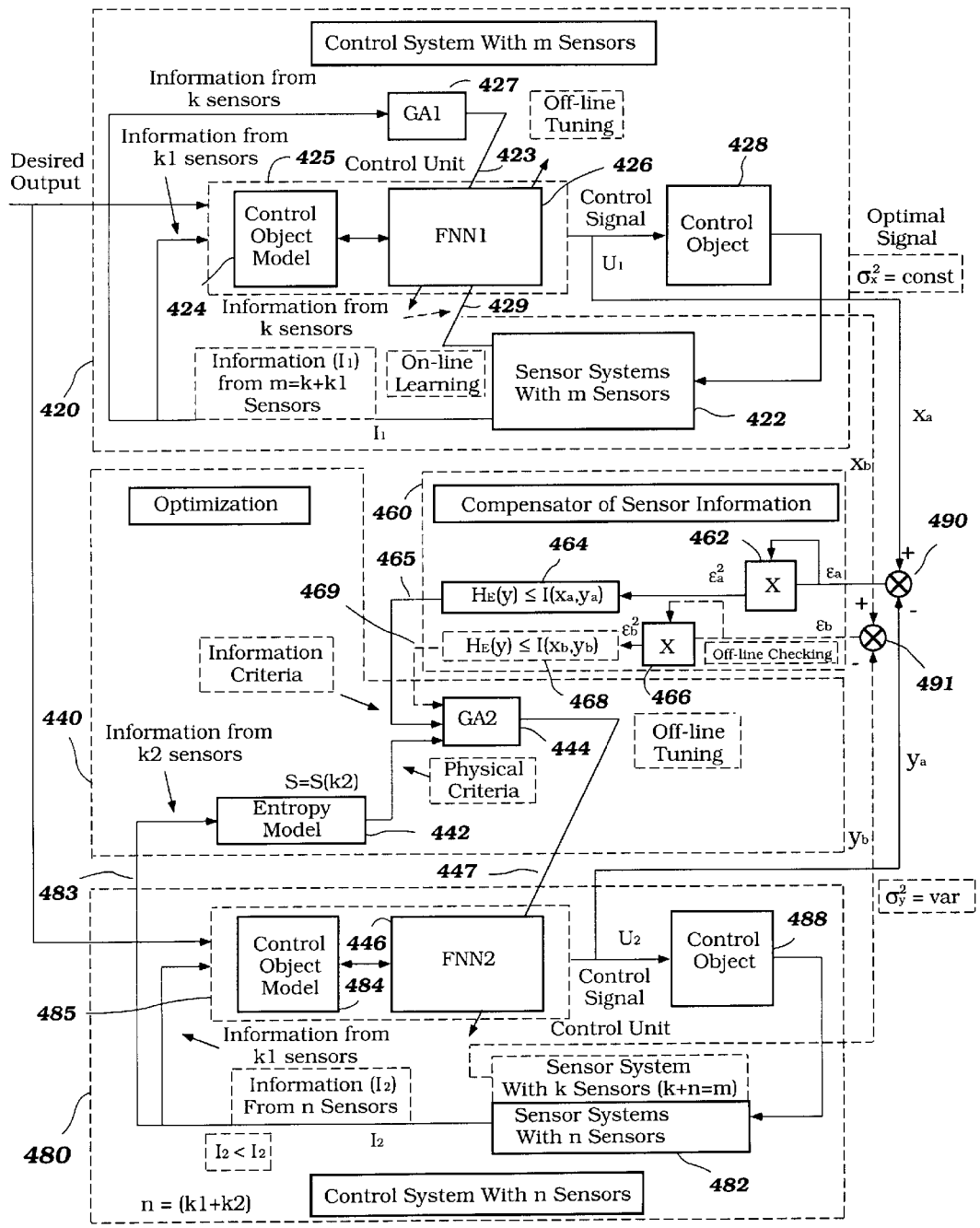
FIG. 4B is a detailed block diagram of a reduced control system that uses entropy-based soft computing.

The general structure of a reduced control system is shown in FIGS. 4A and 4B. FIG. 4A is a block diagram showing a reduced control system 480 and an optimal control system 420. The optimal control system 420, together with an optimizer 440 and a sensor compensator 460 are used to teach the reduced control system 480. In FIG. 4A, a desired signal (representing the desired output) is provided to an input of the optimal control system 420 and to an input of the reduced control system 480. The optimal control system 420, having m sensors, provides an output sensor signal $x_b$ and an optimal control signal $x_a$. A reduced control system 480 provides an output sensor signal $y_b$ and a reduced control signal $y_a$. The signals $x_b$ and $y_b$ includes data from k sensors where k≦m−n. The k sensors typically being the sensors that are not common between the sensor systems 422 and 482. The signals $x_b$ and $y_b$ are provided to first and second inputs of a subtractor 491. An output of the subtractor 491 is a signal $\epsilon_b$, where $\epsilon_b = x_b - y_b$. The signal $\epsilon_b$ is provided to a sensor input of a sensor compensator 460. The signals $x_a$ and $y_a$ are provided to first and second inputs of a subtractor 490. An output of the subtractor 490 is a signal $\epsilon_a$ where $\epsilon_a = x_a - y_a$. The signal $\epsilon_a$ is provided to a control signal input of the sensor compensator 460. A control information output of the sensor compensator 460 is provided to a control information input of the optimizer 440. A sensor information output of the sensor compensator 460 is provided to a sensor information input of the optimizer 440. A sensor signal 483 from the reduced control system 480 is also provided to an input of the optimizer 440. An output of the optimizer 440 provides a teaching signal 443 to an input of the reduced control system 480.

In the description that follows, off-line mode typically refers to a calibration mode, wherein the control object 428 (and the control object 488) is run with an optimal set of set of m sensors. In one embodiment, the off-line mode is rum at the factory or repair center where the additional sensors (i.e., the sensors that are in the m set but not in the n set) are used to train the FNN1 426 and the FNN2 486. The online mode typically refers to an operational mode (e.g., normal mode) where the system is run with only the n set of sensors.

FIG. 4B is a block diagram showing details of the blocks in FIG. 4A. In FIG. 4B, the output signal $x_k$ is provided by an output of a sensor set m 422 having m sensors given by m=k+$k_1$. The information from the sensor system m 422 is a signal (or group of signals) having optimal information content $I_1$. In other words, the information $I_1$ is the information from the complete set of m sensors in the sensor system 422. The output signal x, is provided by an output of a control unit 425. The control signal $x_a$ is provided to an input of a control object 428. An output of the control object 428 is provided to an input of the sensor system 422. Information $I_k$ from the set k of sensors is provided to an online learning input of a fuzzy neural network (FNN1) 426 and to an input of a first Genetic Algorithm (GA1) 427. Information $I_{k1}$ from the set of sensors $k_1$ in the sensor system 422 is provided to an input of a control object model 424. An off-line tuning signal output from the algorithm GA1 427 is provided to an off-line tuning signal input of the FNN1 426. A control output from the FNN 426 is the control signal $x_a$, which is provided to a control input of the control object 428. The control object model 424 and the FNN 426 together comprise an optimal fuzzy control unit 425.

Also in FIG. 4B, the sensor compensator 460 includes a multiplier 462, a multiplier 466, an information calculator 468, and an information calculator 464. The multiplier 462 an(i the information calculator 464 are used in online (normal) mode. The multiplier 466 and the information calculator 468 are provided for off-line checking.

The signal $\epsilon_a$ from the output of the adder 490 is provided to a first input of the multiplier 462 and to a second input of the multiplier 462. An output of the multiplier 462, being a signal $\epsilon_a^2$, is provided to an input of the information calculator 464. The information calculator 41A computes $H_a(y) \leq I(x_a, y_a)$. An output of the information calculator 464 is an information criteria for accuracy and reliability, $I(x_a, y_a) \rightarrow$ max.

The signal $\epsilon_b$ from the output of the adder 491 is provided to a first input of the multiplier 466 and to a second input of the multiplier 466. An output of the multiplier 466, being a signal $\epsilon_b^2$, is provided to an input of the information calculator 468. The information calculator 468 computes $H_b(y) \leq I(x_b, y_b)$. An output of the information calculator 468 is an information criteria for accuracy and reliability, $I(x_b, y_b) \rightarrow$ max.

The optimizer 440 includes a second Genetic Algorithm (GA2) 444 and an entropy model 442. The signal $I(x_a, y_1) \rightarrow$ max from the information calculator 464 is provided to a first input of the algorithm (GA2) 444 in the optimizer 440. An entropy signal S→min is provided from an output of the thermodynamic model 442 to a second input of the algorithm GA2 444. The signal $I(x_b, y_b) \rightarrow$ max from the information calculator 468 is provided to a third input of the algorithm (GA2) 444 in the optimizer 440.

The signals $I(x_a, y_a) \rightarrow$ max and $I(x_b, y_b) \rightarrow$ max provided to the first and third inputs of the algorithm (GA2) 444 are information criteria, and the entropy signal $S(k_2) \rightarrow$ min provided to the second input of the algorithm GA2 444 is a physical criteria based on entropy. An output of the algorithm GA2 444 is a teaching signal for a FNN2 486 described below.

The reduced control system 480 includes a reduced sensor set 482, a control object model 484, the FNN2 486, and a control object 488. When run in a special off-line checking (verification) mode, the sensor system 482 also includes the set of sensors k. The control object model 484 and the FNN2 486 together comprise a reduced fuzzy control unit 485. An output of the control object 488 is provided to an input of the sensor set 482. An $I_2$ output of the sensor set 482 contains information from the set n of sensors, where n=($k_1+k_2$)<m, such that $I_2<I_1$. The information $I_2$ is provided to a tuning input of the FNN2 486, to an input of the control object model 484, and to an input of the entropy model 442. The teaching signal 443 from the algorithm GA2 444 is provided to a teaching signal input of the FNN2 486. A control output from the FNN2 486 is the signal $y_a$, which is provided to a control input of the control object 488.

The control object models 424 and 484 may be either full or partial models. Although FIGS. 4A and 4B show the optimal system 420 and the reduced system 480 as separate systems, typically the systems 420 and 480 are the same system. The system 480 is "created" from the system 420 by removing the extra sensors and training the neural network. Thus, typically, the control object models 424 and 484 are the same. The control object 428 and 488 are also typically the same.

FIG. 4B shows arrow an off-line tuning arrow mark from GA1 427 to the FNN1 426 and from the GA2 444 to the FNN2 486. FIG. 4B also shows an online learning arrow mark 429 from the sensor system 422 to the FNN1 426. The Tuning of the GA2 444 means to change a set of bonding coefficients in the FNN2 486. The bonding coefficients are changed (using, for example, an iterative or trial and error process) so that I(x,y) trends toward a maximum and S trends toward a minimum. In other words, the information of the coded set of the coefficients is sent to the FNN2 486 from the GA2 444 as I(x,y) and S are evaluated. Typically, the bonding coefficients in the FNN2 486 are tuned in off-line mode at a factory or service center.

The teaching signal 429 is a signal that operates on the FNN1 426 during operation of the optimal control system 420 with an optimal control set. Typically, the teaching signal 429) is provided by sensors that are not used with the reduced control system 480 when the reduced control system is operating in online mode. The GA1 427 tunes the FNN1 426 during off-line mode. The signal lines associated with $x_b$ and $y_b$ are dashed to indicate that the $x_b$ and $y_b$ signals are typically used only during a special off-line checking (i.e., verification) mode. During the verification mode, the reduced control system is run with an optimal set of sensors. The additional sensor information is provided to the optimizer 440 and the optimizer 440 verifies that the reduced control system 480 operates with the desired, almost optimal, accuracy.

For stable and unstable control objects with a non-linear dissipative mathematical model description and reduced number of sensors (or a different set of sensors) the control system design is connected with calculation of an output accuracy of the control object and reliability of the control system according to the information criteria $I(x_a, y_a) \rightarrow$ max and $I(x_b, y_b) \rightarrow$ max. Control system design is also connected with the checking of stability and robustness of the control system and the control object according to the physical criteria $S(k_2) \rightarrow$ min.

In a first step, the genetic algorithm GA2 444 with a fitness function described as the maximum of mutual information between and optimal control signals $x_a$ and a reduced control signal $y_a$ is used to develop the teaching signal 443 for the fuzzy neural network FNN2 486 in an off-line simulation. The fuzzy neural network FNN2 486 is realized using the learning process with back-propagation for adaptation to the teaching signal, and to develop a lookup-table for changing the parameters of a PID-controller in the controller 485. This provides sufficient conditions for achieving the desired control reliability with sufficient accuracy.

In a second step, the genetic algorithm GA2 444, with a fitness function described as the minimum entropy, S, production rate dS/dt, (calculated according to a mathematical model of the control object 488), is used to realize a node correction lookup-table in the FNN2 486. This approach provides stability and robustness of the reduced control system 480 with reliable and sufficient accuracy of control. This provides a sufficient condition of design for the robust intelligent control system with the reduced number of sensors.

The first and second steps above need not be done in the listed order or sequentially. In the simulation of unstable objects, both steps are preferably done in parallel using the fitness function as the sum of the physical and the information criteria.

After the simulation of a lookup-table for the FNN2 486, the mathematical model of control object 484 is changed on the sensor system 482 for checking the qualitative characteristics between the reduced control system with the reduced number of sensors and the reduced control system with a full complement (optimum number) of sensors. Parallel optimization in the (GA2 444 with two fitness functions is used to realize the global correction of a lookup-table in, the FNN2 486.

The entropy model 442 extracts data from the sensor information $I_2$ to help determine-, the desired number of sensors for measurement and control of the control object 488.

FIGS. 4A and 4B show the general case when the reduction of sensors excludes the measurement sensors in the output of the control object and the calculation comparison of control signal on information criteria is possible. The sensor compensator 460 computes the information criteria as a maximum of mutual information between the two control signals $x_a$ and $y_a$ (used as the first fitness function for the GA2 444). The entropy model 442 present the physical criteria as a minimum production entropy (used as the second fitness function in the GA2 444) using tie information from sensors 482. The output of the GA2 444 is the teaching signal 447 for the FNN2 486 that is used on-line to develop the reduced control signal $y_a$ such that the quality of the reduced control signal $y_b$ is similar to the quality of the optimal control signal $x_a$. Thus, the optimizer 440 provides stability and robustness of control (using the physical criteria), and reliability with sufficient accuracy (using the information criteria).

With off-line checking, the optimizer 440 provides correction of the control signal $y_a$ from the FNN2 486 using new information criteria Since the information is additive, it is possible to do the online/off-line steps in sequence, or in parallel. In off-line checking, the sensor system 482 typically uses all of the sensors only for checking of the quality and correction of the control signal $y_a$. This approach provides the desired reliability and quality of control, even when the control object 488 is unstable.

For the reduced sensor system 482 (with n sensors) the FNN2 486 preferably uses a learning and adaptation process instead of a Fuzzy Controller (FC) algorithm. FIG. 5 illustrates the similarity between a FC 501 and a FNN 540.

Figure 5A:
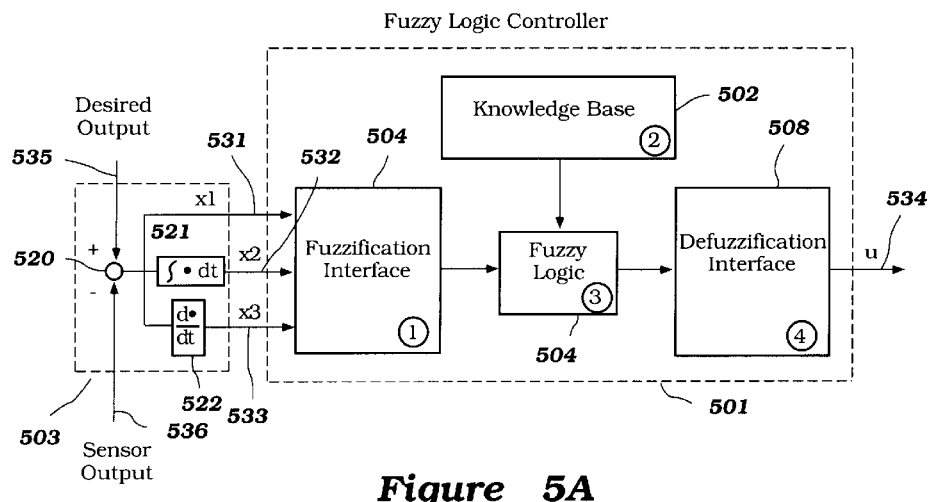
FIG. 5A is a system block diagram of a fuzzy logic controller.

As shown in FIG. 5A, the structure of the FNN 540 is similar to the structure of the FC 501. FIG. 5A shows a PID controller 503 having a first input 535 to receive a desired sensor output value and a second input 536 to receive an actual sensor output value 536. The desired sensor output value is provided to a plus input of an adder 520 and the actual sensor output value 536 is provided to a minus input of the adder 520. An output of the adder 520 is provided to a proportional output 531, to an input of an integrator 521, and to an input of a differentiator 522. An output of the integrator is provided to an integral output 532, and an output of the differentiator is provided to a differentiated output 533.

The Fuzzy logic Controller (FC) 501 includes a fuzzification interface 504 (shown in FIG. 5B), a Knowledge Base (KB) 502, a fuzzy logic rules calculator 506, and a defuzzification interface 508. The PID outputs 531–533 are provided to PID inputs of the fuzzification interface 504. An output of the fuzzification interface 504 is provided to a first input of the fuzzy logic rules calculator 506. An output of the KB 502 is provided to a second input of the fuzzy logic rules calculator 506. An output of the fuzzy logic rules calculator 506 is provided to an input of the defuzzification interface 508, and an output of the defuzzification interface 508 is provided as a control output $U_{FC}$ of the FC 501.

The Fuzzy Neural Network includes six neuron layers 550–555. The neuron layer 550 is an input layer and has three neurons, corresponding to the three PID output signals 531–533. The neuron layer 550 is an output layer and includes a single neuron. The neuron layers 551–553 are hidden layers (e.g., not visible from either the input or the output). The neuron layer 551 has six neurons in two groups of three, where each group is associated with one of the three input neurons in the neuron layer 550. The neuron layer 552 includes eight neurons. Each neuron, in the neuron layer 552 has three inputs, where each input is associated with one of the three groups from the neuron layer 551. The neuron layer 553 has eight neurons. Each neuron in the neuron layer 553 receives input from all of the neurons in the neuron layer 552. The neuron layer 554 has is a visible layer having 8 neurons. Each neuron in the neuron layer 554 has four inputs and receives data from one of the neurons in the neuron layer 553 (i.e., the first neuron in the neuron layer 554 receives input from the first neuron in the neuron layer 553, the second from the second, etc.). Each neuron in the neuron layer 554 also receives input from all of the PID input signals 531–533. The output neuron layer 555 is a single neuron with eight inputs and the single neuron receives data from all of the neurons in the layer 554 (a generalized Takagi-Sugeno FC models.

The number of hidden layers in the FNN 540 typically corresponds to the number of elements in the FC 501. One distinction between the FC 501 and the FNN 540 lies in the way in which the knowledge base 502 is formed. In the FC 501, the parameters and membership functions are typically fixed and do not change during of control. By contrast, the FNN 540 uses the learning and adaptation processes, such that when running on-line (e.g., normal model) the FNN 540 changes the parameters of the membership function in the "IF . . . THEN" portions of the production rules.

The entropy-based control system in FIGS. 4A and 4B achieves a desired control accuracy the output signal of a reduced control system y, as related to an optimal system x, by using the statistical criteria of the accuracy given above as:

$$M[(x-y)^2] \leq \epsilon^2 \tag{23}$$

The optimal output signal x has a constant dispersion $\sigma_x^2$ and the variable output signal y as a variable dispersion $\sigma_y^2$.

For a desired control accuracy $\epsilon$, the $\epsilon$-entropy $H_\epsilon(y)$ is a measure of the uncertainty in the measurement of the process y as related to the process x, where the processes x and y differ from each other in some metric by $\epsilon$.

The $\epsilon$-entropy $H_\epsilon(y)$ can be calculated as $$H_\varepsilon(y) = H(y) - \varepsilon \log n - \frac{1}{\varepsilon} - (1-\varepsilon) \log \frac{1}{1-\varepsilon} \tag{24}$$

where H(y) is the entropy of the process y and n is a number of point measurements in the process y. Further, $$H(y) = -\sum_{k=1}^{n} p_k \log p_k \tag{25}$$

where $p_k$ is the probability that one of the output values of the process y is equal to the value of the output values of the process x.

In general, the form of the $\epsilon$-entropy is defined as $$H_\varepsilon(y) = \inf_{p(x,y)} I(x, y) \tag{26}$$

with the accuracy $M[(x-y)^2] \leq \epsilon^2$.

In general, the amount of information, I(x,y), is given by $$I(x, y) = M\left[\log \frac{p(x, y)}{p(x)p(y)}\right] \tag{27}$$

When x and y are Gaussian process, then $$I(x, y) = \frac{1}{2} \log\left(1 + \frac{1}{(2+\sigma)\sigma}\right) \tag{28}$$

where $$\sigma = \frac{\sigma_y^2}{\sigma_x^2}$$

The amount of information, given by I(x,y), satisfies the inequality $$I(x,y) \geq H_\epsilon(y) \tag{29}$$

and, it may be seen that $$M[(x-y)^2] \geq [\epsilon_y(I(x,y))]^2 \tag{30}$$

where the function $\epsilon_y(I(x,y))$ is the inverse of $H_\epsilon(y)$ $$H_{\epsilon_y(H)}(y) = H \tag{31}$$

and thus $$\epsilon_y(I(x,y)) \leq \epsilon_y(H_\epsilon(y) = M[(x-y)^2] \tag{32}$$

Thus, it is possible to bound the mean-square error $M[(x-y)^2] \leq \epsilon_2$ from below by the known amount of information I(x,y).

The calculation of $$\max_{\sigma_y^2} I(x, y) \tag{33}$$

determines the reliability of the measurements of the process y, as related to the optimal process x, with the accuracy $$\epsilon_y(I(x,y)) \leq M[(x-y)^2] \leq \epsilon^2 \tag{34}$$

In equation (28), the amount of information I(x,y) in the process y as related to the process will have a maximal value $I_{max}$ when $\sigma_y^2 \to \sigma_y^2$. Moreover, at $I_{max}$, the probability p(x,y) of the similarity between the processes x and y is (p(y≈x)→1), and thus, the minimum value of $\epsilon^2$ is observed. The calculation of equation (33) for the control process y compensates for the loss of information, and minimized the statistical risk, caused by the reduction in the number of sensors.

Engine Control

Figure 6:
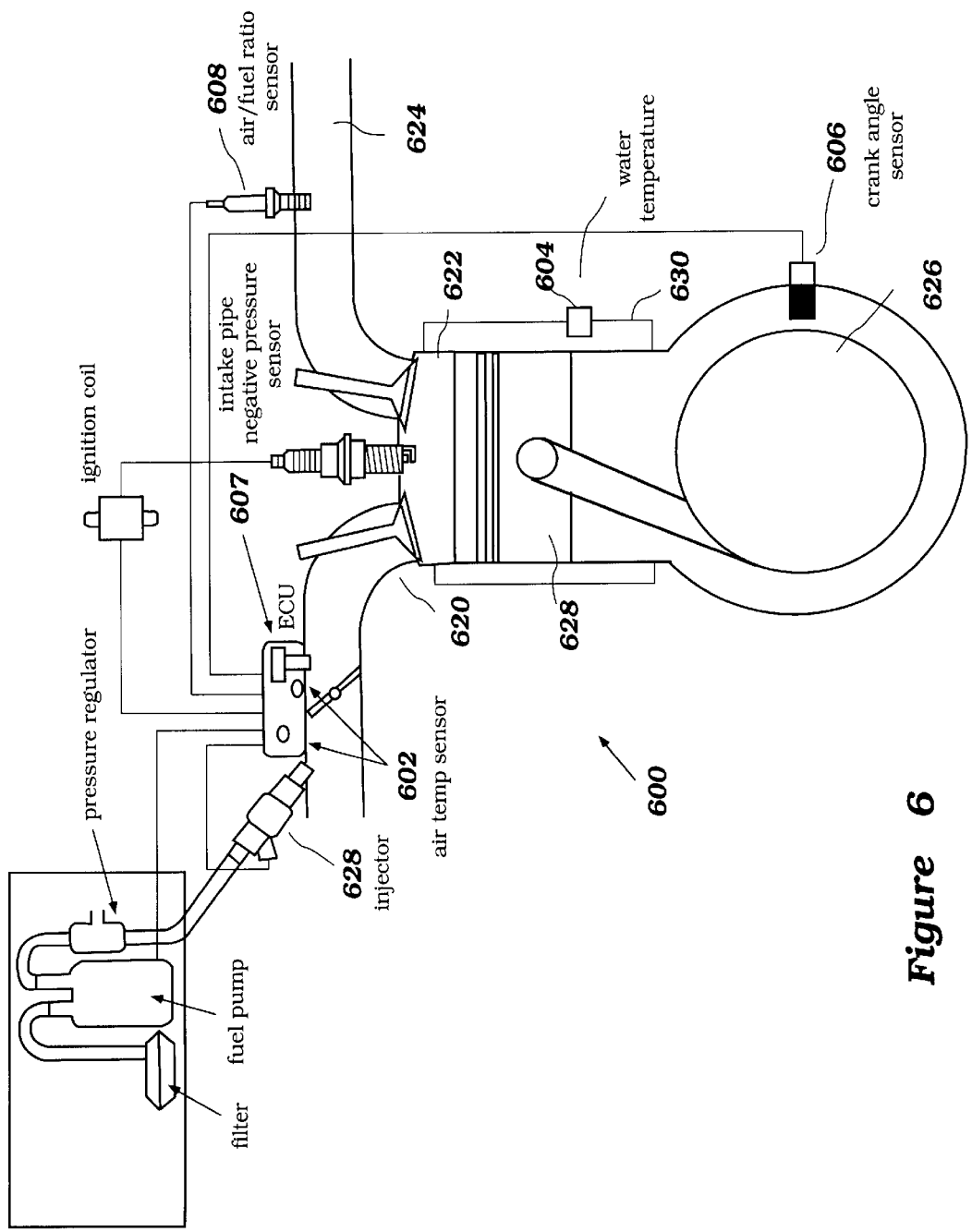
FIG. 6 is a diagram of an internal combustion piston engine with sensors.

In one embodiment, the reduced sensor, entropy-based, control system is applied to an engine control system, such as, for example, an internal combustion engine, a piston engine, a diesel engine, a jet engine, a gas-turbine engine, a rocket engine, etc. FIG. 6 shows an internal combustion piston engine having four sensors, an intake air temperature sensor 602, a water temperature sensor 604, a crank angle sensor 606, and an air-fuel ratio sensor 608. The air temperature sensor 602 measures the air temperature in an intake manifold 620. A fuel injector 628 provides fuel to the air in the intake manifold 620. The intake manifold 620 provides air and fuel to a combustion chamber 622. Burning of the fuel-air mixture in the combustion chamber 622 drives a piston 628. The piston 628 is connected to a crank 626 such that movement of the piston 628 turns the crank 626. The crank angle sensor 606 measures the rotational position of the crank 626. The water temperature sensor measures the temperature of water in a water jacket 630 surrounding the combustion chamber 622 and the piston 628. Exhaust gasses from the combustion chamber 622 are provided to an exhaust manifold 624 and the air-fuel ratio sensor 608 measures the ratio of air to fuel in the exhaust gases.

Figure 7:
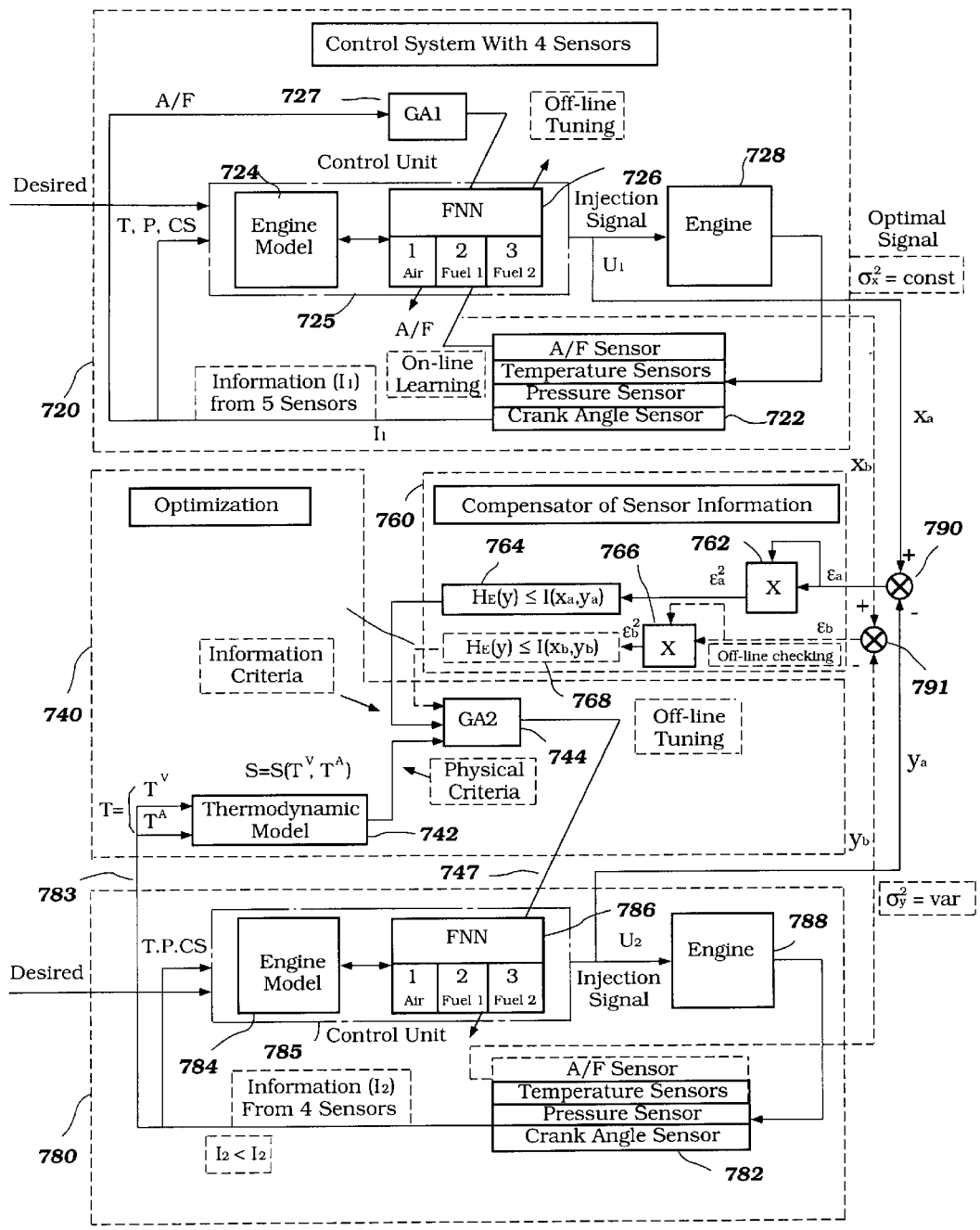
FIG. 7 is a block diagram of a control system for controlling the internal combustion piston engine shown in FIG. 6.

FIG. 7 is a block diagram showing a reduced control system 780 and an optimal control system 720. The optimal control system 720, together with an optimizer 740 and a sensor compensator 760 are used to teach the reduced control system 780. In FIG. 7, a desired signal (representing the desired engine output) is provided to an input of the optimal control system 720 and to an input of the reduced control system 780. The optimal control system 720, having five sensors, provides an optimal control signal $x_a$ and an sensor output signal $x_b$. A reduced control system 780 provides a reduced control output signal $y_a$, and an output sensor signal $y_b$. The signals $x_b$ and $y_b$ include data from the A/F sensor 608. The signals $x_b$ and $y_b$ are provided to first and second inputs of a subtractor 791. An output of the subtractor 791 is a signal $\epsilon_b$ where $\epsilon_b = x_b - y_b$. The signal $\epsilon_b$ is provided to a sensor input of a sensor compensator 760. The signals $x_a$ and $y_a$ are provided to first and second inputs of a subtractor 790. An output of the subtractor 790 is a signal $\epsilon_a$ where $\epsilon = x_a - y_a$. The signal $\epsilon_a$ is provided to a control signal input of the sensor compensator 760. A control information output of the sensor compensator 760 is provided to a control information input of the optimizer 740. A sensor information output of the sensor compensator 760 is provided to a sensor information input of the optimizer 740.

A sensor signal 783 from the reduced control system 780 is also provided to an input of the optimizer 740. An output of the optimizer 740 provides a teaching signal 747 to an input of the reduced control system 780.

The output signal $x_b$ is provided by an output of a sensor system 722 having five sensors, including, the intake air temperature sensor 602, the water temperature sensor 604, the crank angle sensor 606, the pressure sensor 607, and the air-fuel ratio (A/F) sensor 608. The information from the sensor system 722 is a group of signals having optimal information content $I_1$. In other words, the information $I_1$ is the information from the complete set of five sensors in the sensor system 722.

The output signal $x_a$ is provided by an output of a control unit 725. The control signal $x_a$ is provided to an input of an engine 728. An output of the engine 728 is provided to an input of the sensor system 722. Information $I_k$ from the A/F sensor 608 is provided to an online learning input of a fuzzy neural network (FNN) 726 and to an input of a first Genetic Algorithm (GA1) 727. Information $I_{k1}$ from the set of four sensors excluding the A/F sensor 608 is provided to an input of an engine model 724. An off-line tuning signal output from the algorithm GA1 727 is provided to an off-line tuning signal input of the FNN 726. A control output from the FNN 726 is a fuel injector the control signal $U_1$, which is provided to a control input of the engine 728. The signal $U_1$ is also the signal $x_a$. The engine model 724 and the FNN 726 together comprise an optimal control unit 725.

The sensor compensator 760 includes a multiplier 762, a multiplier 766, an information calculator 768, and an information calculator 764. The multiplier 762 and the information calculator 764 are used in online (normal) mode. The multiplier 766 and the information calculator 768 are provided for off-line checking.

The signal $\epsilon_a$ from the output of the adder 790 is provided to a first input of the multiplier 762 and to a second input of the multiplier 762. An output of the multiplier 762, being a signal $\epsilon_a^2$, is provided to an input of the information calculator 764. The information calculator 764 computes $H_a(y) \leq I(x_a, y_a)$. An output of the information calculator 764 is an information criteria for accuracy and reliability, $I(x_a, y_a) \rightarrow$ max.

The signal $\epsilon_b$ from the output of the adder 791 is provided to a first input of the multiplier 766 and to a second input of the multiplier 766. An output of the multiplier 764, being a signal $\epsilon_b^2$, is provided to an input of the information calculator 768. The information calculator 768 computes $H_b(y) \leq I(x_b, y_b)$. An output of the information calculator 768 is an information criteria for accuracy and reliability, $I(x_b, y_b) \rightarrow$ max.

The optimizer 740 includes a second Genetic Algorithm (GA2) 744 and a thermodynamic (entropy) model 742. The signal $I(x_a,y_b) \rightarrow$ max from the information calculator 764 is provided to a first input of the algorithm (GA2) 744 in the optimizer 740. An entropy signal $S \rightarrow$ min is provided from an output of the thermodynamic model 742 to a second input of the algorithm GA2 744. The signal $I(x_b,y_b) \rightarrow$ max from the information calculator 768 is provided to a third input of the algorithm (GA2) 744 in the optimizer 740.

The signals $I(x_a,y_a) \rightarrow$ max and $I(x_b,y_b) \rightarrow$ max provided to the first and third inputs of the algorithm (GA2) 744 are information criteria, and the entropy signal $S(k_2) \rightarrow$ min provided to the second input of the algorithm GA2 744 is a physical criteria based on entropy. An output of the algorithm GA2 744 is a teaching signal for the FNN 786.

The reduced control system 780 includes a reduced sensor system 782, an engine model 744, the FNN 786, and an engine 788. The reduced sensor system 782 includes all of the engine sensors in the sensor system 722 except the A/F sensor 608. When run in a special off-line checking mode, the sensor system 782 also includes the A/F sensor 608. The engine model 744 and the FNN 786 together comprise a reduced control unit 785. An output of the engine 788 is provided to an input of the sensor set 782. An $I_2$ output of the sensor set 782 contains information from four engine sensors, such that $I_2 < I_1$. The information $I_2$ is provided to an input of the control object model 784, and to an input of the thermodynamic model 742. The teaching signal 747 from the algorithm GA2 744 is provided to a teaching signal input of the FNN 786. A control output from the FNN 786 is an injector control signal $U_2$, which is also the signal $y_a$.

Figure 5B:
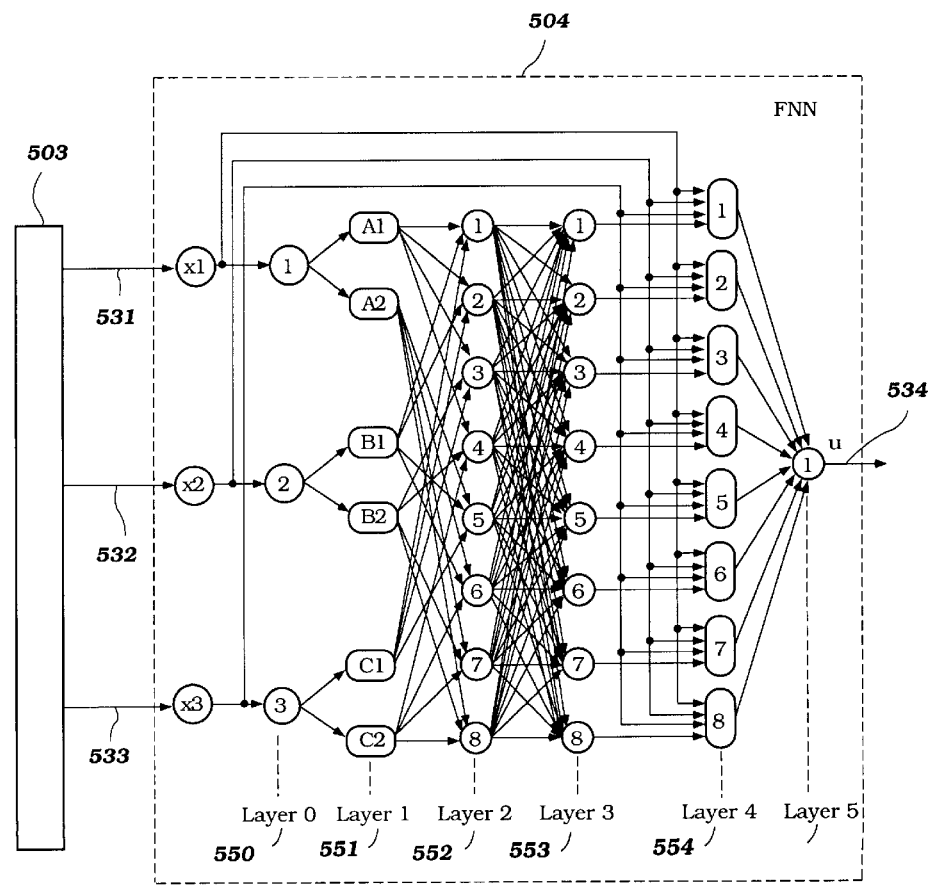
FIG. 5B is a computing block diagram of the fuzzy logic controller shown in FIG. 5A.

Operation of the system shown in FIG. 7 is in many respects similar to the operation of the system shown in FIGS. 4A, 4B, and 5B.

The thermodynamic model 742 is built using the thermodynamic relationship between entropy production and temperature information from the water temperature sensor 604 ($T^W$) and the air temperature sensor 602 ($T^A$). The entropy production $S(T^W, T^A)$, is calculated using the relationship $$S = c \frac{\left[\ln\left(\frac{T^W}{T^A}\right)\right]^2}{\Delta \tau - \ln\left(\frac{T^W}{T^A}\right)} \tag{35}$$

where $\Delta \tau$ is the duration of a finite process.

The engine model 744 is analyzed from a thermodynamic point of view as a steady-state model where the maximum work, which is equal to the minimum entropy production, is delivered from a finite resource fluid and a bath. Moreover, the engine model is analyzed as a dissipative, finite-time, generalization of the evolutionary Carnot problem in which the temperature driving force between two interacting subsystems varies with the constant time $\Delta \tau$ (a reversible cycle).

The presence of reversible cycles fixes, automatically, the first-law efficiency of each infinitesimal stage at the Carnot level $$\eta = 1 - \frac{T^e}{T} \tag{36}$$

where T is the instantaneous temperature of a finite resource (such as the water temperature) and $T^e$ is the temperature of the environment or an infinite bath (such as the air temperature). The unit mass of a resource releases the heat dq=−cdT, where c is the specific heat. The classical rate and duration-dependent function of available energy (dissipative energy) $E_x$ follows by integration of the product $$-c\eta dT = -c\left(1 - \frac{T^e}{T}\right)dT \tag{37}$$

between the limits T and $T^e$. The integration yields the well known expression $$W = \int_T^{T^e} c\left(1 - \frac{T^e}{T}\right)dT = \Delta h - T^e \Delta s \tag{38}$$

The problem becomes non-trivial in the case where a finite-rate process is considered, because in the finite-rate process, the efficiency differs from the Carnot efficiency. The finite-rate efficiency should be determined before the integration of the product −cdT can be evaluated. The integration then leads to a generalized available energy associated with the extremal release of the mechanical work in a finite time.

The local efficiency of an infinitesimal unit of the finite-rate process is $$\eta = \frac{dW}{dQ_1} \tag{39}$$

where $Q_1$ is the cumulative heat flux flowing from the upper reservoir. A flux $Q_2$ is the cumulative heat flux flowing to the lower reservoir. While this local first-law efficiency is still described by the Carnot formula $$\eta = 1 - \frac{T_2'}{T_1'} \tag{40}$$

were $T_1 \leq T_1' \leq T_2' \leq T_2$, this efficiency is nonetheless lower than the efficiency of the unit working between the boundary temperatures $T^1$ and $T_2 = T^e$, as the former applies to the intermediate temperatures $T_1'$ and $T_2'$. By solving equation (40) along with the reversible entropy balance of the Carnot differential subsystem $$\frac{d\gamma_1(T_1 - T_1')}{T_1'} = \frac{d\gamma_2(T_2 - T_2')}{T_2'} \tag{41}$$

one obtains the primed temperatures as functions of the variables $T_1$, $T_2=T^e$ and $\eta$. In equation (41), the parameters $\gamma_1$, and $\gamma_2$ are the partial conductances, and thus link the heat sources with the working fluid of the engine at high and low temperatures. The differentials of the parameters $\gamma$ and $\gamma_2$ can be expressed as $d\gamma_i = \alpha_i dA_i$, for i=1,2, where the values $\alpha_i$ are the heat transfer coefficients and the values $dA_i$ are the upper and lower exchange surface areas.

The associated driving heat flux $dQ_1 = dy_1(T_1 - T'_1)$ is then found in the form $$dQ_1 = d\gamma \left[ T_1 - \frac{1}{(1-\eta)} T_2 \right] \tag{42}$$

from which the efficiency-power characteristic follows in the form $$\eta = 1 - \frac{T_2}{T_1 - \frac{dQ_1}{d\gamma}} \tag{43}$$

From the energy balance of the driving fluid, the heat power variable $Q_1$ satisfies $dQ = -GcdT$, where $dT$ is the differential temperature drop of the driving fluid, G is the finite-mass flux of the driving fluid whose constant specific heat capacity equals c. Using the above definitions, and the differential heat balance of the driving fluid, the control term $dQ_1/d\gamma$ from equation (43) may be written (with the subscript 1 omitted) as $$\frac{dQ}{d\gamma} = \frac{dT}{d\tau} \tag{44}$$

The negative of the derivative dQ/dγ is the control variable u of the process. In short, the above equation says that $u=\dot{T}$, or that the control variable u equals the rate of the temperature change with respect to the non-dimensional time τ. Thus, equation (43) becomes the simple, finite-rate generalization of the Carnot formula $$\eta = 1 - \frac{T^e}{T + \dot{T}} \tag{45}$$

When $T > T^e$ then the derivative $\dot{T}$ is negative for the engine mode. This is because the driving fluid releases the energy to the engine as part of the work production.

Work Functionals for an Infinite Sequence of Infinitesimal Processes

The cumulative power delivered per unit fluid flow WIG is obtained by the integration of the product of n and dQ/G=−cdT between an arbitrary initial temperature $T^i$ and a final temperature $T^f$ of the fluid. This integration yields the specific work of the flowing fluid in the form of the functional $$W_{[T^i,T^f]} \equiv \frac{W}{G} = -\int_{T^i}^{T^f} c\left(1 - \frac{T^e}{T+\dot{T}}\right)\dot{T}d\tau \tag{46}$$

The notation $[T^i, T^f]$ means the passage of the vector $T \equiv (T,\tau)$ from its initial state to its final state. For the above functional, the work maximization problem can be stated for the engine mode of the process by $$W_{max} = \max\left\{ -\int_{T^i}^{T^f} L(T,\dot{T})d\tau \right\} \tag{47}$$

$$= \max\left\{ -\int_{T^i}^{T^f} c\left(1 - \frac{T^e}{T+\dot{T}}\right)\dot{T}d\tau \right\}$$

In equation (47), the function $L(T,\dot{T})$ is the Lagrangian. The above Lagrangian functional represents the total power per unit mass flux of the fluid, which is the quantity of the specific work dimension, and thus the direct relation to the specific energy of the fluid flow. In the quasi-static limit of vanishing rates, where $dT/d\tau=0$, the above work functional represents the change of the classical energy according to equation (38).

For the engine mode of the process, the dissipative energy itself is obtained as the maximum of the functional in equation (47), with the integration limits $T=T^e$ and $T^f=T$.

An alternative form of the specific work can be written as the functional $$W_{[T^i,T^f]} \equiv \frac{W}{G} = \int_{T^i}^{T^f} -c\left(1 - \frac{T^e}{\dot{T}}\right)d\tau - T^e \int_{T^i}^{T^f} c\frac{\dot{T}^2}{T(T+\dot{T})} \tag{48}$$

$$= -\int_{T^i}^{T^f} c\left(1 - \frac{T^e}{\dot{T}}\right)dT - T^e S$$

in which the first term is the classical "reversible" term and the second term is the product of the equilibrium temperature and the entropy production S, where $$S = \int_{T^i}^{T^e} c\frac{\dot{T}^2}{T(T+\dot{T})}d\tau \tag{49}$$

The entropy generation rate is referred here to the unit mass flux of the driving fluid, and thus to the specific entropy dimension of the quantity S. The quantity S is distinguished from the specific entropy of the driving fluid, s in equation (38). The entropy generation S is the quadratic function of the process rate, u=dT/dτ, only in the case when the work is not produced, corresponding to the vanishing efficiency η=0 or the equality $T+\dot{T}=T^e$. For the activity heat transfer (non-vanishing η) case, the entropy production appears to be a non-quadratic function of rates, represented by the integrand of equation (48). Applying the maximum operation for the functional in equation (48) at the fixed temperatures and times, it is seen that the role of the first term (i.e., the potential term) is inessential, and the problem of the maximum released work is equivalent to the associated problem of the minimum entropy production. This confirms the role of the entropy generation minimization in the context of the extremum work problem. The consequence of the conclusion is that a problem of the extremal work and an associated fixed-end problem of the minimum entropy generation have the same solutions.

Hamilton-Jacobi Approach to Minimum Entropy Generation

The work extremization problems can be broken down to the variational calculus for the Lagrangian $$L = c\left(1 - \frac{T^e}{\dot{T} - T}\right)\dot{T} \qquad (50)$$

The Euler-Lagrangian equations for the problem of extremal work and the minimum entropy production lead to a second-order differential equation $$T\ddot{T} - \dot{T}^2 = 0 \qquad (51)$$

which characterizes the optimal trajectories of all considered processes. A first integral of the above equation provides a formal analog of the mechanical energy as $$E \equiv \frac{\partial L}{\partial \dot{T}} - L = cT^e \frac{\dot{T}^2}{(\dot{T}+T)^2} \qquad (52)$$

An equation for the optimal temperature flow from the condition E=h in equation (38) is given by $$\dot{T} = \frac{\pm T\sqrt{\frac{h}{cT^e}}}{1 - \pm\sqrt{\frac{h}{cT^e}}} \equiv \xi T \qquad \text{where} \qquad \xi = \frac{\ln\frac{T^f}{T^i}}{\tau^f - \tau^i} \qquad (53)$$

The power of dynamic programming (DP) methods when applied to problems of this sort lies in the fact that regardless of local constraints, functions satisfy an equation of the Hamilton-Jacobi-Bellman (HJB-equation) with the same state variables as those for the unconstrained problem. Only the numerical values of the optimizing control sets and the optimal performance functions differ in constrained and unconstrained cases.

The engine problem may be correctly described by a backward HJB-equation. The backward HJB-equation is associated with the optimal work or energy as an optimal integral function I defined on the initial states (i.e., temperatures), and, accordingly, refers to the engine mode or process approaching an equilibrium. The function I is often called the optimal performance function for the work integral.

The maximum work delivery (whether constrained or unconstrained) is governed by the characteristic function $$I(\tau^f, T^f, \tau^i, T^i) \equiv \max W_{[T^i,T^f]} \qquad (54)$$

$$= \max\left\{\int_{T^i}^{T^f}\left[-c\left(1 - \frac{T^e}{T+u}\right)u\right]d\tau\right\}$$

The quantity I in equation (54) describes the extremal value of the work integral $W(T^i, T^f)$ It characterizes the extremal value of the work released for the prescribed temperatures $T^i$ and $T^f$ when the total process duration is $\tau^n-\tau^i$. While the knowledge of the characteristic function I only is sufficient for a description of the extremal properties of the problem, other functions of this sort are nonetheless useful for characterization of the problem.

Here the problem is transformed into the equivalent problem in which one seeks the maximum of the final work coordinate $x^f_o=W^f$ for the system described by the following set of differential equations $$\frac{dW}{d\tau} = -c\left(1 - \frac{T^e}{u+T}\right)u \equiv f_0(T, u) \qquad (55)$$

$$\frac{dT}{d\tau} = u \equiv f_1(T, u)$$

$$\frac{dx_2}{d\tau} = 1 \equiv f_2(T, u)$$

The state of the system described by equations (55) is described by the enlarged state vector $X=(x_0, x_1, x_2)$ which is composed of the three state coordinates $x_0=W$, $x_1=T$, and $x_2=\tau$. At this point, it is convenient to introduce a set of optimal performance functions $\Theta^i$ and $\Theta^f$ corresponding to the initial and final work coordinates, respectively. The function $\Theta^i$ works in a space of one dimension larger than I, involves the work coordinate $x_0=W$, and is defined as $$\max_{u} W^f \equiv \Theta^i(W^i,\tau^i,T^i,\tau^f,T^f) = W^i + I(\tau^i,T^i,\tau^f,T^f) \qquad (56)$$

A function V is also conveniently defined in the enlarged space of variables as $$V = W^f - \Theta^i(W^i,\tau^i,T^i,\tau^f,T^f) = W^f - W^i - I(\tau^i T^i,\tau^f,T^f) \qquad (57)$$

Two mutually equal maxima at the constant $W^i$ and at the constant $W^f$ are described by the extremal functions $$V^i(W^i,\tau,T^i,\tau^f,T^f) = V^f(\tau^i,T^i,W^f,\tau^f,T^f) \equiv 0 \qquad (58)$$

which vanish identically along all optimal paths. These functions can be written in terms of a wave-function V as follows:

$$\max V = \max\{W^f - W^i - I(\tau^f,T^f,\tau^i,T^i)\} = 0 \qquad (59)$$

The equation for the integral work function I in the narrow space of the coordinates (T,τ), which does not involve the coordinates W, follows immediately from the condition V=0. (Development of the backward DP algorithm and equations for $\Theta^i(X^i)$ are provided later in the discussion that follows.)

Solution of the HJB equations begins by noting that the system of three state equations in equation (55) have the state variables $x_0=W$, $x_1=T$ and $x_2=\tau$. The state equations from equation (55) can be in a general form as $$\frac{dx_\beta}{d\tau} = f_\beta(x, u), \beta = 0, 1, 2 \quad (60)$$

For small $\Delta\tau$, from equation (60) it follows that $$\Delta x_\beta = f_\beta(x,u)\Delta\tau + O(\epsilon^2) \quad (61)$$

In equation (61), the symbol $O(\epsilon^2)$ means second-order and higher terms. The second-order and higher terms posses the property that $$\lim_{\Delta\tau \to 0} \frac{O(\varepsilon^2)}{\Delta\tau} \to 0. \quad (62)$$

The optimal final work for the whole path in the interval $[\tau^i, \tau^f]$ is the maximum of the criterion $$W^f = \Theta^i(x^i + \Delta x) = \Theta^i(W^i + \Delta W, T^i + \Delta T, \tau^i + \Delta\tau) \quad (63)$$

Expanding equation (63) in a Taylor series yields $$W^f = \Theta^i(X^i) + \frac{\partial \Theta^i}{\partial X_\beta^i}\Delta X_\beta + O(\varepsilon^2) \quad (64)$$

$$= \Theta^i\left(W^i, T^i, \tau^i\right) + \frac{\partial \Theta^i}{\partial W^i}\Delta W + \frac{\partial \Theta^i}{\partial T^i}\Delta T + \frac{\partial \Theta^i}{\partial \tau^i}\Delta\tau + O(\varepsilon^2)$$

Substituting equation (62) into equation (64) and performing an appropriate extremization in accordance with Bellman's principle of optimality, yields, for the variation of the initial point $$\max_{u^i} W^f = \max_{u^i}\left\{\Theta^i(X^i) + \frac{\partial \Theta^i}{\partial X_\beta^i}f_\beta(X, u)\Delta\tau + O(\varepsilon^{2})\right\} \quad (65)$$

After reduction of $\Theta^i$, and the division of both sides of equation (65) by $\Delta\tau$, the passage to the limit $\Delta\tau \to 0$ subject to the condition $$\lim_{\Delta\tau \to 0} \frac{O(\varepsilon^2)}{\Delta t} \to 0 \quad (66)$$

yields the backward HJB equation of the optimal control problem. For the initial point of the extremal path, the backward DP equation is $$\max\left\{\frac{\partial \Theta^i}{\partial X_{\beta_{u^i}}^i}f_\beta(X, u)\right\} = \max\left\{\frac{\partial \Theta^i}{\partial W^i}\dot{W}^i(T^i, u^i) + \frac{\partial \Theta^i}{\partial T^i}\dot{T}^i(T^i, u^i) + \frac{\partial \Theta^i}{\partial \tau^i}\right\} \quad (67)$$

$$= \max\left\{\frac{d\Theta^i}{dT^i}\right\} = -\min_{u^i}\left\{\frac{dV}{d\tau^i}\right\}$$

$$= \max\left\{\frac{dV}{d(-\tau^i)}\right\} = 0$$

The properties of $V = W^i - \Theta^i$ have been used in the second line of the above equation.

The partial derivative of V with respect to the independent variable $\tau$ can remain outside of the bracket of this equation as well. Using the relationships $$\frac{\partial V}{\partial W^i} = -\frac{\partial \Theta^i}{\partial W^i} = -1 \quad (68)$$

and $\dot{W} = f_0 = -L$ (see e.g., equations (47) and (50)), leads to the extremal work function $$\frac{\partial V}{\partial \tau^i} + \min_{u^i}\left\{\frac{\partial V}{\partial T^i}u^i + L^i(T^i, u^i)\right\} = 0 \text{ (max}W^f) \quad (69)$$

In terms of the integral function of optimal work, $I = W^f - W^i - V$, equation (69) becomes $$\frac{\partial I}{\partial \tau^i} + \min_{u^i}\left\{\frac{\partial I}{\partial T^i}u^i + f_0(T^i, u^i)\right\} = 0 \quad (70)$$

As long as the optimal control u is found in terms of the state, time, and gradient components of the extremal performance function I, the passage from the quasi-linear HJB equation to the corresponding nonlinear Hamilton-Jacobi equation is possible.

The maximization of equation (70) with respect to the rate u leads to two equations, the first of which describes the optimal control u expressed through the variables T and $z = \partial I/\partial T$ as follows:

$$\frac{\partial I}{\partial T} = -\frac{\partial f_0(T, u)}{\partial u} \quad (71)$$

and the second is the original equation (70) without the extremization sign $$\frac{\partial I}{\partial \tau} + \frac{\partial I}{\partial T}u + f_0(T, u) = 0 \quad (72)$$

In the proceeding two equations, the index i is omitted. Using the momentum-tape variable $z = \partial I/\partial T$, and using equation (71) written in the form $$z = -\frac{\partial f_0(T, u)}{\partial u} = \frac{\partial L(T, u)}{\partial u} \quad (73)$$

leads to the energy-type Hamiltonian of the extremal process as $$H = zu(z,T) + f_0(z,T) \quad (74)$$

Using the energy-type Hamiltonian and equation and equation (72) leads to the Hamilton-Jacobi equation for the integral I as $$\frac{\partial I}{\partial \tau} + H\left(T, \frac{\partial I}{\partial \tau}\right) = 0 \quad (75)$$

Equation (75) differs from the HJB equation in that equation (75) refers to an external path only, and H is the extremal Hamiltonian. The above formulas are applied to the concrete a Lagrangian $L = -f_0$, where $f_0$ is the intensity of the mechanical work production.

The basic integral $W_{[T^i, \tau^f]}$ written in the form of equation (47)

$$W_{max} = \max\left\{-\int_{T^i}^{T^f} L(T, \dot{T}) d\tau\right\} \tag{76}$$

$$= \max\left\{-\int_{\tau^i}^{\tau^f} c\left(1 - \frac{T^e}{T + \dot{T}}\right) \dot{T} d\tau\right\}$$

whose extremal value is the function $I(T^i,\tau^i,T^f,\tau^f)$. The momentum-like variable (equal to the temperature adjoint) is then $$z \equiv -\frac{\partial f_0}{\partial u} = c\left(1 - \frac{T^e T}{(T + u)^2}\right) \tag{77}$$

and $$u = \left(\frac{T^e T}{1 - \frac{z}{c}}\right)^{1/2} - T \tag{78}$$

The Hamilton-Jacobi partial differential equation for the maximum work problem (engine mode of the system) deals with the initial coordinates, and has the form $$\frac{\partial I}{\partial \tau} + H\left(T, \frac{\partial I}{\partial \tau}\right) = 0 \tag{79}$$

$$H\left(T, \frac{\partial I}{\partial T}\right) = c\left[\sqrt{T^e} - \sqrt{T\left(1 - \frac{1}{c}\frac{\partial I}{\partial T}\right)}\right]^2$$

The variational front-end problem for the maximum work W is equivalent to the variational fixed-end problem of the minimum entropy production.

Hamilton-Jacobi Approach to Minimum Entropy Production

The specific entropy production is described by the functional from equation (49) as $$S_\sigma = \int_0^{\tau^f} L_\sigma d\tau = \int_0^{\tau^f} c\frac{u^2}{T(T+u)} d\tau \tag{80}$$

The minimum of the functional can be described by the optimal function $I_\sigma(T^i,\tau^i,T^f,\tau^f))$ and the Hamilton-Jacobi equation is then $$\frac{\partial I_\sigma}{\partial \tau} + H_\sigma = 0 \tag{81}$$

$$H_\sigma = c\left[1 - \sqrt{1 - \frac{1}{c}T\frac{\partial I_\sigma}{\partial T}}\right]^2$$

The two functionals (that of the work and that of the entropy generation) yield the same extremal.

Considering the Hamilton-Jacobi equation for the engine, from equation (54) integration along an extremal path leads to a function which describes the optimal specific work $$I(T^i, T^f, \tau^i, \tau^f) = c(T^f - T^i) - \frac{T^e}{1+\xi}\ln\frac{T^i}{T^f} \tag{82}$$

where the parameter $\xi$ is defined in equation (53). The extremal specific work between two arbitrary states follows in the form $$I(T^i, T^f, \tau^i, \tau^f) = c(T^i - T^f) - cT^e\ln\frac{T^i}{T^f} - cT^e\frac{\left[\ln\frac{T^i}{T^f}\right]^2}{\tau^f - \tau^i - \ln\frac{T^i}{T^f}} \tag{83}$$

From equation (83), with $T^i=T^W$ and $T^f=T^A$, then the minimal integral of the entropy production is $$S_\sigma = c\frac{\left[\ln\frac{T^W}{T^A}\right]^2}{\Delta\tau - \left[\ln\frac{T^W}{T^A}\right]}, \text{ where } \Delta\tau = \tau^f - \tau^i \tag{84}$$

The function from equation (83) satisfies the backward Hamilton-Jacobi equation, which is equation (79), and the function (84) satisfies the Hamilton-Jacobi equation (81).

The Lyapunnov function $\Im$ for the system of equation (60) can be defined as $$\Im = \frac{1}{2}\sum_{\beta=1}^{3} x_\beta^2 + \frac{1}{2}S^2 \tag{85}$$

and $$\frac{d\Im}{d\tau} = \sum_{\beta=1}^{3} x_\beta f_\beta + (S_u - S_c)\left(\frac{dS_u}{d\tau} - \frac{dS_c}{d\tau}\right) \tag{86}$$

The relation (86) is the necessary and sufficient conditions for stability and robustness; of control with minimum entropy in the control object and the control system.

Suspension Control

In one embodiment, the reduced control system of FIGS. 4A and 4B is applied to a suspension control system, such as, for example, in an automobile, truck, tank, motorcycle, etc.

Figure 8:
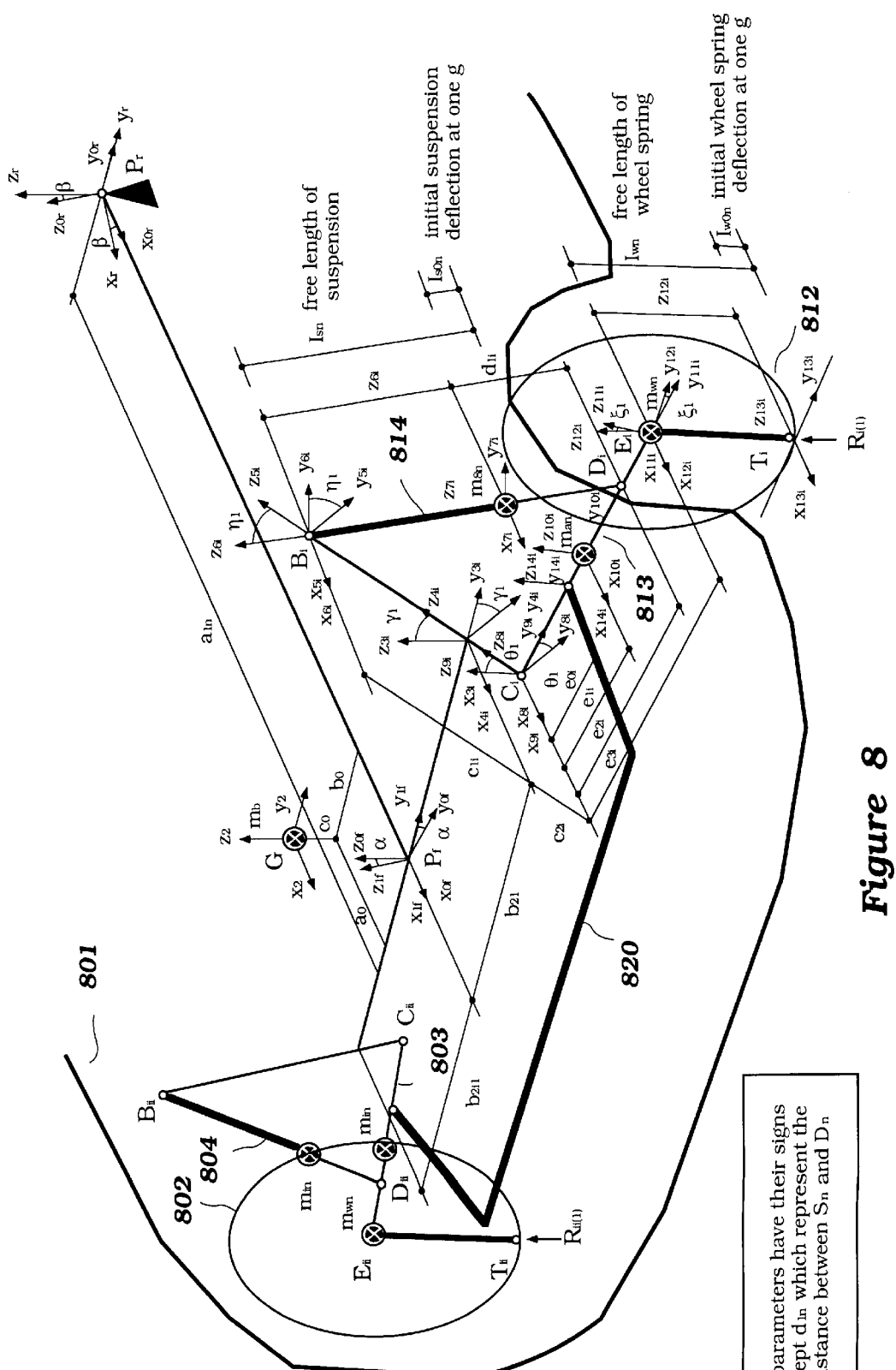
FIG. 8 is a schematic diagram of one half of an automobile suspension system.

FIG. 8 is a schematic diagram of one half of an automobile suspension system. In FIG. 8, a right wheel 802 is connected to a right axle 803. A spring 804 controls the angle of the axle 803 with respect to a body 801. A left wheel 812 is connected to a left axle 813 and a spring 814 controls the angle of the axle 813. A torsion bar 820 controls the angle of the left axle 803 with respect to the right axle 813.

Figure 9:
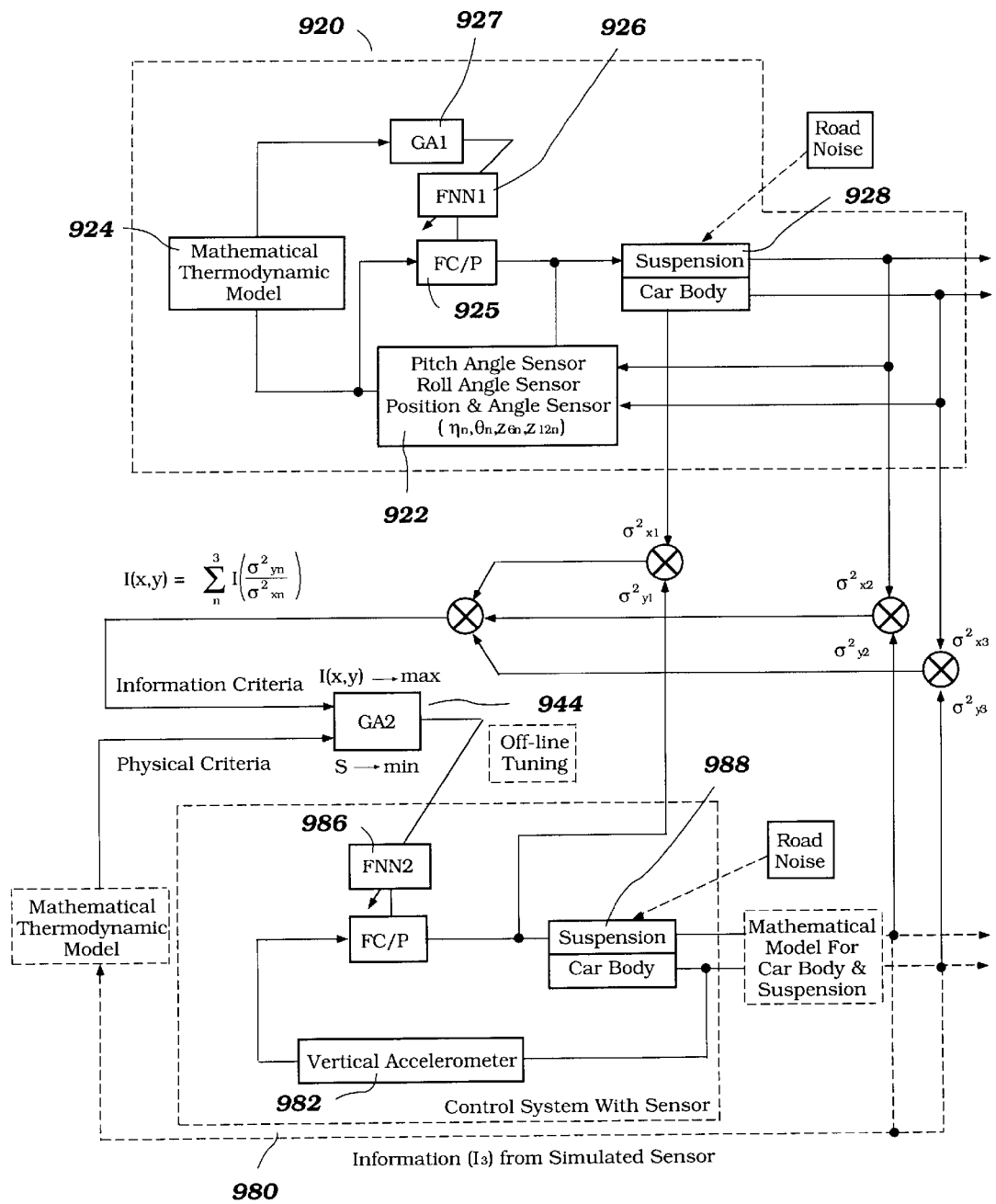
FIG. 9 is a block diagram of a control system for controlling the automobile suspension system shown in FIG. 8.

FIG. 9 is a block diagram of a control system for controlling the automobile suspension system shown in FIG. 8. The block diagram of FIG. 9 is similar to the diagram of FIG. 4B showing an optimal control system and a reduced control system 980.

The optimal control system 920 includes an optimal sensor system 922 that provides information $I_1$ to an input of a control object model 924. An output of the control object model 924 is provided to a first genetic analyzer GA1 927, and the GA1 927 provides an off-line tuning signal to a first fuzzy neural network FNN1 926. An output from the FNN1 926, and an output from the optimal sensor system 922 are provided to a control unit 925. An output from the control unit 925 is provided to a control object 928. The control object 928 is the automobile suspension and body shown in FIG. 8.

The reduced control system 980 includes a reduced sensor system 982 that provides reduced sensor information $I_2$ to an input of a control unit 985. The control unit 985 is configured by a second fuzzy neural network FNN2 986. An output from the control unit 985 is provided to a control object 988. The control object 988 is also the automobile suspension and body shown in FIG. 8.

The FNN2 986 is tuned by a second genetic analyzer GA2, that, (like the GA2 444 in FIG. 4.) maximizes an information signal I(x,y) and minimizes an entropy signal S. The information signal I(x,y) is computed from a difference between the control and sensor signals produced by the optimum control system 920 and the reduced control system 980. The entropy signal :S is computed from a mathematical model of the control object 988.

The optimal sensor system 922 includes a pitch angle sensor, a roll angle sensor, four position sensors, and four angle sensors as described below.

The reduced sensor system 922 includes a single sensor, a vertical accelerometer placed near the center of the vehicle 801.

A Half Car Coordinate Transformation

1. Description of transformation matrices 1.1 Global reference coordinate $x_r, y_r, z_y\{r\}$ is assumed to be at the pivot center $P_r$ of a rear axle.

The following are the transformation matrices to describe the local coordinates for:
- $\{2\}$ the gravity center of the body.
- $\{7\}$ the gravity center of the suspension.
- $\{10\}$ the gravity center of the arm.
- $\{12\}$ the gravity center of the wheel.
- $\{13\}$ the touch point of the wheel to the road.
- $\{14\}$ the stabilizer linkage point.

1.2 Transformation matrices.

Rotating $\{r\}$ along $y_r$ with angle $\beta$ makes a local coordinate system $x_{0r}, y_{0r}, z_{0r}\{0r\}$ with a transformation matrix $^r_{0r}T$.

$$^r_{0r}T = \begin{bmatrix} \cos\beta & 0 & \sin\beta & 0 \\ 0 & 1 & 0 & 0 \\ -\sin\beta & 0 & \cos\beta & 0 \\ 0 & 0 & 0 & 1 \end{bmatrix} \quad (87)$$

Transferring $\{0r\}$ through the vector $(a_1, 0, 0)$ makes a local coordinate system $x_{0f}, y_{0f}, z_{0f}\{0f\}$ with a transformation matrix $^{0r}_{0f}T$.

$$^{0r}_{0f}T = \begin{bmatrix} 1 & 0 & 0 & a_1 \\ 0 & 1 & 0 & 0 \\ 0 & 0 & 1 & 0 \\ 0 & 0 & 0 & 1 \end{bmatrix} \quad (88)$$

The above procedure is repeated to create other local coordinate systems with the following transformation matrices.

$$^{0f}_{1f}T = \begin{bmatrix} 1 & 0 & 0 & 0 \\ 0 & \cos\alpha & -\sin\alpha & 0 \\ 0 & \sin\alpha & \cos\alpha & 0 \\ 0 & 0 & 0 & 1 \end{bmatrix} \quad (89)$$

$$^{1f}_{2}T = \begin{bmatrix} 1 & 0 & 0 & a_0 \\ 0 & 1 & 0 & b_0 \\ 0 & 0 & 1 & c_0 \\ 0 & 0 & 0 & 1 \end{bmatrix} \quad (90)$$

1.3 Coordinates for the front wheels 802, 812 (index n:i for the left, ii for the right) are generated as follows.

Transferring $\{1f\}$ through the vector $(0, b_{2n}, 0)$ makes local coordinate system $x_{3n}, y_{3n}, z_{3n}\{3n\}$ with transformation matrix $^{1f}_{3n}T$.

$$^{1f}_{3n}T = \begin{bmatrix} 1 & 0 & 0 & 0 \\ 0 & 1 & 0 & b_{2n} \\ 0 & 0 & 1 & 0 \\ 0 & 0 & 0 & 1 \end{bmatrix} \quad (91)$$

$$^{3n}_{4n}T = \begin{bmatrix} 1 & 0 & 0 & 0 \\ 0 & \cos\gamma_n & -\sin\gamma_n & 0 \\ 0 & \sin\gamma_n & \cos\gamma_n & 0 \\ 0 & 0 & 0 & 1 \end{bmatrix} \quad (92)$$

$$^{4n}_{5n}T = \begin{bmatrix} 1 & 0 & 0 & 0 \\ 0 & 1 & 0 & 0 \\ 0 & 0 & 1 & c_{1n} \\ 0 & 0 & 0 & 1 \end{bmatrix} \quad (93)$$

$$^{5n}_{6n}T = \begin{bmatrix} 1 & 0 & 0 & 0 \\ 0 & \cos\eta_n & -\sin\eta_n & 0 \\ 0 & \sin\eta_n & \cos\eta_n & 0 \\ 0 & 0 & 0 & 1 \end{bmatrix} \quad (94)$$

$$^{6n}_{7n}T = \begin{bmatrix} 1 & 0 & 0 & 0 \\ 0 & 1 & 0 & 0 \\ 0 & 0 & 1 & z_{6n} \\ 0 & 0 & 0 & 1 \end{bmatrix} \quad (95)$$

$$^{4n}_{8n}T = \begin{bmatrix} 1 & 0 & 0 & 0 \\ 0 & 1 & 0 & 0 \\ 0 & 0 & 1 & c_{2n} \\ 0 & 0 & 0 & 1 \end{bmatrix} \quad (96)$$

$$^{8n}_{9n}T = \begin{bmatrix} 1 & 0 & 0 & 0 \\ 0 & \cos\theta_n & -\sin\theta_n & 0 \\ 0 & \sin\theta_n & \cos\theta_n & 0 \\ 0 & 0 & 0 & 1 \end{bmatrix} \quad (97)$$

$$^{9n}_{10n}T = \begin{bmatrix} 1 & 0 & 0 & 0 \\ 0 & 1 & 0 & e_{1n} \\ 0 & 0 & 1 & 0 \\ 0 & 0 & 0 & 1 \end{bmatrix} \quad (98)$$

$$^{9n}_{11n}T = \begin{bmatrix} 1 & 0 & 0 & 0 \\ 0 & 1 & 0 & e_{3n} \\ 0 & 0 & 1 & 0 \\ 0 & 0 & 0 & 1 \end{bmatrix} \quad (99)$$

$$^{11n}_{12n}T = \begin{bmatrix} 1 & 0 & 0 & 0 \\ 0 & \cos\zeta_n & -\sin\zeta_n & 0 \\ 0 & \sin\zeta_n & \cos\zeta_n & 0 \\ 0 & 0 & 0 & 1 \end{bmatrix} \quad (100)$$

$$^{12n}_{13n}T = \begin{bmatrix} 1 & 0 & 0 & 0 \\ 0 & 1 & 0 & 0 \\ 0 & 0 & 1 & z_{12n} \\ 0 & 0 & 0 & 1 \end{bmatrix} \quad (101)$$

$$^{9n}_{14n}T = \begin{bmatrix} 1 & 0 & 0 & 0 \\ 0 & 1 & 0 & e_{0n} \\ 0 & 0 & 1 & 0 \\ 0 & 0 & 0 & 1 \end{bmatrix} \quad (102)$$

1.4 Some matrices are sub-assembled to make the calculation simpler.

$$^r_{1f}T = ^r_{0r}T^{0r}_{0f}T^{0f}_{1f}T \quad (103)$$

$$= \begin{bmatrix} \cos\beta & 0 & \sin\beta & 0 \\ 0 & 1 & 0 & 0 \\ -\sin\beta & 0 & \cos\beta & 0 \\ 0 & 0 & 0 & 1 \end{bmatrix} \begin{bmatrix} 1 & 0 & 0 & a_1 \\ 0 & 1 & 0 & 0 \\ 0 & 0 & 1 & 0 \\ 0 & 0 & 0 & 1 \end{bmatrix} \begin{bmatrix} 1 & 0 & 0 & 0 \\ 0 & \cos\alpha & -\sin\alpha & 0 \\ 0 & \sin\alpha & \cos\alpha & 0 \\ 0 & 0 & 0 & 1 \end{bmatrix}$$

$$= \begin{bmatrix} \cos\beta & 0 & \sin\beta & a_1\cos\beta \\ 0 & 1 & 0 & 0 \\ -\sin\beta & 0 & \cos\beta & -a_1\sin\beta \\ 0 & 0 & 0 & 1 \end{bmatrix} \begin{bmatrix} 1 & 0 & 0 & 0 \\ 0 & \cos\alpha & -\sin\alpha & 0 \\ 0 & \sin\alpha & \cos\alpha & 0 \\ 0 & 0 & 0 & 1 \end{bmatrix}$$

$$= \begin{bmatrix} \cos\beta & \sin\beta\sin\alpha & \sin\beta\cos\alpha & a_1\cos\beta \\ 0 & \cos\alpha & -\sin\alpha & 0 \\ -\sin\beta & \cos\beta\sin\alpha & \cos\beta\cos\alpha & -a_1\sin\beta \\ 0 & 0 & 0 & 1 \end{bmatrix}$$

$$^r_{4n}T = ^r_{1f}T^{1f}_{3n}T^{3n}_{4n}T \quad (104)$$

$$= \begin{bmatrix} \cos\beta & \sin\beta\sin\alpha & \sin\beta\cos\alpha & a_1\cos\beta \\ 0 & \cos\alpha & -\sin\alpha & 0 \\ -\sin\beta & \cos\beta\sin\alpha & \cos\beta\cos\alpha & -a_1\sin\beta \\ 0 & 0 & 0 & 1 \end{bmatrix} \begin{bmatrix} 1 & 0 & 0 & 0 \\ 0 & 1 & 0 & b_{2n} \\ 0 & 0 & 1 & 0 \\ 0 & 0 & 0 & 1 \end{bmatrix} \begin{bmatrix} 1 & 0 & 0 & 0 \\ 0 & \cos\gamma_n & -\sin\gamma_n & 0 \\ 0 & \sin\gamma_n & \cos\gamma_n & 0 \\ 0 & 0 & 0 & 1 \end{bmatrix}$$

$$= \begin{bmatrix} \cos\beta & \sin\beta\sin(\alpha+\gamma_n) & \sin\beta\cos(\alpha+\gamma_n) & b_{2n}\sin\beta\sin\alpha + a_1\cos\beta \\ 0 & \cos(\alpha+\gamma_n) & -\sin(\alpha+\gamma_n) & b_{2n}\cos\alpha \\ -\sin\beta & \cos\beta\sin(\alpha+\gamma_n) & \cos\beta\cos(\alpha+\gamma_n) & b_{2n}\cos\beta\sin\alpha - a_1\sin\beta \\ 0 & 0 & 0 & 1 \end{bmatrix}$$

$$^{4n}_{7n}T = ^{4n}_{5n}T^{5n}_{6n}T^{6n}_{7n}T \quad (105)$$

$$= \begin{bmatrix} 1 & 0 & 0 & 0 \\ 0 & 1 & 0 & 0 \\ 0 & 0 & 1 & c_{1n} \\ 0 & 0 & 0 & 1 \end{bmatrix} \begin{bmatrix} 1 & 0 & 0 & 0 \\ 0 & \cos\eta_n & -\sin\eta_n & 0 \\ 0 & \sin\eta_n & \cos\eta_n & 0 \\ 0 & 0 & 0 & 1 \end{bmatrix} \begin{bmatrix} 1 & 0 & 0 & 0 \\ 0 & 1 & 0 & 0 \\ 0 & 0 & 1 & z_{6n} \\ 0 & 0 & 0 & 1 \end{bmatrix}$$

$$= \begin{bmatrix} 1 & 0 & 0 & 0 \\ 0 & \cos\eta_n & -\sin\eta_n & 0 \\ 0 & \sin\eta_n & \cos\eta_n & c_{1n} \\ 0 & 0 & 0 & 1 \end{bmatrix} \begin{bmatrix} 1 & 0 & 0 & 0 \\ 0 & 1 & 0 & 0 \\ 0 & 0 & 1 & z_{6n} \\ 0 & 0 & 0 & 1 \end{bmatrix}$$

$$= \begin{bmatrix} 1 & 0 & 0 & 0 \\ 0 & \cos\eta_n & -\sin\eta_n & -z_{6n}\sin\eta_n \\ 0 & \sin\eta_n & \cos\eta_n & c_{1n} + z_{6n}\cos\eta_n \\ 0 & 0 & 0 & 1 \end{bmatrix}$$

$$^{4n}_{10n}T = ^{4n}_{8n}T^{8n}_{9n}T^{9n}_{10n}T \quad (106)$$

$$= \begin{bmatrix} 1 & 0 & 0 & 0 \\ 0 & 1 & 0 & 0 \\ 0 & 0 & 1 & c_{2n} \\ 0 & 0 & 0 & 1 \end{bmatrix} \begin{bmatrix} 1 & 0 & 0 & 0 \\ 0 & \cos\theta_n & -\sin\theta_n & 0 \\ 0 & \sin\theta_n & \cos\theta_n & 0 \\ 0 & 0 & 0 & 1 \end{bmatrix} \begin{bmatrix} 1 & 0 & 0 & 0 \\ 0 & 1 & 0 & e_{1n} \\ 0 & 0 & 1 & 0 \\ 0 & 0 & 0 & 1 \end{bmatrix}$$

$$= \begin{bmatrix} 1 & 0 & 0 & 0 \\ 0 & \cos\theta_n & -\sin\theta_n & 0 \\ 0 & \sin\theta_n & \cos\theta_n & c_{2n} \\ 0 & 0 & 0 & 1 \end{bmatrix} \begin{bmatrix} 1 & 0 & 0 & 0 \\ 0 & 1 & 0 & e_{1n} \\ 0 & 0 & 1 & 0 \\ 0 & 0 & 0 & 1 \end{bmatrix}$$

$$= \begin{bmatrix} 1 & 0 & 0 & 0 \\ 0 & \cos\theta_n & -\sin\theta_n & e_{1n}\cos\theta_n \\ 0 & \sin\theta_n & \cos\theta_n & c_{2n} + e_{1n}\sin\theta_n \\ 0 & 0 & 0 & 1 \end{bmatrix}$$

$$^{4n}_{12n}T = {}^{4n}_{8n}T\,{}^{8n}_{9n}T\,{}^{9n}_{11n}T\,{}^{11n}_{12n}T \qquad (107)$$

$$= \begin{bmatrix} 1 & 0 & 0 & 0 \\ 0 & 1 & 0 & 0 \\ 0 & 0 & 1 & c_{2n} \\ 0 & 0 & 0 & 1 \end{bmatrix} \begin{bmatrix} 1 & 0 & 0 & 0 \\ 0 & \cos\theta_n & -\sin\theta_n & 0 \\ 0 & \sin\theta_n & \cos\theta_n & 0 \\ 0 & 0 & 0 & 1 \end{bmatrix} \begin{bmatrix} 1 & 0 & 0 & 0 \\ 0 & 1 & 0 & e_{3n} \\ 0 & 0 & 1 & 0 \\ 0 & 0 & 0 & 1 \end{bmatrix} \begin{bmatrix} 1 & 0 & 0 & 0 \\ 0 & \cos\zeta_n & -\sin\zeta_n & 0 \\ 0 & \sin\zeta_n & \cos\zeta_n & 0 \\ 0 & 0 & 0 & 1 \end{bmatrix}$$

$$= \begin{bmatrix} 1 & 0 & 0 & 0 \\ 0 & \cos\theta_n & -\sin\theta_n & 0 \\ 0 & \sin\theta_n & \cos\theta_n & c_{2n} \\ 0 & 0 & 0 & 1 \end{bmatrix} \begin{bmatrix} 1 & 0 & 0 & 0 \\ 0 & 1 & 0 & e_{3n} \\ 0 & 0 & 1 & 0 \\ 0 & 0 & 0 & 1 \end{bmatrix} \begin{bmatrix} 1 & 0 & 0 & 0 \\ 0 & \cos\zeta_n & -\sin\zeta_n & 0 \\ 0 & \sin\zeta_n & \cos\zeta_n & 0 \\ 0 & 0 & 0 & 1 \end{bmatrix}$$

$$= \begin{bmatrix} 1 & 0 & 0 & 0 \\ 0 & \cos\theta_n & -\sin\theta_n & e_{3n}\cos\theta_n \\ 0 & \sin\theta_n & \cos\theta_n & c_{2n}+e_{3n}\sin\theta_n \\ 0 & 0 & 0 & 1 \end{bmatrix} \begin{bmatrix} 1 & 0 & 0 & 0 \\ 0 & \cos\zeta_n & -\sin\zeta_n & 0 \\ 0 & \sin\zeta_n & \cos\zeta_n & 0 \\ 0 & 0 & 0 & 1 \end{bmatrix}$$

$$= \begin{bmatrix} 1 & 0 & 0 & 0 \\ 0 & \cos(\theta_n+\zeta_n) & -\sin(\theta_n+\zeta_n) & e_{3n}\cos\theta_n \\ 0 & \sin(\theta_n+\zeta_n) & \cos(\theta_n+\zeta_n) & c_{2n}+e_{3n}\sin\theta_n \\ 0 & 0 & 0 & 1 \end{bmatrix}$$

2. Description of all the parts of the model both in local coordinate systems and relations to the coordinate $\{r\}$ or $\{1f\}$.

2.1 Description in local coordinate systems.

$$P_{body}^2 = P_{susp.n}^{7n} = P_{arm.n}^{10n} = P_{wheel.n}^{12n} \qquad (108)$$

$$= P_{touchpoint.n}^{13n} = P_{stab.b}^{14n} = \begin{bmatrix} 0 \\ 0 \\ 0 \\ 1 \end{bmatrix}$$

2.2 Description in global reference coordinate system $\{r\}$.

$$P_{body}^r = {}^{r}_{1f}T\,{}^{1f}_{2}T\,P_{body}^2 \qquad (109)$$

$$= \begin{bmatrix} \cos\beta & \sin\beta\sin\alpha & \sin\beta\cos\alpha & a_1\cos\beta \\ 0 & \cos\alpha & -\sin\alpha & 0 \\ -\sin\beta & \cos\beta\sin\alpha & \cos\beta\cos\alpha & -a_1\sin\beta \\ 0 & 0 & 0 & 1 \end{bmatrix} \begin{bmatrix} 1 & 0 & 0 & a_0 \\ 0 & 1 & 0 & b_0 \\ 0 & 0 & 1 & c_0 \\ 0 & 0 & 0 & 1 \end{bmatrix} \begin{bmatrix} 0 \\ 0 \\ 0 \\ 1 \end{bmatrix}$$

$$= \begin{bmatrix} a_0\cos\beta + b_0\sin\beta\sin\alpha + c_0\sin\beta\cos\alpha + a_1\cos\beta \\ b_0\cos\alpha - c_0\sin\alpha \\ -a_0\sin\beta + b_0\cos\beta\sin\alpha + c_0\cos\beta\cos\alpha + a_1\sin\beta \\ 1 \end{bmatrix}$$

$$P_{susp.n}^r = {}^{r}_{4n}T\,{}^{4n}_{7n}T\,P_{susp.n}^{7n} \qquad (110)$$

$$= \begin{bmatrix} \cos\beta & \sin\beta\sin(\alpha+\gamma_n) & \sin\beta\cos(\alpha+\gamma_n) & b_{2n}\sin\beta\sin\alpha + a_1\cos\beta \\ 0 & \cos(\alpha+\gamma_n) & -\sin(\alpha+\gamma_n) & b_{2n}\cos\alpha \\ -\sin\beta & \cos\beta\sin(\alpha+\gamma_n) & \cos\beta\cos(\alpha+\gamma_n) & b_{2n}\cos\beta\sin\alpha - a_1\sin\beta \\ 0 & 0 & 0 & 1 \end{bmatrix} \begin{bmatrix} 1 & 0 & 0 & 0 \\ 0 & \cos\eta_n & -\sin\eta_n & -z_{6n}\sin\eta_n \\ 0 & \sin\eta_n & \cos\eta_n & c_{1n}+z_{6n}\cos\eta_n \\ 0 & 0 & 0 & 1 \end{bmatrix} \begin{bmatrix} 0 \\ 0 \\ 0 \\ 1 \end{bmatrix}$$

$$= \begin{bmatrix} \{z_{6n}\cos(\alpha+\gamma_n+\eta_n) + c_{1n}\cos(\alpha+\gamma_n) + b_{2n}\sin\alpha\}\sin\beta + a_1\cos\beta \\ -z_{6n}\sin(\alpha+\gamma_n+\eta_n) - c_{1n}\sin(\alpha+\gamma_n) + b_{2n}\cos\alpha \\ \{z_{6n}\cos(\alpha+\gamma_n+\eta_n) + c_{1n}\cos(\alpha+\gamma_n) + b_{2n}\sin\alpha\}\cos\beta - a_1\sin\beta \\ 1 \end{bmatrix}$$

$$P_{arm.n}^r = {}^{r}_{4n}T\,{}^{4n}_{10n}T\,P_{arm.n}^{10n} \qquad (111)$$

$$= \begin{bmatrix} \cos\beta & \sin\beta\sin(\alpha+\gamma_n) & \sin\beta\cos(\alpha+\gamma_n) & b_{2n}\sin\beta\sin\alpha + a_1\cos\beta \\ 0 & \cos(\alpha+\gamma_n) & -\sin(\alpha+\gamma_n) & b_{2n}\cos\alpha \\ -\sin\beta & \cos\beta\sin(\alpha+\gamma_n) & \cos\beta\cos(\alpha+\gamma_n) & b_{2n}\cos\beta\sin\alpha - a_1\sin\beta \\ 0 & 0 & 0 & 1 \end{bmatrix} \begin{bmatrix} 1 & 0 & 0 & 0 \\ 0 & \cos\theta_n & -\sin\theta_n & e_{3n}\cos\theta_n \\ 0 & \sin\theta_n & \cos\theta_n & c_{2n}+e_{1n}\sin\theta_n \\ 0 & 0 & 0 & 1 \end{bmatrix} \begin{bmatrix} 0 \\ 0 \\ 0 \\ 1 \end{bmatrix}$$

$$= \begin{bmatrix} \{e_{1n}\sin(\alpha+\gamma_n+\theta_n) + c_{2n}\cos(\alpha+\gamma_n) + b_{2n}\sin\alpha\}\sin\beta + a_1\cos\beta \\ e_{1n}\cos(\alpha+\gamma_n+\theta_n) - c_{2n}\sin(\alpha+\gamma_n) + b_{2n}\cos\alpha \\ \{e_{1n}\sin(\alpha+\gamma_n+\theta_n) + c_{2n}\cos(\alpha+\gamma_n) + b_{2n}\sin\alpha\}\cos\beta - a_1\sin\beta \\ 1 \end{bmatrix}$$

-continued $$P^r_{wheel.n} = {}^r_{4n}T\, {}^{4n}_{12n}T\, P^{12n}_{wheel.n} \tag{112}$$

$$= \begin{bmatrix} \cos\beta & \sin\beta\sin(\alpha+\gamma_n) & \sin\beta\cos(\alpha+\gamma_n) & b_{2n}\sin\beta\sin\alpha + a_1\cos\beta \\ 0 & \cos(\alpha+\gamma_n) & -\sin(\alpha+\gamma_n) & b_{2n}\cos\alpha \\ -\sin\beta & \cos\beta\sin(\alpha+\gamma_n) & \cos\beta\cos(\alpha+\gamma_n) & b_{2n}\cos\beta\sin\alpha - a_1\sin\beta \\ 0 & 0 & 0 & 1 \end{bmatrix} \begin{bmatrix} 1 & 0 & 0 & 0 \\ 0 & \cos(\theta_n+\zeta_n) & -\sin(\theta_n+\zeta_n) & e_{3n}\cos\theta_n \\ 0 & \sin(\theta_n+\zeta_n) & \cos(\theta_n+\zeta_n) & c_{2n}+e_{3n}\sin\theta_n \\ 0 & 0 & 0 & 1 \end{bmatrix} \begin{bmatrix} 0 \\ 0 \\ 0 \\ 1 \end{bmatrix}$$

$$= \begin{bmatrix} \{e_{3n}\sin(\alpha+\gamma_n+\theta_n)+c_{2n}\cos(\alpha+\gamma_n)+b_{2n}\sin\alpha\}\sin\beta + a_1\cos\beta \\ e_{3n}\cos(\alpha+\gamma_n+\theta_n)-c_{2n}\sin(\alpha+\gamma_n)+b_{2n}\cos\alpha \\ \{e_{3n}\sin(\alpha+\gamma_n+\theta_n)+c_{2n}\cos(\alpha+\gamma_n)+b_{2n}\sin\alpha\}\cos\beta - a_1\sin\beta \\ 1 \end{bmatrix}$$

$$P^r_{touchpoint.n} = {}^r_{4n}T\, {}^{4n}_{12n}T\, {}^{12n}_{13n}T\, P^{13n}_{touchpoint.n} \tag{113}$$

$$= \begin{bmatrix} \cos\beta & \sin\beta\sin(\alpha+\gamma_n) & \sin\beta\cos(\alpha+\gamma_n) & b_{2n}\sin\beta\sin\alpha + a_1\cos\beta \\ 0 & \cos(\alpha+\gamma_n) & -\sin(\alpha+\gamma_n) & b_{2n}\cos\alpha \\ -\sin\beta & \cos\beta\sin(\alpha+\gamma_n) & \cos\beta\cos(\alpha+\gamma_n) & b_{2n}\cos\beta\sin\alpha - a_1\sin\beta \\ 0 & 0 & 0 & 1 \end{bmatrix} \begin{bmatrix} 1 & 0 & 0 & 0 \\ 0 & \cos(\theta_n+\zeta_n) & -\sin(\theta_n+\zeta_n) & e_{3n}\cos\theta_n \\ 0 & \sin(\theta_n+\zeta_n) & \cos(\theta_n+\zeta_n) & c_{2n}+e_{3n}\sin\theta_n \\ 0 & 0 & 0 & 1 \end{bmatrix}$$

$$\begin{bmatrix} 1 & 0 & 0 & 0 \\ 0 & 1 & 0 & 0 \\ 0 & 0 & 1 & z_{12n} \\ 0 & 0 & 0 & 1 \end{bmatrix} \begin{bmatrix} 0 \\ 0 \\ 0 \\ 1 \end{bmatrix}$$

$$= \begin{bmatrix} \{z_{12n}\cos\alpha + e_{3n}\sin(\alpha+\gamma_n+\theta_n)+c_{2n}\cos(\alpha+\gamma_n)+b_{2n}\sin\alpha\}\sin\beta + a_1\cos\beta \\ -z_{12n}\sin\alpha + e_{3n}\cos(\alpha+\gamma_n+\theta_n)-c_{2n}\sin(\alpha+\gamma_n)+b_{2n}\cos\alpha \\ \{z_{12n}\cos\alpha + e_{3n}\sin(\alpha+\gamma_n+\theta_n)+c_{2n}\cos(\alpha+\gamma_n)+b_{2n}\sin\alpha\}\cos\beta - a_1\sin\beta \\ 1 \end{bmatrix}$$

where $\zeta_n$ is substituted by, $$\zeta_n = -\gamma_n - \theta_n$$

because of the link mechanism to support wheel at this geometric relation.

2.3 Description of the stabilizer linkage point in local coordinate system $\{1f\}$.

The stabilizer works as a spring in which force is proportional to the difference of displacement between both arms in a local coordinate system $\{1f\}$ fixed to the body.

$$P^{1f}_{stab.n} = {}^{1f}_{3n}T\, {}^{3n}_{4n}T\, {}^{4n}_{8n}T\, {}^{8n}_{9n}T\, {}^{9n}_{14n}T\, P^{14n}_{stab.n} \tag{114}$$

$$= \begin{bmatrix} 1 & 0 & 0 & 0 \\ 0 & 1 & 0 & b_{2n} \\ 0 & 0 & 1 & 0 \\ 0 & 0 & 0 & 1 \end{bmatrix} \begin{bmatrix} 1 & 0 & 0 & 0 \\ 0 & \cos\gamma_n & -\sin\gamma_n & 0 \\ 0 & \sin\gamma_n & \cos\gamma_n & 0 \\ 0 & 0 & 0 & 1 \end{bmatrix} \begin{bmatrix} 1 & 0 & 0 & 0 \\ 0 & 1 & 0 & 0 \\ 0 & 0 & 1 & c_{2n} \\ 0 & 0 & 0 & 1 \end{bmatrix}$$

$$\begin{bmatrix} 1 & 0 & 0 & 0 \\ 0 & \cos\theta_n & -\sin\theta_n & 0 \\ 0 & \sin\theta_n & \cos\theta_n & 0 \\ 0 & 0 & 0 & 1 \end{bmatrix} \begin{bmatrix} 1 & 0 & 0 & 0 \\ 0 & 1 & 0 & e_{0n} \\ 0 & 0 & 1 & 0 \\ 0 & 0 & 0 & 1 \end{bmatrix} \begin{bmatrix} 0 \\ 0 \\ 0 \\ 1 \end{bmatrix}$$

$$= \begin{bmatrix} 0 \\ e_{0n}\cos(\gamma_n+\theta_n) - c_{2n}\sin\gamma_n + b_{2n} \\ e_{0n}\sin(\gamma_n+\theta_n) + c_{2n}\cos\gamma_n \\ 0 \end{bmatrix}$$

3. Kinetic energy, potential energy and dissipative functions for the <Body>, <Suspension>, <Arm>, <Wheel> and <Stabilizer>.

Kinetic energy and potential energy except by springs are calculated based on the displacement referred to the inertial global coordinate $\{r\}$. Potential energy by springs and dissipative functions are calculated based on the movement in each local coordinate.

⟨Body⟩

$$T^{tr}_b = \frac{1}{2}m_b(\dot{x}_b^2 + \dot{y}_b^2 + \dot{z}_b^2) \tag{115}$$

where $$x_b = (a_0 + a_{1n})\cos\beta + (b_0\sin\alpha + c_0\cos\alpha)\sin\beta \tag{116}$$

$$y_b = b_0\cos\alpha - c_0\sin\alpha$$

$$z_b = -(a_0 + a_{1n})\sin\beta + (b_0\sin\alpha + c_0\cos\alpha)\cos\beta$$

and $$q_{j,k} = \beta, \alpha \tag{117}$$

$$\frac{\partial x_b}{\partial \beta} = -(a_0 + a_1)\sin\beta + (b_0\sin\alpha + c_0\cos\alpha)\cos\beta$$

$$\frac{\partial x_b}{\partial \alpha} = (b_0\cos\alpha - c_0\sin\alpha)\sin\beta$$

$$\frac{\partial y_b}{\partial \beta} = 0$$

$$\frac{\partial y_b}{\partial \alpha} = -b_0\sin\alpha - c_0\cos\alpha$$

$$\frac{\partial z_b}{\partial \beta} = -(a_0 + a_1)\cos\beta - (b_0\sin\alpha + c_0\cos\alpha)\sin\beta$$

$$\frac{\partial z_b}{\partial \alpha} = (b_0\cos\alpha - c_0\sin\alpha)\cos\beta$$

and thus $$T^{tr}_b = \frac{1}{2}m_b(\dot{x}_b^2 + \dot{y}_b^2 + \dot{z}_b^2) \tag{118}$$

-continued $$= \frac{1}{2} m_b \sum_{j,k} \left( \frac{\partial x_b}{\partial q_j} \frac{\partial x_b}{\partial q_k} \dot{q}_j \dot{q}_k + \frac{\partial y_b}{\partial q_j} \frac{\partial y_b}{\partial q_k} \dot{q}_j \dot{q}_k + \frac{\partial z_b}{\partial q_j} \frac{\partial z_b}{\partial q_k} \dot{q}_j \dot{q}_k \right)$$

$$= \frac{1}{2} m_b \Big\rangle \dot{\beta}^2 \{-(a_0 + a_1)\sin\beta + (b_0\sin\alpha + c_0\cos\alpha)\cos\beta\}^2 +$$

$$\dot{\alpha}^2 \{(b_0\cos\alpha - c_0\sin\alpha)\sin\beta\}^2 +$$

$$\dot{\alpha}^2 (-b_0\sin\alpha - c_0\cos\alpha)^2 +$$

$$\dot{\beta}^2 \{-(a_0 + a_1)\cos\beta - (b_0\sin\alpha + c_0\cos\alpha)\sin\beta\}^2 +$$

$$\dot{\alpha}^2 \{(b_0\cos\alpha - c_0\sin\alpha)\cos\beta\}^2 + 2\dot{\alpha}\dot{\beta}[\{-(a_0 + a_1)\sin\beta +$$

$$(b_0\sin\alpha + c_0\cos\alpha)\cos\beta\}(b_0\cos\alpha - c_0\sin\alpha)\sin\beta +$$

$$\{-(a_0 + a_1)\cos\beta - (b_0\sin\alpha + c_0\cos\alpha)\sin\beta\}$$

$$(b_0\cos\alpha - c_0\sin\alpha)\cos\beta]\langle$$

$$= \frac{1}{2} m_b \Big\rangle \dot{\alpha}^2 (b_0^2 + c_0^2) + \dot{\beta}^2 \{(a_0 + a_1)^2 +$$

$$(b_0\sin\alpha + c_0\cos\alpha)^2\} -$$

$$2\dot{\alpha}\dot{\beta}(a_0 + a_1)(b_0\cos\alpha - c_0\sin\alpha)\langle$$

$$T_b^{ro} = \frac{1}{2}(I_{bx}\omega_{bx}^2 + I_{by}\omega_{by}^2 + I_{bz}\omega_{bz}^2) \quad (119)$$

where $\omega_{bx} = \dot{\alpha}$ $\omega_{by} = \dot{\beta}$ $\omega_{bz} = 0$ $\therefore$ $T_b^{ro} = \frac{1}{2}(I_{bx}\dot{\alpha}^2 + I_{by}\dot{\beta}^2)$ $U_b = m_b g z_b$ $= m_b g\{-(a_0 + a_1)\sin\beta + (b_0\sin\alpha + c_0\cos\alpha)\cos\beta\}$ ⟨Suspension⟩

$$T_{sn}^{tr} = \frac{1}{2} m_{sn}(\dot{x}_{sn}^2 + \dot{y}_{sn}^2 + \dot{z}_{sn}^2) \quad (120)$$

where $x_{sn} = \{z_{6n}\cos(\alpha + \gamma_n + \eta_n) + c_{1n}\cos(\alpha + \gamma_n) + b_{2n}\sin\alpha\}\sin\beta + a_{1n}\cos\beta$ $y_{sn} = -z_{6n}\sin(\alpha + \gamma_n + \eta_n) - c_{1n}\sin(\alpha + \gamma_n) + b_{2n}\cos\alpha$ $z_{sn} = \{z_{6n}\cos(\alpha + \gamma_n + \eta_n) + c_{1n}\cos(\alpha + \gamma_n) + b_{2n}\sin\alpha\}\cos\beta - a_{1n}\sin\beta$ $q_{j,k} = z_{6n}, \eta_n, \alpha, \beta \quad (121)$ $\frac{\partial x_{sn}}{\partial z_{6n}} = \cos(\alpha + \gamma_2 + \eta_n)\sin\beta$ $\frac{\partial x_{sn}}{\partial \eta_n} = -z_{6n}\sin(\alpha + \gamma_n + \eta_n)\sin\beta$ $\frac{\partial x_{sn}}{\partial \alpha} = \{-z_{6n}\sin(\alpha + \gamma_n + \eta_n) - c_{1n}\sin(\alpha + \gamma_n) + b_{2n}\cos\alpha\}\sin\beta$ $\frac{\partial x_{sn}}{\partial \beta} = \{z_{6n}\cos(\alpha + \gamma_n + \eta_n) + c_{1n}\cos(\alpha + \gamma_n) + b_{2n}\sin\alpha\}\cos\beta - a_{1n}\sin\beta$ $\frac{\partial y_{sn}}{\partial z_{6n}} = -\sin(\alpha + \gamma_n + \eta_n)$ $\frac{\partial y_{sn}}{\partial \eta_n} = -z_{6n}\cos(\alpha + \gamma_n + \eta_n)$ $\frac{\partial y_{sn}}{\partial \alpha} = -z_{6n}\cos(\alpha + \gamma_n + \eta_n) - c_{1n}\cos(\alpha + \gamma_n) - b_{2n}\sin\alpha$ $\frac{\partial y_{sn}}{\partial \beta} = 0$ $$\frac{\partial z_{sn}}{\partial z_{6n}} = \cos(\alpha + \gamma_n + \eta_n)\cos\beta \quad (122)$$

$\frac{\partial z_{sn}}{\partial \eta_n} = -z_{6n}\sin(\alpha + \gamma_n + \eta_n)\cos\beta$ $\frac{\partial z_{sn}}{\partial \alpha} = \{-z_{6n}\sin(\alpha + \gamma_n + \eta_n) - c_{1n}\sin(\alpha + \gamma_n) + b_{2n}\cos\alpha\}\cos\beta$ $\frac{\partial z_{sn}}{\partial \beta} = -\{z_{6n}\cos(\alpha + \gamma_n + \eta_n) + c_{1n}\cos(\alpha + \gamma_n) + b_{2n}\sin\alpha\}\sin\beta - a_{1n}\cos\beta$ $$T_{sn}^{tr} = \frac{1}{2} m_{sn}(\dot{x}_{sn}^2 + \dot{y}_{sn}^2 + \dot{z}_{sn}^2) \quad (123)$$

$$= \frac{1}{2} m_{sn} \sum_{j,k} \left( \frac{\partial x_{sn}}{\partial q_j} \frac{\partial x_{sn}}{\partial q_k} \dot{q}_j \dot{q}_k + \frac{\partial y_{sn}}{\partial q_j} \frac{\partial y_{sn}}{\partial q_k} \dot{q}_j \dot{q}_k + \frac{\partial z_{sn}}{\partial q_j} \frac{\partial z_{sn}}{\partial q_k} \dot{q}_j \dot{q}_k \right)$$

$$= \frac{1}{2} m_{sn} \Big\rangle \dot{z}_{6n}^2 + \dot{\eta}_n^2 z_{6n}^2 + \dot{\alpha}^2 [z_{6n}^2 + c_{1n}^2 + b_{2n}^2 + \quad (124)$$

$$2\{z_{6n}c_{1n}\cos\eta_n - z_{6n}b_{2n}\sin(\gamma_n + \eta_n) - c_{1n}b_{2n}\sin\gamma_n\}] +$$

$$\dot{\beta}^2 [\{(z_{6n}\cos(\alpha + \gamma_n + \eta_n) + c_{1n}\cos(\alpha + \gamma_n) + b_{2n}\sin\alpha)\}^2 + a_{1n}^2] +$$

$$2z_{6n}\dot{\alpha}\{c_{1n}\sin\eta_n + b_{2n}\cos(\gamma_n + \eta_n)\} -$$

$$2z_{6n}\dot{\beta}a_{1n}\cos(\alpha + \gamma_n + \eta_n) +$$

$$2\dot{\eta}_n\dot{\alpha}z_{6n}\{z_{6n} + c_{1n}\cos\eta_n - b_{2n}\sin(\gamma_n + \eta_n)\} +$$

$$2\dot{\eta}_n\dot{\beta}z_{6n}a_{1n}\sin(\alpha + \gamma_n + \eta_n) +$$

$$2\dot{\alpha}\dot{\beta}a_{1n}\{z_{6n}\sin(\alpha + \gamma_n + \eta_n) + c_{1n}\sin(\alpha + \gamma_n) - b_{2n}\cos\alpha\}\langle$$

$$T_{sn}^{ro} \cong 0 \quad (125)$$

$$U_{sn} = m_{sn}gz_{sn} + \frac{1}{2}k_{sn}(z_{6n} - l_{sn})^2$$

$$= m_{sn}gz_{sn}[\{z_{6n}\cos(\alpha + \gamma_n + \eta_n) + c_{1n}\cos(\alpha + \gamma_n) + b_{2n}\sin\alpha\}\cos\beta - a_{1n}\sin\beta] + \frac{1}{2}k_{sn}(z_{6n} - l_{sn})^2$$

$$F_{sn} = -\frac{1}{2}c_{sn}\dot{z}_{6n}^2$$

⟨Arm⟩

$$T_{an}^{tr} = \frac{1}{2} m_{an}(\dot{x}_{an}^2 + \dot{y}_{an}^2 + \dot{z}_{an}^2) \quad (126)$$

where $$x_{an} = \{e_{1n}\sin(\alpha + \gamma_n + \theta_n) + c_{2n}\cos(\alpha + \gamma_n) + b_{2n}\sin\alpha\}\sin\beta + a_{1n}\cos\beta \quad (127)$$

-continued $$y_{an} = e_{1n}\cos(\alpha + \gamma_n + \theta_n) - c_{2n}\sin(\alpha + \gamma_n) + b_{2n}\cos\alpha$$

$$z_{an} = \{e_{1n}\sin(\alpha + \gamma_n + \theta_n) + c_{2n}\cos(\alpha + \gamma_n) + b_{2n}\sin\alpha\}\cos\beta - a_{1n}\sin\beta$$

and $$q_{j,k} = \theta_n, \alpha, \beta \tag{128}$$

$$\frac{\partial x_{an}}{\partial \theta_n} = e_{1n}\cos(\alpha + \gamma_n + \theta_n)\sin\beta$$

$$\frac{\partial x_{an}}{\partial \alpha} = \{e_{1n}\cos(\alpha + \gamma_n + \theta_n) - c_{2n}\sin(\alpha + \gamma_n) + b_{2n}\cos\alpha\}\sin\beta$$

$$\frac{\partial x_{an}}{\partial \beta} = \{e_{1n}\sin(\alpha + \gamma_n + \theta_n) + c_{2n}\cos(\alpha + \gamma_n) + b_{2n}\sin\alpha\}\cos\beta - a_{1n}\sin\beta$$

$$\frac{\partial y_{an}}{\partial \theta_n} = -e_{1n}\sin(\alpha + \gamma_n + \theta_n)$$

$$\frac{\partial y_{an}}{\partial \alpha} = -e_{1n}\sin(\alpha + \gamma_n + \theta_n) - c_{2n}\cos(\alpha + \gamma_n) - b_{2n}\sin\alpha$$

$$\frac{\partial y_{an}}{\partial \beta} = 0$$

$$\frac{\partial z_{an}}{\partial \theta_n} = e_{1n}\cos(\alpha + \gamma_n + \theta_n)\cos\beta$$

$$\frac{\partial z_{an}}{\partial \alpha} = \{e_{1n}\cos(\alpha + \gamma_n + \theta_n) - c_{2n}\sin(\alpha + \gamma_n) + b_{2n}\cos\alpha\}\cos\beta$$

$$\frac{\partial z_{an}}{\partial \beta} = -\{e_{1n}\sin(\alpha + \gamma_n + \theta_n) + c_{2n}\cos(\alpha + \gamma_n) + b_{2n}\sin\alpha\}\sin\beta - a_{1n}\cos\beta$$

thus $$T_{an}^{tr} = \frac{1}{2}m_{an}(\dot{x}_{an}^2 + \dot{y}_{an}^2 + \dot{z}_{an}^2) \tag{129}$$

$$= \frac{1}{2}m_{an}\sum_{j,k}\left(\frac{\partial x_{an}}{\partial q_j}\frac{\partial x_{an}}{\partial q_k}\dot{q}_j\dot{q}_k + \frac{\partial y_{an}}{\partial q_j}\frac{\partial y_{an}}{\partial q_k}\dot{q}_j\dot{q}_k + \frac{\partial z_{an}}{\partial q_j}\frac{\partial z_{an}}{\partial q_k}\dot{q}_j\dot{q}_k\right)$$

$$= \frac{1}{2}m_{an}\{\dot{\theta}_n^2 e_{1n}^2 + \dot{\alpha}^2[e_{1n}^2 + c_{2n}^2 + b_{2n}^2 - 2\{e_{1n}c_{2n}\sin\theta_n + e_{1n}b_{2n}\cos(\gamma_n + \theta_n) + c_{2n}b_{2n}\sin\gamma_n\}] + \dot{\beta}^2[\{e_{1n}\sin(\alpha + \gamma_n + \theta_n) + c_{2n}\cos(\alpha + \gamma_n) + b_{2n}\sin\alpha\}^2 + a_{1n}^2] + 2\dot{\theta}\dot{\alpha}e_{1n}\{e_{1n} - c_{2n}\sin\theta_n + b_{2n}\cos(\gamma_n + \theta_n)\} - 2\dot{\theta}_n\dot{\beta}e_{1n}a_{1n}\cos(\alpha + \gamma_n + \theta_n) - 2\dot{\alpha}\dot{\beta}a_{1n}\{e_{1n}\cos(\alpha + \gamma_n + \theta_n) - c_{1n}\sin(\alpha + \gamma_n) + b_{2n}\cos\alpha\}\} \tag{130}$$

$$T_{an}^{ro} = \frac{1}{2}I_{ax}\omega_{ax}^2 \tag{131}$$

$$= \frac{1}{2}I_{ax}(\dot{\alpha} + \dot{\theta}_n)^2$$

$$U_{an} = m_{an}gz_{an}$$

$$= m_{an}g[\{e_{1n}\sin(\alpha + \gamma_n + \theta_n) + c_{2n}\cos(\alpha + \gamma_n) + b_{2n}\sin\alpha\}\cos\beta - a_{1n}\sin\beta]$$

⟨Wheel⟩

$$T_{wn}^{tr} = \frac{1}{2}m_{wn}(\dot{x}_{wn}^2 + \dot{y}_{wn}^2 + \dot{z}_{wn}^2) \tag{132}$$

where $$x_{wn} = \{e_{3n}\sin(\alpha + \gamma_n + \theta_n) + c_{2n}\cos(\alpha + \gamma_n) + b_{2n}\sin\alpha\}\sin\beta + a_{1n}\cos\beta \tag{133}$$

$$y_{wn} = e_{3n}\cos(\alpha + \gamma_n + \theta_n) - c_{2n}\sin(\alpha + \gamma_n) + b_{2n}\cos\alpha$$

$$z_{wn} = \{e_{3n}\sin(\alpha + \gamma_n + \theta_n) + c_{2n}\cos(\alpha + \gamma_n) + b_{2n}\sin\alpha\}\cos\beta - a_{1n}\sin\beta$$

Substituting $m_{an}$ with $m_{wn}$ and $e_{1n}$ with $e_{3n}$ in the equation for arm, yields an equation for the wheel as:

$$T_{wn}^{tr} = \frac{1}{2}m_{wn}\{\dot{\theta}_n^2 e_{3n}^2 + \dot{\alpha}^2[e_{3n}^2 + c_{2n}^2 + b_{2n}^2 - 2\{e_{3n}c_{2n}\sin\theta_n + e_{3n}b_{2n}\cos(\gamma_n + \theta_n) + c_{2n}b_{2n}\sin\gamma_n\}] + \dot{\beta}^2[\{e_{3n}\sin(\alpha + \gamma_n + \theta_n) + c_{2n}\cos(\alpha + \gamma_n) + b_{2n}\sin\alpha\}^2 + a_{1n}^2] + 2\dot{\theta}\dot{\alpha}e_{3n}\{e_{3n} - c_{2n}\sin\theta_n + b_{2n}\cos(\gamma_n + \theta_n)\} - 2\dot{\theta}_n\dot{\beta}e_{3n}a_{1n}\cos(\alpha + \gamma_n + \theta_n) - 2\dot{\alpha}\dot{\beta}a_{1n}\{e_{3n}\cos(\alpha + \gamma_n + \theta_n) - c_{1n}\sin(\alpha + \gamma_n) + b_{2n}\cos\alpha\}\} \tag{134}$$

$$T_{wn}^{ro} = 0$$

$$U_{wn} = m_{wn}gz_{wn} + \frac{1}{2}k_{wn}(z_{12n} - l_{wn})^2$$

$$= m_{wn}g[\{e_{3n}\sin(\alpha + \gamma_n + \theta_n) + c_{2n}\cos(\alpha + \gamma_n) + b_{2n}\sin\alpha\}\cos\beta - a_{1n}\sin\beta] + \frac{1}{2}k_{wn}(z_{12n} - l_{wn})^2$$

$$F_{wn} = -\frac{1}{2}c_{wn}\dot{z}_{12n}^2 \tag{135}$$

⟨Stabilizer⟩

$$T_{zn}^{tr} \cong 0 \tag{136}$$

$$T_{zn}^{ro} \cong 0 \tag{137}$$

$$U_{zn} \cong \frac{1}{2}k_{zn}(z_{zi} - z_{zii})^2 \tag{138}$$

$$= \frac{1}{2}k_{zn}\{e_{0i}\sin(\gamma_i + \theta_i) - e_{0ii}\sin(\gamma_{ii} + \theta_{ii})\}^2$$

$$= \frac{1}{2}k_{zn}e_{0i}^2\{\sin(\gamma_i + \theta_i) + \sin(\gamma_{ii} + \theta_{ii})\}^2$$

where $e_{0ii} = -e_{0i}$ $$F_{zn} \cong 0 \tag{139}$$

Therefore the total kinetic energy is:

$$T_{tot} = T_b^{tr} + \sum_n^{i,ii}\left|T_{sn}^{tr} + T_{an}^{tr} + T_{wn}^{tr} + T_b^{ro} + T_{an}^{ro}\right| \tag{140}$$

$$T_{tot} = T_b^{tr} + \sum_n^{i,ii} |T_{sn}^{tr} + T_{an}^{tr} + T_{wn}^{tr} + T_b^{ro} + T_{an}^{ro}| \qquad (141)$$

$$= \frac{1}{2} m_b \Big) \dot{\alpha}^2 (b_0^2 + c_0^2) + \dot{\beta}^2 \{(a_0 + a_1)^2 + (b_0\sin\alpha + c_0\cos\alpha)^2\} -$$

$$2\dot{\alpha}\dot{\beta}(a_0 + a_1)(b_0\cos\alpha - c_0\sin\alpha)\Big\{ + \sum_n^{i,ii} \Big| \frac{1}{2} m_{sn} \Big) \dot{z}_{6n}^2 + \dot{\eta}_n^2 z_{6n}^2 +$$

$$\dot{\alpha}^2 [z_{6n}^2 + c_{1n}^2 + b_{2n}^2 + 2\{z_{6n}c_{1n}\cos\eta_n - z_{6n}b_{2n}\sin(\gamma_n + \eta_n) -$$

$$c_{1n}b_{2n}\sin\gamma_n\}] + \dot{\beta}^2 [\{z_{6n}\cos(\alpha + \gamma_n + \eta_n) + c_{1n}\cos(\alpha + \gamma_n) +$$

$$b_{2n}\sin\alpha\}^2 + a_{1n}^2] + 2\dot{z}_{6n}\dot{\alpha}\{c_{1n}\sin\eta_n + b_{2n}\cos(\gamma_n + \eta_n)\} -$$

$$2\dot{z}_{6n}\dot{\beta}a_{1n}\cos(\alpha + \gamma_n + \eta_n) + 2\dot{\eta}_n\dot{\alpha}z_{6n}\{z_{6n} + c_{1n}\cos\eta_n -$$

$$b_{2n}\sin(\gamma_n + \eta_n)\} + 2\dot{\eta}_n\dot{\beta}z_{6n}a_{1n}\sin(\alpha + \gamma_n + \eta_n) +$$

$$2\dot{\alpha}\dot{\beta}a_{1n}\{z_{6n}\sin(\alpha + \gamma_n + \eta_n) + c_{1n}\sin(\alpha + \gamma_n) - b_{2n}\cos\alpha\}\langle +$$

$$\frac{1}{2} m_{an} \Big)\dot{\theta}_n^2 e_{1n}^2 + \dot{\alpha}^2 [e_{1n}^2 + c_{2n}^2 + b_{2n}^2 - 2\{e_{1n}c_{2n}\sin\theta_n -$$

$$e_{1n}b_{2n}\cos(\gamma_n + \theta_n) + c_{2n}b_{2n}\sin\gamma_n\}] + \dot{\beta}^2 [\{e_{1n}\sin(\alpha + \gamma_n + \theta_n) +$$

$$c_{2n}\cos(\alpha + \gamma_n) + b_{2n}\sin\alpha\}^2 + a_{1n}^2] + 2\dot{\theta}\dot{\alpha}e_{1n}\{e_{1n} - c_{2n}\sin\theta_n +$$

$$b_{2n}\cos(\gamma_n + \theta_n)\} - 2\dot{\theta}_n\dot{\beta}e_{1n}a_{1n}\cos(\alpha + \gamma_n + \theta_n) -$$

$$2\dot{\alpha}\dot{\beta}a_{1n}\{e_{1n}\cos(\alpha + \gamma_n + \theta_n) - c_{1n}\sin(\alpha + \gamma_n) + b_{2n}\cos\alpha\}\langle +$$

$$\frac{1}{2} m_{wn}\Big)\dot{\theta}_n^2 e_{3n}^2 + \dot{\alpha}^2 [e_{3n}^2 + c_{2n}^2 + b_{2n}^2 - 2\{e_{3n}c_{2n}\sin\theta_n -$$

$$e_{3n}b_{2n}\cos(\gamma_n + \theta_n) + c_{2n}b_{2n}\sin\gamma_n\}] + \dot{\beta}^2 [\{e_{3n}\sin(\alpha + \gamma_n + \theta_n) +$$

$$c_{2n}\cos(\alpha + \gamma_n) + b_{2n}\sin\alpha\}^2 + a_{1n}^2] + 2\dot{\theta}\dot{\alpha}e_{3n}\{e_{3n} - c_{2n}\sin\theta_n +$$

$$b_{2n}\cos(\gamma_n + \theta_n)\} - 2\dot{\theta}_n\dot{\beta}e_{3n}a_{1n}\cos(\alpha + \gamma_n + \theta_n) -$$

$$2\dot{\alpha}\dot{\beta}a_{1n}\{e_{3n}\cos(\alpha + \gamma_n + \theta_n) - c_{1n}\sin(\alpha + \gamma_n) + b_{2n}\cos\alpha\}\langle +$$

$$\frac{1}{2}(I_{bx}\dot{\alpha}^2 + I_{by}\dot{\beta}^2) + \frac{1}{2}I_{anx}(\dot{\alpha} + \dot{\theta}_n)^2 \Big|$$

$$= \frac{1}{2}[\dot{\alpha}^2 m_{bbl} + \dot{\beta}^2\{m_{bal} + m_b(b_0\sin\alpha + c_0\cos\alpha)^2\} - \qquad (142)$$

$$2\dot{\alpha}\dot{\beta}m_{ba}(b_0\cos\alpha - c_0\sin\alpha)] + \frac{1}{2}\sum_n^{i,ii}\Big| m_{sn}(\dot{z}_{6n}^2 + \dot{\eta}_n^2 z_{6n}^2) +$$

$$\dot{\theta}_n^2 m_{aw2ln} + \dot{\alpha}^2)m_{sawln} + m_{sn}z_{6n}[z_{6n} + 2\{c_{1n}\cos\eta_n -$$

$$b_{2n}\sin(\gamma_n + \eta_n)\}] - 2m_{awln}\{c_{2n}\sin\theta_n - b_{2n}\cos(\gamma_n + \theta_n)\}\langle +$$

$$\dot{\beta}^2)m_{saw2n} + m_{sn}\{z_{6n}\cos(\alpha + \gamma_n + \eta_n) + c_{1n}\cos(\alpha + \gamma_n) +$$

$$b_{2n}\sin\alpha\}^2 + m_{an}\{e_1\sin(\alpha + \gamma_n + \theta_n) + c_{2n}\cos(\alpha + \gamma_n) +$$

$$b_{2n}\sin\alpha\}^2 + m_{wn}\{e_3\sin(\alpha + \gamma_n + \theta_n) + c_{2n}\cos(\alpha + \gamma_n) +$$

$$b_{2n}\sin\alpha\}^2\langle + 2\dot{z}_{6n}\dot{\alpha}m_{sn}\{c_{1n}\sin\eta_n + b_{2n}\cos(\gamma_n + \eta_n)\} -$$

$$2\dot{z}_{6n}\dot{\beta}ma_{1n}\cos(\alpha + \gamma_n + \eta_n) + 2\dot{\eta}_n\dot{\alpha}m_{sn}z_{6n}\{z_{6n} + c_{1n}\cos\eta_n -$$

$$b_{2n}\sin(\gamma_n + \eta_n)\} + 2\dot{\eta}_n\dot{\beta}m_{sn}z_{6n}a_{1n}\sin(\alpha + \gamma_n + \eta_n) +$$

$$2\dot{\theta}\dot{\alpha}[m_{aw2ln} - m_{awln}\{c_{2n}\sin\theta_n - b_{2n}\cos(\gamma_n + \theta_n)\}] -$$

$$2\dot{\theta}\dot{\beta}m_{awln}a_{1n}\cos(\alpha + \gamma_n + \theta_n) + 2\dot{\alpha}\dot{\beta}a_{1n}\{m_{sawcn}\sin(\alpha + \gamma_n) -$$

$$m_{sawbn}\cos\alpha + m_{sn}z_{6n}\sin(\alpha + \gamma_n + \eta_n) - m_{awln}\cos(\alpha + \gamma_n + \theta_n)\}\Big|$$

where $$m_{ba} = m_b(a_0 + a_1) \qquad (143)$$

$$m_{bbl} = m_b(b_0^2 + c_0^2) + I_{bx}$$

$$m_{bal} = m_b(a_0 + a_1)^2 + I_{by}$$

$$m_{sawan} = (m_{sn} + m_{an} + m_{wn})a_{1n}$$

$$m_{sawbn} = (m_{sn} + m_{an} + m_{wn})b_{2n}$$

$$m_{sawcn} = m_{sn}c_{1n} + (m_{an} + m_{wn})c_{2n}$$

$$m_{saw2n} = (m_{sn} + m_{an} + m_{wn})a_{1n}^2$$

$$m_{sawln} = m_{an}e_{1n}^2 + m_{wn}e_{3n}^2 + m_{sn}(c_{1n}^2 + b_{2n}^2 - 2c_{1n}b_{2n}\sin\gamma_n) +$$
$$(m_{an} + m_{wn})(c_{2n}^2 + b_{2n}^2 - 2c_{2n}b_{2n}\sin\gamma_n) + I_{axn}$$

$$m_{aw2ln} = m_{an}e_{1n}^2 + m_{wn}e_{3n}^2 + I_{axn}$$

$$m_{awln} = m_{an}e_{1n} + m_{wn}e_{3n}$$

$$m_{aw2n} = m_{an}e_{1n}^2 + m_{wn}e_{3n}^2$$

Hereafter variables and constants which have index 'n' implies implicit or explicit that they require summation with n=i, ii Total potential energy is:

$$U_{tot} = U_b + \sum_n^{i,ii} \Big| U_{sn} + U_{an} + U_{wn} + U_{zn} \qquad (144)$$

$$= m_b g\{-(a_0 + a_1)\sin\beta + (b_0\sin\alpha + c_0\cos\alpha)\cos\beta\} + \qquad (145)$$

$$\sum_n^{i,ii} \Big| m_{sn}g[\{z_{6n}\cos(\alpha + \gamma_n + \eta_n) + c_{1n}\cos(\alpha + \gamma_n) +$$

$$b_{2n}\sin\alpha\}\cos\beta - a_{1n}\sin\beta] + \frac{1}{2}k_{sn}(z_{6n} - l_{sn})^2 +$$

$$m_{an}g[\{e_{1n}\sin(\alpha + \gamma_n + \theta_n) + c_{2n}\cos(\alpha + \gamma_n) +$$

$$b_{2n}\sin\alpha\}\cos\beta - a_{1n}\sin\beta] + m_{wn}g[\{e_{3n}\sin(\alpha + \gamma_n + \theta_n) +$$

$$c_{2n}\cos(\alpha + \gamma_n) + b_{2n}\sin\alpha\}\cos\beta - a_{1n}\sin\beta] +$$

$$\frac{1}{2}k_{wn}(z_{12n} - l_{wn})^2 + \frac{1}{2}k_{zn}[e_{0n}\{\sin(\gamma_i + \theta_i) + \sin(\gamma_{ii} + \theta_{ii})\} +$$

$$c_{2n}(\cos\gamma_i - \cos\gamma_{ii})]^2 \Big|$$

$$= g\{-m_{ba}\sin\beta + m_b(b_0\sin\alpha + c_0\cos\alpha)\cos\beta\} + \qquad (146)$$

$$\frac{1}{2}k_{zi}e_{0i}^2\{\sin(\gamma_i + \theta_i) + \sin(\gamma_{ii} + \theta_{ii})\}^2 +$$

$$\sum_n^{i,ii}\rangle g[\{m_{sn}z_{6n}\cos(\alpha + \gamma_n + \eta_n) + m_{awln}\sin(\alpha + \gamma_n + \theta_n) +$$

$$m_{sawcn}\cos(\alpha + \gamma_n) + m_{sawbn}\sin\alpha\}\cos\beta - m_{sawan}\sin\beta] +$$

$$\frac{1}{2}k_{sn}(z_{6n} - l_{sn})^2 + \frac{1}{2}k_{wn}(z_{12n} - l_{wn})^2\langle$$

where $$m_{ba} = m_b(\alpha_0 + \alpha_1)$$

$$m_{sawan} = (m_{sn} + m_{an} + m_{wn})\alpha_{1n}$$

$$m_{sawbn} = (m_{sn} + m_{an} + m_{wn})b_{2n}$$

$$m_{sawcn} = m_{sn}c_{1n} + (m_{an} + m_{wn})c_{2n}$$

$$\gamma_{ii} = -\gamma_i \qquad (147)$$

4. Lagrange's Equation

The Lagrangian is written as:

$$L = T_{tot} - U_{tot} \qquad (148)$$

$$= \frac{1}{2}[\dot{\alpha}^2 m_{bbl} + \dot{\beta}^2\{m_{bal} + m_b(b_0\sin\alpha + c_0\cos\alpha)^2\} -$$

$$2\dot{\alpha}\dot{\beta}m_{ba}(b_0\cos\alpha - c_0\sin\alpha)] + \frac{1}{2}\sum_n^{i,ii}\Big| m_{sn}(\dot{z}_{6n}^2 + \dot{\eta}_n^2 z_{6n}^2) +$$

$$\dot{\theta}_n^2 m_{aw2ln} + \dot{\alpha}^2)m_{sawln} + m_{sn}z_{6n}[z_{6n} + 2\{c_{1n}\cos\eta_n -$$

$$b_{2n}\sin(\gamma_n + \eta_n)\}] - 2m_{awln}\{c_{2n}\sin\theta_n - b_{2n}\cos(\gamma_n + \theta_n)\}\langle +$$

-continued $\dot{\beta}^2) m_{saw2n} + m_{sn} \{z_{6n} \cos(\alpha + \gamma_n + \eta_n) + c_{1n} \cos(\alpha + \gamma_n) +$ $b_{2n} \sin\alpha\}^2 + m_{an} \{e_{1n} \sin(\alpha + \gamma_n + \theta_n) + c_{2n} \cos(\alpha + \gamma_n) +$ $b_{2n} \sin\alpha\}^2 + m_{wn} \{e_3 \sin(\alpha + \gamma_n + \theta_n) + c_{2n} \cos(\alpha + \gamma_n) +$ $b_{2n} \sin\alpha\}^2 \rangle + 2\dot{z}_{6n} \dot{\alpha} m_{sn} \{c_{1n} \sin\eta_n + b_{2n} \cos(\gamma_n + \eta_n)\} -$ $2\dot{z}_{6n} \dot{\beta} m_{sn} a_{1n} \cos(\alpha + \gamma_n + \eta_n) + 2\dot{\eta}_n \dot{\alpha} m_{sn} z_{6n} \{z_{6n} +$ $c_{1n} \cos\eta_n - b_{2n} \sin(\gamma_n + \eta_n)\} + 2\dot{\eta}_n \dot{\beta} m_{sn} z_{6n} a_{1n} \sin(\alpha +$ $\gamma_n + \eta_n) + 2\dot{\theta}\dot{\alpha}[m_{aw2ln} - m_{awln} \{c_{2n} \sin\theta_n - b_{2n} \cos(\gamma_n +$ $\theta_n)\}] - 2\dot{\theta}\dot{\beta} m_{awln} a_{1n} \cos(\alpha + \gamma_n + \theta_n) +$ $2\dot{\alpha}\dot{\beta} a_{1n} \{m_{sawcn} \sin(\alpha + \gamma_n) - m_{sawbn} \cos\alpha +$ $m_{sn} z_{6n} \sin(\alpha + \gamma_n + \eta_n) - m_{awln} \cos(\alpha + \gamma_n + \theta_n)\} | -$ $g\{-m_{ba} \sin\beta + m_b(b_0 \sin\alpha + c_0 \cos\alpha) \cos\beta\} +$ $\frac{1}{2} k_{zi} e_{0i}^2 \{\sin(\gamma_i + \theta_i) + \sin(\gamma_{ii} + \theta_{ii})\}^2 -$ $\sum_{n}^{i,ii} \rangle g[\{m_{sn} z_{6n} \cos(\alpha + \gamma_n + \eta_n) + m_{awln} \sin(\alpha + \gamma_n + \theta_n) +$ $m_{sawcn} \cos(\alpha + \gamma_n) + m_{sawbn} \sin\alpha\} \cos\beta - m_{sawan} \sin\beta] +$ $\frac{1}{2} k_{sn} (z_{6n} - l_{sn})^2 + \frac{1}{2} k_{wn} (z_{12n} - l_{wn})^2 \langle$ $$\frac{\partial L}{\partial \beta} = g\{m_{ba} \cos\beta + m_b(b_0 \sin\alpha + c_0 \cos\alpha) \sin\beta\} + \qquad (149)$$

$\sum_{n}^{i,ii} \rangle g[\{m_{sn} z_{6n} \cos(\alpha + \gamma_n + \eta_n) +$ $m_{awln} \sin(\alpha + \gamma_n + \theta_n) + m_{sawcn} \cos(\alpha + \gamma_n) +$ $m_{sawbn} \sin\alpha\} \sin\beta + m_{sawan} \cos\beta] \langle$ $$\frac{\partial L}{\partial \alpha} = \{\dot{\beta}^2 m_b(b_0 \cos\alpha - c_0 \sin\alpha) + \dot{\alpha}\dot{\beta} m_{ba}\}(b_0 \sin\alpha + \qquad (150)$$

$c_0 \cos\alpha) + \sum_{n}^{i,ii} \left| +\dot{\beta}^2 \right\rangle m_{sn} \{z_{6n} \cos(\alpha + \gamma_n + \eta_n) +$ $c_{1n} \cos(\alpha + \gamma_n) + b_{2n} \sin\alpha\} \{-z_{6n} \sin(\alpha + \gamma_n + \eta_n) -$ $c_{1n} \sin(\alpha + \gamma_n) + b_{2n} \cos\alpha\} + m_{an}\{e_{1n} \sin(\alpha + \gamma_n + \theta_n) +$ $c_{2n} \cos(\alpha + \gamma_n) + b_{2n} \sin\alpha\}\{e_1 \cos(\alpha + \gamma_n + \theta_n) -$ $c_{2n} \sin(\alpha + \gamma_n) + b_{2n} \cos\alpha\} + m_{wn}\{e_{3n} \sin(\alpha + \gamma_n + \theta_n) +$ $c_{2n} \cos(\alpha + \gamma_n) + b_{2n} \sin\alpha\}\{e_3 \cos(\alpha + \gamma_n + \theta_n) -$ $c_{2n} \sin(\alpha + \gamma_n) + b_{2n} \cos\alpha\}\langle + \dot{z}_{6n} \dot{\beta} m_{sn} a_{1n} \sin(\alpha + \gamma_n +$ $\eta_n)(+\dot{\eta}_n \dot{\beta} m_{sn} z_{6n} a_{1n} \cos(\alpha + \gamma_n + \eta_n) +$ $\dot{\theta}\dot{\beta} m_{awln} a_{1n} \sin(\alpha + \gamma_n + \theta_n) +$ $\dot{\alpha}\dot{\beta} a_{1n}\{m_{sawcn} \cos(\alpha + \gamma_n) + m_{sawbn} \sin\alpha +$ $m_{sn} z_{6n} \cos(\alpha + \gamma_n + \eta_n) + m_{awln} \sin(\alpha + \gamma_n + \theta_n)\}| -$ $gm_b(b_0 \cos\alpha - c_0 \sin\alpha) \cos\beta +$ $\sum_{n}^{i,ii} g\{m_{sn} z_{6n} \sin(\alpha + \gamma_n + \eta_n) -$ $m_{awln} \cos(\alpha + \gamma_n + \theta_n) + m_{sawcn} \sin(\alpha + \gamma_n) -$ $m_{sawbn} \cos\alpha\} \cos\beta$ $$\frac{\partial L}{\partial \eta_n} = \dot{\alpha}^2 m_{sn} z_{6n} \{-c_{1n} \sin\eta_n - b_{2n} \cos(\gamma_n + \eta_n)\} + \qquad (151)$$

$\dot{\beta}^2 m_{sn} \{z_{6n} \cos(\alpha + \gamma_n + \eta_n) + c_{1n} \cos(\alpha + \gamma_n) +$ $b_{2n} \sin\alpha\}\{-z_{6n} \sin(\alpha + \gamma_n + \eta_n)\} +$ $\dot{z}_{6n} \dot{\alpha} m_{sn} \{c_{1n} \cos\eta_n - b_{2n} \sin(\gamma_n + \eta_n)\} +$ $\dot{z}_{6n} \dot{\beta} m_{sn} a_{1n} \sin(\alpha + \gamma_n + \eta_n) - \dot{\eta}_n \dot{\alpha} m_{sn} z_{6n} \{c_{1n} \sin\eta_n +$ $b_{2n} \cos(\gamma_n + \eta_n)\} + \dot{\eta}_n \dot{\beta} m_{sn} z_{6n} a_{1n} \cos(\alpha + \gamma_n + \eta_n) +$ $\dot{\alpha}\dot{\beta} a_{1n} m_{sn} z_{6n} \cos(\alpha + \gamma_n + \eta_n) +$ $g m_{sn} z_{6n} \sin(\alpha + \gamma_n + \eta_n) \cos\beta$ $$\frac{\partial L}{\partial \theta_n} = k_{zi} e_{0i}^2 \{\sin(\gamma_i + \theta_i) + \sin(\gamma_{ii} + \theta_{ii})\} \cos(\gamma_n + \theta_n) - \qquad (152)$$

$\dot{\alpha}^2 m_{awln} \{c_{2n} \cos\theta_n + b_{2n} \sin(\gamma_n + \theta_n)\} +$ $\dot{\beta}^2 \langle m_{an}\{e_{1n} \sin(\alpha + \gamma_n + \theta_n) + c_{2n} \cos(\alpha + \gamma_n) +$ $b_{2n} \sin\alpha\} e_{1n} \cos(\alpha + \gamma_n + \theta_n) + m_{wn}\{e_{3n} \sin(\alpha +$ $\gamma_n + \theta_n) + c_{2n} \cos(\alpha + \gamma_n) + b_{2n} \sin\alpha\} e_{3n} \cos(\alpha +$ $\gamma_n + \theta_n)\rangle - \dot{\theta}\dot{\alpha} m_{awln} \{c_{2n} \cos\theta_n + b_{2n} \sin(\gamma_n + \theta_n)\} +$ $\dot{\theta}\dot{\beta} m_{awln} a_{1n} \sin(\alpha + \gamma_n + \theta_n) + \dot{\alpha}\dot{\beta} a_{1n} m_{awln} \sin(\alpha +$ $\gamma_n + \theta_n) - g m_{awln} \cos(\alpha + \gamma_n + \theta_n) \cos\beta$ $$\frac{\partial L}{\partial z_{6n}} = m_{sn} \dot{\eta}_n^2 z_{6n} + \dot{\alpha}^2 m_{sn} [z_{6n} + \{c_{1n} \cos\eta_n - \qquad (153)$$

$b_{2n} \sin(\gamma_n + \eta_n)\}] + \dot{\beta}^2 m_{sn} \{z_{6n} \cos(\alpha + \gamma_n + \eta_n) +$ $c_{1n} \cos(\alpha + \gamma_n) + b_{2n} \sin\alpha\} \cos(\alpha + \gamma_n + \eta_n) +$ $\dot{\eta}_n \dot{\alpha} m_{sn} \{2z_{6n} + c_{1n} \cos\eta_n - b_{2n} \sin(\gamma_n + \eta_n)\} +$ $\dot{\eta}_n \dot{\beta} m_{sn} a_{1n} \sin(\alpha + \gamma_n + \eta_n) + \dot{\alpha}\dot{\beta} a_{1n} m_{sn} \sin(\alpha +$ $\gamma_n + \eta_n) - g m_{sn} \cos(\alpha + \gamma_n + \eta_n) \cos\beta -$ $k_{sn}(z_{6n} - l_{sn})$ $$\frac{\partial L}{\partial z_{12n}} = -k_{wn}(z_{12n} - l_{wn}) \qquad (154)$$

$$\frac{\partial L}{\partial \dot{\beta}} = \dot{\beta}\langle m_{saw2n} + m_{bal} + m_b(b_0 \sin\alpha + c_0 \cos\alpha)^2 + \qquad (155)$$

$m_{sn}\{z_{6n} \cos(\alpha + \gamma_n + \eta_n) + c_{1n} \cos(\alpha + \gamma_n) +$ $b_{2n} \sin\alpha\}^2 + m_{an}\{e_{1n} \sin(\alpha + \gamma_n + \theta_n) +$ $c_{2n} \cos(\alpha + \gamma_n) + b_{2n} \sin\alpha\}^2 + m_{wn}\{e_{3n} \sin(\alpha + \gamma_n +$ $(\theta_n) + c_{2n} \cos(\alpha + \gamma_n) + b_{2n} \sin\alpha\})^2\rangle -$ $\dot{\alpha} m_{ba}(b_0 \cos\alpha - c_0 \sin\alpha) - \dot{z}_{6n} m_{sn} a_{1n} \cos(\alpha + \gamma_n + \eta_n) +$ $\dot{\eta}_n m_{sn} z_{6n} a_{1n} \sin(\alpha + \gamma_n + \eta_n) - \dot{\theta} m_{awln} a_{1n} \cos(\alpha + \gamma_n +$ $\theta_n) + \dot{\alpha} a_{1n}\{m_{sawcn} \sin(\alpha + \gamma_n) - m_{sawbn} \cos\alpha +$ $m_{sn} z_{6n} \sin(\alpha + \gamma_n + \eta_n) - m_{awln} \cos(\alpha + \gamma_n + \theta_n)\}$ $$\frac{d}{dt}\left(\frac{\partial L}{\partial \dot{\beta}}\right) = \ddot{\beta}\big)m_{saw2n} + m_{bal} + m_b(b_0\sin\alpha + c_0\cos\alpha)^2 + \quad (156)$$
$$m_{sn}\{z_{6n}\cos(\alpha+\gamma_n+\eta_n) + c_{1n}\cos(\alpha+\gamma_n) +$$
$$b_{2n}\sin\alpha\}^2 + m_{an}\{e_{1n}\sin(\alpha+\gamma_n+\theta_n) +$$
$$c_{2n}\cos(\alpha+\gamma_n) + b_{2n}\sin\alpha\}^2 + m_{wn}\{e_{3n}\sin(\alpha+$$
$$(\gamma_n+\theta_n) + c_{2n}\cos(\alpha+\gamma_n) + b_{2n}\sin\alpha\})^2\langle +$$
$$2\dot{\beta}\big)\dot{\alpha}m_b(b_0\sin\alpha + c_0\cos\alpha)(b_0\cos\alpha - c_0\sin\alpha) +$$
$$m_{sn}\{z_{6n}\cos(\alpha+\gamma_n+\eta_n) + c_{1n}\cos(\alpha+\gamma_n) +$$
$$b_{2n}\sin\alpha\}\{\dot{z}_{6n}\cos(\alpha+\gamma_n+\eta_n) - (\dot{\alpha}+$$
$$\dot{\eta}_n)z_{6n}\sin(\alpha+\gamma_n+\eta_n) - \dot{\alpha}[c_{1n}\sin(\alpha+\gamma_n) -$$
$$b_{2n}\cos\alpha]\} + m_{an}\{e_{1n}\sin(\alpha+\gamma_n+\theta_n) +$$
$$c_{2n}\cos(\alpha+\gamma_n) + b_{2n}\sin\alpha\}\{(\dot{\alpha}+\dot{\theta}_n)e_{1n}\cos(\alpha+$$
$$\gamma_n+\theta_n) - \dot{\alpha}[c_{2n}\sin(\alpha+\gamma_n) - b_{2n}\cos\alpha]\} +$$
$$m_{wn}\{e_{3n}\sin(\alpha+\gamma_n+\theta_n) + c_{2n}\cos(\alpha+\gamma_n) +$$
$$b_{2n}\sin\alpha\}\{(\dot{\alpha}+\dot{\theta}_n)e_{3n}\sin(\alpha+\gamma_n+\theta_n) -$$
$$\dot{\alpha}[c_{2n}\sin(\alpha+\gamma_n) - b_{2n}\cos\alpha]\}\langle-\dot{\alpha}m_{ba}(b_0\cos\alpha -$$
$$c_0\sin\alpha) + \dot{\alpha}^2 m_{ba}(b_0\sin\alpha + c_0\cos\alpha) -$$
$$\ddot{z}_{6n}m_{sn}a_{1n}\cos(\alpha+\gamma_n+\eta_n) +$$
$$\dot{z}_{6n}(\dot{\alpha}+\dot{\eta}_n)m_{sn}a_{1n}\sin(\alpha+\gamma_n+\eta_n) +$$
$$\ddot{\eta}_n m_{sn}z_{6n}a_{1n}\sin(\alpha+\gamma_n+\eta_n) +$$
$$\dot{\eta}_n m_{sn}\dot{z}_{6n}a_{1n}\sin(\alpha+\gamma_n+\eta_n) + \dot{\eta}_n(\dot{\alpha}+$$
$$\dot{\eta}_n)m_{sn}z_{6n}a_{1n}\cos(\alpha+\gamma_n+\eta_n) -$$
$$\ddot{\theta}_n m_{awIn}a_{1n}\cos(\alpha+\gamma_n+\theta_n) + \dot{\theta}_n(\dot{\alpha}+$$
$$\dot{\theta}_n)m_{awIn}a_{1n}\sin(\alpha+\gamma_n+\theta_n) +$$
$$\ddot{\alpha}a_{1n}\{m_{sawcn}\sin(\alpha+\gamma_n) - m_{sawbn}\cos\alpha +$$
$$m_{sn}z_{6n}\sin(\alpha+\gamma_n+\eta_n) - m_{awIn}\cos(\alpha+\gamma_n+$$
$$\theta_n)\} + \dot{\alpha}a_{1n}\{\dot{\alpha}m_{sawcn}\cos(\alpha+\gamma_n) + \dot{\alpha}m_{sawbn}\sin\alpha +$$
$$(\dot{\alpha}+\dot{\eta}_n)m_{sn}z_{6n}\cos(\alpha+\gamma_n+\eta_n) + m_{sn}\dot{z}_{6n}\sin(\alpha+$$
$$\gamma_n+\eta_n) + (\dot{\alpha}+\dot{\theta}_n)m_{awIn}\sin(\alpha+\gamma_n+\theta_n)\}$$

$$\frac{\partial L}{\partial \dot{\alpha}} = \dot{\alpha}m_{bbl} - \dot{\beta}m_{ba}(b_0\cos\alpha - c_0\sin\alpha) + \dot{\alpha}\big)m_{sawIn} + \quad (157)$$
$$m_{sn}z_{6n}[z_{6n} + 2\{c_{1n}\cos\eta_n - b_{2n}\sin(\gamma_n+\eta_n)\}] -$$
$$2m_{awIn}\{c_{2n}\sin\theta_n - b_{2n}\cos(\gamma_n+\theta_n)\}\langle +$$
$$\dot{z}_{6n}m_{sn}\{c_{1n}\sin\eta_n + b_{2n}\cos(\gamma_n+\eta_n)\} +$$
$$\dot{\eta}_n m_{sn}z_{6n}\{z_{6n} + c_{1n}\cos\eta_n - b_{2n}\sin(\gamma_n+\eta)\} +$$
$$\dot{\theta}[m_{aw2ln} - m_{awIn}\{c_{2n}\sin\theta_n - b_{2n}\cos(\gamma_n+\theta_n)\}] +$$
$$\dot{\beta}a_{1n}\{m_{sawcn}\sin(\alpha+\gamma_n) - m_{sawbn}\cos\alpha +$$
$$m_{sn}z_{6n}\sin(\alpha+\gamma_n+\eta_n) - m_{awIn}\cos(\alpha+\gamma_n+\theta_n)\}$$

$$\frac{d}{dt}\left(\frac{\partial L}{\partial \dot{\alpha}}\right) = -\ddot{\beta}m_{ba}(b_0\cos\alpha - c_0\sin\alpha) + \dot{\beta}\dot{\alpha}m_{ba}(b_0\sin\alpha + \quad (158)$$
$$c_0\cos\alpha) + \ddot{\alpha}\big)m_{bbl} + m_{sawIn} + m_{sn}z_{6n}[z_{6n} +$$
$$2\{c_{1n}\cos\eta_n - b_{2n}\sin(\gamma_n+\eta_n)\}] -$$
$$2m_{awIn}\{c_{2n}\sin\theta_n - b_{2n}\cos(\gamma_n+\theta_n)\}\langle +$$
$$\dot{\alpha}\big)m_{sn}\dot{z}_{6n}[z_{6n} + 2\{c_{1n}\cos\eta_n - b_{2n}\sin(\gamma_n+$$
$$\eta_n)\}] + m_{sn}z_{6n}[\dot{z}_{6n} - 2\dot{\eta}_n\{c_{1n}\sin\eta_n +$$
$$b_{2n}\cos(\gamma_n+\eta_n)\}] - 2\dot{\theta}_n m_{awIn}\{c_{2n}\cos\theta_n +$$
$$b_{2n}\sin(\gamma_n+\theta_n)\}\langle+\ddot{z}_{6n}m_{sn}\{c_{1n}\sin\eta_n +$$
$$b_{2n}\cos(\gamma_n+\eta_n)\} + \dot{z}_{6n}\dot{\eta}_n m_{sn}\{c_{1n}\cos\eta_n -$$
$$b_{2n}\sin(\gamma_n+\eta_n)\} + \ddot{\eta}_n m_{sn}z_{6n}\{z_{6n} + c_{1n}\cos\eta_n -$$
$$b_{2n}\sin(\gamma_n+\eta_n)\} + \dot{\eta}_n m_{sn}\dot{z}_{6n}\{z_{6n} + c_{1n}\cos\eta_n -$$
$$b_{2n}\sin(\gamma_n+\eta_n)\} + \dot{\eta}_n m_{sn}z_{6n}\{\dot{z}_{6n} -$$
$$\dot{\eta}_n[c_{1n}\sin\eta_n - b_{2n}\cos(\gamma_n+\eta_n)]\} +$$
$$\ddot{\theta}[m_{aw2ln} - m_{awIn}\{c_{2n}\sin\theta_n - b_{2n}\cos(\gamma_n+\theta)\}] -$$
$$\dot{\theta}_n^2 m_{awIn}\{c_{2n}\cos\theta_n + b_{2n}\sin(\gamma_n+\theta_n)\} +$$
$$\ddot{\beta}a_{1n}\{m_{sawcn}\sin(\alpha+\gamma_n) - m_{sawbn}\cos\alpha +$$
$$m_{sn}z_{6n}\sin(\alpha+\gamma_n+\eta_n) - m_{awIn}\cos(\alpha+\gamma_n+$$
$$\theta_n)\} + \dot{\beta}a_{1n}\{\dot{\alpha}[m_{sawcn}\cos(\alpha+\gamma_n) + m_{sawbn}\sin\alpha] +$$
$$m_{sn}\dot{z}_{6n}\sin(\alpha+\gamma_n+\eta_n) + (\dot{\alpha}+\dot{\eta}_n)m_{sn}z_{6n}\cos(\alpha+$$
$$\gamma_n+\eta_n) + (\dot{\alpha}+\dot{\theta}_n)m_{awIn}\sin(\alpha+\gamma_n+\theta_n)\}$$

$$\frac{\partial L}{\partial \dot{\eta}_n} = m_{sn}\dot{\eta}_n z_{6n}^2 + \dot{\alpha}m_{sn}z_{6n}\{z_{6n} + c_{1n}\cos\eta_n - \quad (159)$$
$$b_{2n}\sin(\gamma_n+\eta_n)\} + \dot{\beta}m_{sn}z_{6n}a_{1n}\sin(\alpha+\gamma_n+\eta_n)$$

$$\frac{d}{dt}\left(\frac{\partial L}{\partial \dot{\eta}_n}\right) = m_{sn}\ddot{\eta}_n z_{6n}^2 + 2m_{sn}\dot{\eta}_n \dot{z}_{6n}z_{6n} + \quad (160)$$
$$\ddot{\alpha}m_{sn}z_{6n}\{z_{6n} + c_{1n}\cos\eta_n - b_{2n}\sin(\gamma_n+\eta_n)\} +$$
$$\dot{\alpha}m_{sn}\dot{z}_{6n}\{z_{6n} + c_{1n}\cos\eta_n - b_{2n}\sin(\gamma_n+\eta_n)\} +$$
$$\dot{\alpha}m_{sn}z_{6n}\{\dot{z}_{6n} - \dot{\eta}_n[c_{1n}\sin\eta_n + b_{2n}\cos(\gamma_n+$$
$$\eta_n)]\} + \ddot{\beta}m_{sn}z_{6n}a_{1n}\sin(\alpha+\gamma_n+\eta_n) +$$
$$\dot{\beta}m_{sn}\dot{z}_{6n}a_{1n}\sin(\alpha+\gamma_n+\eta_n) +$$
$$\dot{\beta}(\dot{\alpha}+\dot{\eta}_n)m_{sn}z_{6n}a_{1n}\cos(\alpha+\gamma_n+\eta_n)$$

$$\frac{\partial L}{\partial \dot{\theta}_n} = \dot{\theta}_n m_{aw2ln} + \dot{\alpha}[m_{aw2ln} - m_{awIn}\{c_{2n}\sin\theta_n - \quad (161)$$
$$b_{2n}\cos(\gamma_n+\theta_n)\}] - \dot{\beta}m_{awIn}a_{1n}\cos(\alpha+\gamma_n+\theta_n)$$

$$\frac{d}{dt}\left(\frac{\partial L}{\partial \dot{\theta}_n}\right) = \ddot{\theta}_n m_{aw2ln} + \ddot{\alpha}[m_{aw2ln} - m_{awIn}\{c_{2n}\sin\theta_n - \quad (162)$$
$$b_{2n}\cos(\gamma_n+\theta_n)\}] - \dot{\alpha}\dot{\theta}_n m_{awIn}\{c_{2n}\cos\theta_n +$$
$$b_{2n}\sin(\gamma_n+\theta_n)\} - \ddot{\beta}m_{awIn}a_{1n}\cos(\alpha+\gamma_n+$$
$$\theta_n) + \dot{\beta}(\dot{\alpha}+\dot{\theta}_n)m_{awIn}a_{1n}\sin(\alpha+\gamma_n+\theta_n)$$

-continued $$\frac{\partial L}{\partial \dot{z}_{6n}} = m_{sn}\dot{z}_{6n} + \dot{\alpha}m_{sn}\{c_{1n}\sin\eta_n + b_{2n}\cos(\gamma_n + \eta_n)\} - \dot{\beta}m_{sn}a_{1n}\cos(\alpha + \gamma_n + \eta_n) \quad (163)$$

$$\frac{d}{dt}\left(\frac{\partial L}{\partial \dot{z}_{6n}}\right) = m_{sn}\ddot{z}_{6n} + \ddot{\alpha}m_{sn}\{c_{1n}\sin\eta_n + b_{2n}\cos(\gamma_n + \eta_n)\} + \dot{\alpha}\dot{\eta}_n m_{sn}\{c_{1n}\cos\eta_n - b_{2n}\sin(\gamma_n + \eta_n)\} - \ddot{\beta}m_{sn}a_{1n}\cos(\alpha + \gamma_n + \eta_n) + \dot{\beta}(\dot{\alpha} + \dot{\eta}_n)m_{sn}a_{1n}\sin(\alpha + \gamma_n + \eta_n) \quad (164)$$

$$\frac{\partial L}{\partial \dot{z}_{12n}} = 0 \quad (165)$$

$$\frac{d}{dt}\left(\frac{\partial L}{\partial \dot{z}_{12n}}\right) = 0 \quad (166)$$

The dissipative function is:

$$F_{tot} = -\frac{1}{2}(c_{sn}\dot{z}_{6n}^2 + c_{wn}\dot{z}_{12n}^2) \quad (167)$$

The constraints are based on geometrical constraints, and the touch point of the road and the wheel. The geometrical constraint is expressed as $$e_{2n}\cos\theta_n = -(z_{6n}-d_{1n})\sin\eta_n$$

$$e_{2n}\sin\theta_n - (z_{6n}-d_{1n})\cos\eta_n = c_{1n}-c_{2n} \quad (168)$$

The touch point of the road and the wheel is defined as $$z_{in} = z_{Ptouchpoint\,n'}$$
$$= \{z_{12n}\cos\alpha + e_{3n}\sin(\alpha+\gamma_n+\theta_n) + c_{2n}\cos(\alpha+\gamma_n) + b_{2n}\sin\alpha\}\cos\beta - a_{1n}\sin\beta$$
$$= R_n(t) \quad (169)$$

where $R_n(t)$ is road input at each wheel. Differentials are:

$$\dot{\theta}_n e_{2n}\sin\theta_n - \dot{z}_{6n}\sin\eta_n - \dot{\eta}_n(z_{6n}-d_{1n})\cos\eta_n = 0$$

$$\dot{\theta}_n e_{2n}\cos\theta_n - \dot{z}_{6n}\cos\eta_n + \dot{\eta}_n(z_{6n}-d_{1n})\sin\eta_n = 0$$

$$\{\dot{z}_{12n}\cos\alpha - \dot{\alpha}z_{12n}\sin\alpha + (\dot{\alpha}+\dot{\theta}_n)e_{3n}\cos(\alpha+\gamma_n+\theta_n) - \dot{\alpha}c_{2n}\sin(\alpha+\gamma_n) + \dot{\alpha}b_{2n}\cos\alpha\}\cos\beta$$
$$-\dot{\beta}[\{z_{12n}\cos\alpha + e_{3n}\sin(\alpha+\gamma_n+\theta_n) + c_{2n}\cos(\alpha+\gamma_n) + b_{2n}\sin\alpha\}\sin\beta + a_{1n}\cos\beta] - \dot{R}_n(t) = 0 \quad (170)$$

Since the differentials of these constraints are written as $$\sum_j a_{lnj}dq_j + a_{lnt}dt = 0 \quad (l=1,2,3\ n=i,ii) \quad (171)$$

then the values $a_{lnj}$ are obtained as follows.

$\alpha_{1n1}=0, \alpha_{1n2}=0, \alpha_{1n3}=-(z_{6n}-d_{1n})\cos\eta_n, \alpha_{1n4}=e_{2n}\sin\theta_n, \alpha_{1n5}=-\sin\eta_n, \alpha_{1n6}=0$ $\alpha_{2n1}=0, \alpha_{2n2}=0, \alpha_{2n3}=(z_{6n}-d_{1n})\sin\eta_n, \alpha_{2n4}=e_{2n}\cos\theta_n, \alpha_{2n5}=-\cos\eta_n, \alpha_{2n6}=0$ $\alpha_{3n1}=-\{z_{12n}\cos\alpha + e_{3n}\sin(\alpha+\gamma_n+\theta_n) + c_{2n}\cos(\alpha+\gamma_n) + b_{2n}\sin\alpha\}\sin\beta + a_{1n}\cos\beta$, $\alpha_{3n2}=\{-z_{12n}\sin\alpha + e_{3a}\cos(\alpha+\gamma_n+\theta_n) - c_{2n}\sin(\alpha+\gamma_n) + b_{2n}\cos\alpha\}\cos\beta$, $\alpha_{3n3}=0, \alpha_{3n4}=e_{3n}\cos(\alpha+\gamma_n+\theta_n)\cos\eta, \alpha_{3n5}=0, \alpha_{3n6}=\cos\alpha\cos\eta \quad (172)$ From the above, Lagrange's equation becomes $$\frac{d}{dt}\left(\frac{\partial L}{\partial \dot{q}_j}\right) - \frac{\partial L}{\partial q_j} = Q_j + \sum_{l,n}\lambda_{ln}a_{lnj} \quad (173)$$

where $q_1=\beta, q_2=\alpha, q_{3i}=\eta_i, q_{4i}=\theta_i, q_{5i}=z_{6i}, q_{6i}=z_{12i}$ $q_{3ii}=\eta_{ii}, q_{4ii}=\theta_{ii}, q_{5ii}=z_{6ii}, q_{6ii}=z_{12ii} \quad (174)$ can be obtained as follows:

$$\frac{d}{dt}\left(\frac{\partial L}{\partial \dot{\beta}}\right) - \frac{\partial L}{\partial \beta} = \frac{\partial F}{\partial \dot{\beta}} + \sum_{l,n}\lambda_{ln}a_{lnI} \quad (175)$$

$$\ddot{\beta})m_{saw2n} + m_{bal} + m_b(b_0\sin\alpha + c_0\cos\alpha)^2 + \quad (176)$$
$$m_{sn}\{\dot{z}_{6n}\cos(\alpha+\gamma_n+\eta_n) + c_{1n}\cos(\alpha+\gamma_n) + b_{2n}\sin\alpha\}^2 +$$
$$m_{an}\{e_{1n}\sin(\alpha+\gamma_n+\theta_n) + c_{2n}\cos(\alpha+\gamma_n) + b_{2n}\sin\alpha\}^2 + m_{wn}$$
$$\{e_{3n}\sin(\alpha+\gamma_n+\theta_n) + c_{2n}\cos(\alpha+\gamma_n) + b_{2n}\sin\alpha\}^2\langle+2\dot{\beta}\rangle\dot{\alpha}m_b(b_0\sin\alpha +$$
$$c_0\cos\alpha + c_0\cos\alpha)(b_0\cos\alpha - c_0\sin\alpha) +$$
$$m_{sn}\{\dot{z}_{6n}\cos(\alpha+\gamma_n+\eta_n) +$$
$$c_{1n}\cos(\alpha+\gamma_n) + b_{2n}\sin\alpha\}\{\dot{z}_{6n}\cos(\alpha+\gamma_n+\eta_n) -$$
$$(\dot{\alpha}+\dot{\eta}_n)z_{6n}\sin(\alpha+\gamma_n+\eta_n) - \dot{\alpha}[c_{1n}\sin(\alpha+\gamma_n) - b_{2n}\cos\alpha]\} +$$
$$m_{an}\{e_{1n}\sin(\alpha+\gamma_n+\theta_n) + c_{2n}\cos(\alpha+\gamma_n) +$$
$$b_{2n}\sin\alpha\}\{(\dot{\alpha}+\dot{\theta}_n)e_{1n}\cos(\alpha+\gamma_n+\theta_n) -$$
$$\dot{\alpha}[c_{2n}\sin(\alpha+\gamma_n) - b_{2n}\cos\alpha]\} +$$
$$m_{wn}\{e_{3n}\sin(\alpha+\gamma_n+\theta_n) + c_{2n}\cos(\alpha+\gamma_n) +$$
$$b_{2n}\sin\alpha\}\{(\dot{\alpha}+\dot{\theta}_n)e_{3n}\sin(\alpha+\gamma_n+\theta_n) -$$
$$\dot{\alpha}[c_{2n}\sin(\alpha+\gamma_n) - b_{2n}\cos\alpha]\}\{-\dot{\alpha}m_{ba}(b_0\cos\alpha - c_0\sin\alpha) +$$
$$\dot{\alpha}^2 m_{ba}(b_0\sin\alpha + c_0\cos\alpha) - \dot{z}_{6n}m_{sn}a_{1n}\cos(\alpha+\gamma_n+\eta_n) +$$
$$\dot{z}_{6n}(\dot{\alpha}+\dot{\eta}_n)m_{sn}a_{1n}\sin(\alpha+\gamma_n+\eta_n) +$$
$$\ddot{\eta}_n m_{sn}z_{6n}a_{1n}\sin(\alpha+\gamma_n+\eta_n) + \dot{\eta}_n m_{sn}\dot{z}_{6n}a_{1n}\sin(\alpha+\gamma_n+\eta_n) +$$
$$\dot{\eta}_n(\dot{\alpha}+\dot{\eta}_n)m_{sn}z_{6n}a_{1n}\cos(\alpha+\gamma_n+\eta_n) -$$
$$\ddot{\theta}_n m_{awIn}a_{1n}\cos(\alpha+\gamma_n+\theta_n) +$$
$$\dot{\theta}_n(\dot{\alpha}+\dot{\theta}_n)m_{awIn}a_{1n}\sin(\alpha+\gamma_n+\theta_n) +$$
$$\ddot{\alpha}a_{1n}\{m_{sawcn}\sin(\alpha+\gamma_n) - m_{sawbn}\cos\alpha +$$
$$m_{sn}z_{6n}\sin(\alpha+\gamma_n+\eta_n) - m_{awIn}\cos(\alpha+\gamma_n+\theta_n)\} +$$
$$\dot{\alpha}a_{1n}\{\dot{\alpha}m_{sawcn}\cos(\alpha+\gamma_n) + \dot{\alpha}m_{sawbn}\sin\alpha +$$
$$(\dot{\alpha}+\dot{\eta}_n)m_{sn}\cos(\alpha+\gamma_n+\eta_n) + m_{sn}\dot{z}_{6n}\sin(\alpha+\gamma_n+\eta_n) +$$
$$(\dot{\alpha}+\dot{\theta}_n)m_{awIn}\sin(\alpha+\gamma_n+\theta_n)\} -$$
$$g\{m_{ba}\cos\beta + m_b(b_0\sin\alpha + c_0\cos\alpha)\sin\beta\} -$$

-continued $$\sum_n^{i,ii} g[\{m_{sn}z_{6n}\cos(\alpha+\gamma_n+\eta_n)+m_{awIn}\sin(\alpha+\gamma_n+\theta_n)+$$
$$m_{awcn}\cos(\alpha+\gamma_n)+m_{sawbn}\sin\alpha\}\sin\beta+$$
$$m_{sawan}\cos\beta]\} = \lambda_{3n}[-\{z_{12n}\cos\alpha+e_{3n}\sin(\alpha+\gamma_n+\theta_n)+$$
$$c_{2n}\cos(\alpha+\gamma_n)+b_{2n}\sin\alpha\}\sin\beta+a_{1n}\cos\beta]$$

$$\ddot{\beta}(m_{saw2n}+m_{bal}+m_bA_1^2+m_{sn}B_1^2+m_{an}B_2^2+m_{wn}B_3^2)+ \quad (177)$$
$$2\dot{\beta}[\dot{\alpha}m_bA_1A_2+m_{sn}B_1\{\dot{z}_{6n}C_{\alpha\gamma\eta n}-(\dot{\alpha}+\dot{\eta}_n)z_{6n}S_{\alpha\gamma\eta n}-\dot{\alpha}A_4\}+$$
$$m_{an}B_2\{(\dot{\alpha}+\dot{\theta}_n)e_{1n}C_{\alpha\gamma\theta n}-\dot{\alpha}A_6\}+$$
$$m_{wn}B_3\{(\dot{\alpha}+\dot{\theta}_n)e_{3n}S_{\alpha\gamma\theta n}-\dot{\alpha}A_6\}]-\ddot{\alpha}m_{ba}A_2+$$
$$\dot{\alpha}^2m_{ba}A_1-\ddot{z}_{6n}m_{sn}a_{1n}C_{\alpha\gamma\eta n}+2\dot{z}_{6n}(\dot{\alpha}+\dot{\eta}_n)m_{sn}a_{1n}S_{\alpha\gamma\eta n}+$$
$$\ddot{\eta}_nm_{sn}z_{6n}a_{1n}S_{\alpha\gamma\eta n}+\dot{\eta}_n(2\dot{\alpha}+\dot{\eta}_n)m_{sn}z_{6n}a_{1n}C_{\alpha\gamma\eta n}-$$
$$\ddot{\theta}_nm_{awIn}a_{1n}C_{\alpha\gamma\theta n}+\dot{\theta}_n(2\dot{\alpha}+\dot{\theta}_n)m_{awIn}a_{1n}S_{\alpha\gamma\theta n}+$$
$$\ddot{\alpha}a_{1n}\{m_{sawcn}S_{\alpha\gamma n}-m_{sawbn}C_\alpha+m_{sn}z_{6n}S_{\alpha\gamma\eta n}-m_{awIn}C_{\alpha\gamma\theta n}\}+$$
$$\dot{\alpha}^2a_{1n}\{m_{sawcn}C_{\alpha\gamma n}+m_{sawbn}S_\alpha+m_{sn}z_{6n}C_{\alpha\gamma\eta n}+m_{awIn}S_{\alpha\gamma\theta n}\}-$$
$$g[m_{ba}C_\beta+m_bA_1S_\beta+$$
$$\{m_{sn}z_{6n}C_{\alpha\gamma\eta n}+m_{awIn}S_{\alpha\gamma\theta n}+m_{sawcn}C_{\alpha\gamma n}+m_{sawbn}S_\alpha\}S_\beta+$$
$$m_{sawan}C_\beta]=\lambda_{3n}[-\{z_{12n}C_\alpha+e_{3n}S_{\alpha\gamma\theta n}+c_{2n}C_{\alpha\gamma n}+b_{2n}S_\alpha\}S_\beta+$$
$$a_{1n}C_\beta]$$

$$2\dot{\beta}[\dot{\alpha}m_bA_1A_2+ \quad (178)$$
$$m_{sn}B_1\{\dot{z}_{6n}C_{\alpha\gamma\eta n}-(\dot{\alpha}+\dot{\eta}_n)z_{6n}S_{\alpha\gamma\eta n}-\dot{\alpha}A_4\}+$$
$$m_{an}B_2\{(\dot{\alpha}+\dot{\theta}_n)e_{1n}C_{\alpha\gamma\theta n}-\dot{\alpha}A_6\}+$$
$$m_{wn}B_3\{(\dot{\alpha}+\dot{\theta}_n)e_{3n}S_{\alpha\gamma\theta n}-\dot{\alpha}A_6\}]-$$
$$\ddot{\alpha}m_{ba}A_2+\dot{\alpha}^2m_{ba}A_1-\ddot{z}_{6n}m_{sn}a_{1n}C_{\alpha\gamma\eta n}+$$
$$2\dot{z}_{6n}(\dot{\alpha}+\dot{\eta}_n)m_{sn}a_{1n}S_{\alpha\gamma\eta n}+$$
$$\ddot{\eta}_nm_{sn}z_{6n}a_{1n}S_{\alpha\gamma\eta n}+\dot{\eta}_n(2\dot{\alpha}+\dot{\eta}_n)m_{sn}z_{6n}a_{1n}C_{\alpha\gamma\eta n}-$$
$$\ddot{\theta}_nm_{awIn}a_{1n}C_{\alpha\gamma\theta n}+\dot{\theta}_n(2\dot{\alpha}+\dot{\theta}_n)m_{awIn}a_{1n}S_{\alpha\gamma\theta n}+$$
$$\ddot{\alpha}a_{1n}\{m_{sawcn}S_{\alpha\gamma n}-m_{sawbn}C_\alpha+$$
$$m_{sn}z_{6n}S_{\alpha\gamma\eta n}-m_{awIn}C_{\alpha\gamma\theta n}\}+$$
$$\dot{\alpha}^2a_{1n}\{m_{sawcn}C_{\alpha\gamma n}+m_{sawbn}S_\alpha+$$
$$m_{sn}z_{6n}C_{\alpha\gamma\eta n}+m_{awIn}S_{\alpha\gamma\theta n}\}-$$
$$g[m_{ba}C_\beta+m_bA_1S_\beta+\{m_{sn}z_{6n}C_{\alpha\gamma\eta n}+m_{awIn}S_{\alpha\gamma\theta n}+$$
$$m_{sawcn}C_{\alpha\gamma n}+m_{sawbn}S_\alpha\}S_\beta+m_{sawan}C_\beta]+$$
$$\ddot{\beta}=\frac{\lambda_{3n}\{(z_{12n}C_\alpha+e_{3n}S_{\alpha\gamma\theta n}+c_{2n}C_{\alpha\gamma n}+b_{2n}S_\alpha)S_\beta-a_{1n}C_\beta\}}{-(m_{saw2n}+m_{bal}+m_bA_1^2+m_{sn}B_1^2+m_{an}B_2^2+m_{2n}B_3^2)}$$

$$\frac{d}{dt}\left(\frac{\partial L}{\partial \dot{\alpha}}\right)-\frac{\partial L}{\partial \alpha}=\frac{\partial F}{\partial \dot{\alpha}}+\sum_{l,n}\lambda_{ln}a_{ln2} \quad (179)$$

$$-\ddot{\beta}m_{ba}(b_0\cos\alpha-c_0\sin\alpha)+ \quad (180)$$
$$\dot{\beta}\dot{\alpha}m_{ba}(b_0\sin\alpha+c_0\cos\alpha)+\ddot{\alpha}(m_{bbl}+m_{sawIn}+$$
$$m_{sn}z_{6n}[z_{6n}+2\{c_{1n}\cos\eta_n-b_{2n}\sin(\gamma_n+\eta_n)\}]-$$
$$2m_{awIn}\{c_{2n}\sin\theta_n-b_{2n}\cos(\gamma_n+\theta_n)\})+$$

-continued $$\dot{\alpha}\{m_{sn}\dot{z}_{6n}[z_{6n}+2\{c_{1n}\cos\eta_n-b_{2n}\sin(\gamma_n+\eta_n)\}]+m_{sn}$$
$$z_{6n}[\dot{z}_{6n}-2\dot{\eta}_n\{c_{1n}\sin\eta_n+b_{2n}\cos(\gamma_n+\eta_n)\}]-$$
$$2\dot{\theta}_nm_{awIn}\{c_{2n}\cos\theta_n+b_{2n}\sin(\gamma_n+\theta_n)\}\}+$$
$$\ddot{z}_{6n}m_{sn}\{c_{1n}\sin\eta_n+b_{2n}\cos(\gamma_n+\eta_n)\}+$$
$$\dot{z}_{6n}\dot{\eta}_nm_{sn}\{c_{1n}\cos\eta_n-b_{2n}\sin(\gamma_n+\eta_n)\}+$$
$$\ddot{\eta}_nm_{sn}z_{6n}\{\dot{z}_{6n}-\dot{\eta}_n[c_{1n}\sin\eta_n+b_{2n}\cos(\gamma_n+\eta_n)]\}+$$
$$\ddot{\theta}[m_{aw2In}-m_{awIn}\{c_{2n}\sin\theta_n-b_{2n}\cos(\gamma_n+\theta_n)\}]-$$
$$\dot{\theta}_n^2m_{awIn}\{c_{2n}\cos\theta_n+b_{2n}\sin(\gamma_n+\theta_n)\}+$$
$$\dot{\beta}a_{1n}\{m_{sawcn}\sin(\alpha+\gamma_n)-$$
$$m_{sawbn}\cos\alpha+m_{sn}z_{6n}\sin(\alpha+\gamma_n+\eta_n)-$$
$$m_{awIn}\cos(\alpha+\gamma_n+\theta_n)\}+$$
$$\dot{\beta}a_{1n}\{\dot{\alpha}[m_{sawcn}\cos(\alpha+\gamma_n)+m_{sawbn}\sin\alpha]+$$
$$m_{sn}\dot{z}_{6n}\sin(\alpha+\gamma_n+\eta_n)+$$
$$(\dot{\alpha}+\dot{\eta}_n)m_{sn}z_{6n}\cos(\alpha+\gamma_n+\eta_n)+$$
$$(\dot{\alpha}+\dot{\theta}_n)m_{awIn}\sin(\alpha+\gamma_n+\theta_n)\}-$$
$$\{\dot{\beta}^2m_b(b_0\cos\alpha-c_0\sin\alpha)+\dot{\alpha}\dot{\beta}m_{ba}\}$$
$$(b_0\sin\alpha+c_0\cos\alpha)-$$
$$\sum_n^{i,ii}\left|+\dot{\beta}^2(m_{sn}\{z_{6n}\cos(\alpha+\gamma_n+\eta_n)+c_{1n}\cos(\alpha+\gamma_n)+\right.$$
$$b_{2n}\sin\alpha\}\{-z_{6n}\sin(\alpha+\gamma_n+\eta_n)-$$
$$c_{1n}\sin(\alpha+\gamma_n)+b_{2n}\cos\alpha\}+$$
$$m_{an}\{e_{1n}\sin(\alpha+\gamma_n+\theta_n)+c_{2n}\cos(\alpha+\gamma_n)+$$
$$b_{2n}\sin\alpha\}\{e_1\cos(\alpha+\gamma_n+\theta_n)-$$
$$c_{2n}\sin(\alpha+\gamma_n)+b_{2n}\cos\alpha\}+$$
$$m_{wn}\{e_{3n}\sin(\alpha+\gamma_n+\theta_n)+c_{2n}\cos(\alpha+\gamma_n)+$$
$$b_{2n}\sin\alpha\}\{e_{3n}\cos(\alpha+\gamma_n+\theta_n)-$$
$$c_{2n}\sin(\alpha+\gamma_n)+b_{2n}\cos\alpha\}+$$
$$\dot{z}_{6n}\dot{\beta}m_{sn}a_{1n}\sin(\alpha+\gamma_n+\eta_n)+\dot{\eta}_n\dot{\beta}m_{sn}z_{6n}a_{1n}\cos($$
$$\alpha+\gamma_n+\eta_n)+$$
$$\dot{\theta}\dot{\beta}m_{awIn}a_{1n}\sin(\alpha+\gamma_n+\theta_n)+$$
$$\dot{\alpha}\dot{\beta}a_{1n}\{m_{sawcn}\cos(\alpha+\gamma_n)+m_{sawcn}\cos(\alpha+\gamma_n)+$$
$$m_{sawbn}\sin\alpha+m_{sn}z_{6n}\cos(\alpha+\gamma_n+\eta_n)+$$
$$\left.m_{awIn}\sin(\alpha+\gamma_n+\theta_n)\}\right|+gm_b(b_0\cos\alpha-c_0\sin\alpha)\cos\beta-$$
$$\sum_n^{i,ii}g\{m_{sn}z_{6n}\sin(\alpha+\gamma_n+\eta_n)-m_{awIn}\cos(\alpha+\gamma_n+\theta_n)+$$
$$m_{sawcn}\sin(\alpha+\gamma_n)-m_{sawbn}\cos\alpha\}\cos\beta=$$
$$\lambda_{3n}\{-z_{12n}\sin\alpha+e_{3n}\cos(\alpha+\gamma_n+\theta_n)-$$
$$c_{2n}\sin(\alpha+\gamma_n)+b_{2n}\cos\alpha\}\cos\beta$$

$$-\ddot{\beta}m_{ba}A_2+\ddot{\alpha}\{m_{bbl}+m_{sawIn}+m_{sn}z_{6n}(z_{6n}+2E_{1n})-2m_{awIn}H_{1n}\}+ \quad (181)$$
$$2\dot{\alpha}\{m_{sn}\dot{z}_{6n}(z_{6n}+E_{1n})-m_{sn}z_{6n}\dot{\eta}_nE_{2n}-\dot{\theta}_nm_{awIn}H_{2n}\}+$$
$$\ddot{z}_{6n}m_{sn}E_{2n}+\dot{z}_{6n}\dot{\eta}_nm_{sn}E_{1n}+\ddot{\eta}_nm_{sn}z_{6n}\{z_{6n}+E_{1n}\}+$$

-continued $$\dot{\eta}_n m_{sn} z_{6n} \{2 z_{6n} + E_{1n}\} - \dot{\eta}_n^2 m_{sn} z_{6n} E_{2n} +$$
$$\ddot{\theta}(m_{aw2ln} - m_{awln} H_{1n}) - \dot{\theta}_n^2 m_{awln} H_{2n} +$$
$$\ddot{\beta} a_{1n}(m_{sawcn} S_{\alpha\gamma n} - m_{sawbn} C_\alpha + m_{sn} z_{6n} S_{\alpha\gamma\eta n} - m_{awln} C_{\alpha\gamma\theta n}) +$$
$$\dot{\beta} a_{1n}\{\dot{\alpha}(m_{sawcn} C_{\alpha\gamma n} + m_{sawbn} S_\alpha) + m_{sn} \dot{z}_{6n} S_{\alpha\gamma\eta n} +$$
$$(\dot{\alpha} + \dot{\eta}_n) m_{sn} z_{6n} C_{\alpha\gamma\eta n} + (\dot{\alpha} + \dot{\theta}_n) m_{awln} S_{\alpha\gamma\theta n}\} -$$
$$\dot{\beta}^2 m_b A_2 A_1 - [\dot{\beta}^2\{m_{sn} B_1(-z_{6n} S_{\alpha\gamma\eta n} - A_2) +$$
$$m_{an} B_2(e_1 C_{\alpha\gamma\theta n} - A_6) + m_{wn} B_3(e_3 C_{\alpha\gamma\theta n} - A_6)\} +$$
$$\dot{z}_{6n} \dot{\beta} m_{sn} a_{1n} S_{\alpha\gamma\eta n} + \dot{\eta}_n \dot{\beta} m_{sn} z_{6n} a_{1n} C_{\alpha\gamma\eta n} + \dot{\theta} \dot{\beta} m_{awln} a_{1n} S_{\alpha\gamma\theta n} +$$
$$\dot{\alpha} \dot{\beta} a_{1n}\{m_{sawcn} C_{\alpha\gamma n} + m_{sawbn} S_\alpha + m_{sn} z_{6n} C_{\alpha\gamma\eta n} + m_{awln} S_{\alpha\gamma\theta n}\}] +$$
$$g m_b A_2 C_\beta -$$
$$g\{m_{sn} z_{6n} S_{\alpha\gamma\eta n} - m_{awln} C_{\alpha\gamma\theta n} + m_{sawcn} S_{\alpha\gamma n} - m_{sawbn} C_\alpha\} C_\beta =$$
$$\lambda_{3n}\{-z_{12n} S_\alpha + e_{3n} C_{\alpha\gamma\theta n} - c_{2n} S_{\alpha\gamma n} + b_{2n} C_\alpha\} C_\beta$$

$$-\ddot{\beta} m_{ba} A_2 + \ddot{\alpha}\{m_{bbl} + m_{awln} + m_{sn} z_{6n}(z_{6n} + 2E_{1n}) - 2 m_{awln} H_{1n}\} + \quad (182)$$
$$m_{sn}(2\dot{\alpha} \dot{z}_{6n} + \ddot{\eta}_n z_{6n} + 2\dot{\eta}_n \dot{z}_{6n})(z_{6n} + E_{1n}) -$$
$$2\dot{\alpha}(m_{sn} z_{6n} \dot{\eta}_n E_{2n} + \dot{\theta}_n m_{awln} H_{2n}) + \ddot{z}_{6n} m_{sn} E_{2n} -$$
$$\dot{\eta}_n^2 m_{sn} z_{6n} E_{2n} + \ddot{\theta}(m_{aw2ln} - m_{awln} H_{1n}) - \dot{\theta}_n^2 m_{awln} H_{2n} +$$
$$\ddot{\beta} a_{1n}(m_{sawcn} S_{\alpha\gamma n} - m_{sawbn} C_\alpha + m_{sn} z_{6n} S_{\alpha\gamma\eta n} - m_{awln} C_{\alpha\gamma\theta n}) -$$
$$\dot{\beta}^2\{m_b A_2 A_1 + m_{sn} B_1(-z_{6n} S_{\alpha\gamma\eta n} - A_4) + m_{an} B_2(e_1 C_{\alpha\gamma\theta n} - A_6) +$$
$$m_{wn} B_3(e_3 C_{\alpha\gamma\theta n} - A_6)\} + g m_b A_2 C_\beta -$$
$$g\{m_{sn} z_{6n} S_{\alpha\gamma\eta n} - m_{awln} C_{\alpha\gamma\theta n} + m_{sawcn} S_{\alpha\gamma n} - m_{sawbn} C_\alpha\} C_\beta =$$
$$\lambda_{3n}(-z_{12n} S_\alpha + e_{3n} C_{\alpha\gamma\theta n} - c_{2n} S_{\alpha\gamma n} + b_{2n} C_\alpha) C_\beta$$

$$\therefore$$

$$m_{sn}(\dot{\alpha} \dot{z}_{6n} + \ddot{\eta}_n z_{6n} + 2\dot{\eta}_n \dot{z}_{6n})(z_{6n} + E_{1n}) - \quad (183)$$
$$2\dot{\alpha}(m_{sn} z_{6n} \dot{\eta}_n E_{2n} + \dot{\theta}_n m_{awln} H_{2n}) + \ddot{z}_{6n} m_{sn} E_{2n} -$$
$$\dot{\eta}_n^2 m_{sn} z_{6n} E_{2n} + \ddot{\theta}(m_{aw2ln} - m_{awln} H_{1n}) -$$
$$\dot{\theta}_n^2 m_{awln} H_{2n} + \ddot{\beta} a_{1n}(m_{sawcn} S_{\alpha\gamma n} -$$
$$m_{sawbn} C_\alpha + m_{sn} z_{6n} S_{\alpha\gamma\eta n} - m_{awln} C_{\alpha\gamma\theta n}) -$$
$$\dot{\beta}^2\{m_b A_2 A_1 + m_{sn} B_1(-z_{6n} S_{\alpha\gamma\eta n} - A_4) +$$
$$m_{an} B_2(e_1 C_{\alpha\gamma\theta n} - A_6) +$$
$$m_{wn} B_3(e_3 C_{\alpha\gamma\theta n} - A_6)\} + g m_b A_2 C_\beta -$$
$$g\{m_{sn} z_{6n} S_{\alpha\gamma\eta n} - m_{awln} C_{\alpha\gamma\theta n} + m_{sawcn} S_{\alpha\gamma n} - m_{sawbn} C_\alpha\}$$

$$\ddot{\alpha} = \frac{C_\beta - \ddot{\beta} m_{ba} A_2 + \lambda_{3n}(z_{12n} S_\alpha - e_{3n} C_{\alpha\gamma\theta n} + c_{2n} S_{\alpha\gamma n} - b_{2n} C_\alpha) C_\beta}{-\{m_{bbl} + m_{sawln} + m_{sn} z_{6n}(z_{6n} + 2 E_{1n}) - 2 m_{awln} H_{1n}\}}$$

$$\frac{d}{dt}\left(\frac{\partial L}{\partial \dot{\eta}_n}\right) - \frac{\partial L}{\partial \eta_n} = \frac{\partial F}{\partial \dot{\eta}_n} + \sum_{l,n} \lambda_{ln} a_{ln3} \quad (184)$$

$$l = 1, 2, 3 \quad n = i, ii$$

$$m_{sn} \ddot{\eta}_n z_{6n}^2 + 2 m_{sn} \dot{\eta}_n \dot{z}_{6n} z_{6n} + \quad (185)$$
$$\ddot{\alpha} m_{sn} z_{6n}\{z_{6n} + c_{1n} \cos\eta_n - b_{2n} \sin(\gamma_n + \eta_n)\} \dot{\alpha} m_{sn} z_{6n}\{z_{6n} +$$
$$c_{1n} \cos\eta_n - b_{2n} \sin(\gamma_n + \eta_n)\} +$$

$$\dot{\alpha} m_{sn} z_{6n}\{\dot{z}_{6n} - \dot{\eta}_n[c_{1n} \sin\eta_n + b_{2n} \cos(\gamma_n + \eta_n)]\} +$$
$$\ddot{\beta} m_{sn} z_{6n} a_{1n} \sin(\alpha + \gamma_n + \eta_n) + \dot{\beta} m_{sn} z_{6n} a_{1n} \sin(\alpha + \gamma_n + \eta_n) +$$
$$\dot{\beta}(\dot{\alpha} + \dot{\eta}_n) m_{sn} z_{6n} a_{1n} \cos(\alpha + \gamma_n + \eta_n) -$$
$$\langle \dot{\alpha}^2 m_{sn} z_{6n}\{-c_{1n} \sin\eta_n - b_{2n} \cos(\gamma_n + \eta_n)\} +$$
$$\dot{\beta}^2 m_{sn}\{z_{6n} \cos(\alpha + \gamma_n + \eta_n) + c_{1n} \cos(\alpha + \gamma_n) +$$
$$b_{2n} \sin\alpha\}\{-z_{6n} \sin(\alpha + \gamma_n + \eta_n)\} +$$
$$\dot{z}_{6n} \dot{\alpha} m_{sn}\{c_{1n} \cos\eta_n - b_{2n} \sin(\gamma_n + \eta_n)\} +$$
$$\dot{z}_{6n} \dot{\beta} m_{sn} a_{1n} \sin(\alpha + \gamma_n + \eta_n) -$$
$$\dot{\eta}_n \dot{\alpha} m_{sn} z_{6n}\{c_{1n} \sin\eta_n + b_{2n} \cos(\gamma_n + \eta_n)\} + \dot{\eta}_n \dot{\beta}$$
$$m_{sn} z_{6n} a_{1n} \cos(\alpha + \gamma_n + \eta_n) + \dot{\alpha} \dot{\beta} a_{1n} m_{sn} z_{6n} \cos(\alpha + \gamma_n + \eta_n) +$$
$$g m_{sn} z_{6n} \sin(\alpha + \gamma_n + \eta_n) \cos\beta =$$
$$-\lambda_{1n}(z_{6n} - d_{1n}) \cos\eta_n + \lambda_{2n}(z_{6n} - d_{1n}) \sin\eta_n$$

$$m_{sn} \ddot{\eta}_n z_{6n}^2 + 2 m_{sn} \dot{\eta}_n \dot{z}_{6n} z_{6n} + \ddot{\alpha} m_{sn} z_{6n}\{z_{6n} + E_1\} + \quad (186)$$
$$\dot{\alpha} m_{sn} z_{6n}\{2 z_{6n} + E_1\} - \dot{\alpha} m_{sn} z_{6n} \dot{\eta}_n E_2 + \ddot{\beta} m_{sn} z_{6n} a_{1n} S_{\alpha\gamma\eta n} +$$
$$\dot{\beta} m_{sn} z_{6n} a_{1n} S_{\alpha\gamma\eta n} + \dot{\beta}(\dot{\alpha} + \dot{\eta}_n) m_{sn} z_{6n} a_{1n} C_{\alpha\gamma\eta n} +$$
$$\dot{\alpha}^2 m_{sn} z_{6n} E_2 + \dot{\beta}^2 m_{sn} B_1 z_{6n} S_{\alpha\gamma\eta n} - \dot{z}_{6n} \dot{\alpha} m_{sn} E_1 -$$
$$\dot{z}_{6n} \dot{\beta} m_{sn} a_{1n} S_{\alpha\gamma\eta n} + \dot{\eta}_n \dot{\alpha} m_{sn} z_{6n} E_2 - \dot{\eta}_n \dot{\beta} m_{sn} z_{6n} a_{1n} C_{\alpha\gamma\eta n} -$$
$$\dot{\alpha} \dot{\beta} a_{1n} m_{sn} z_{6n} C_{\alpha\gamma\eta n} - g m_{sn} z_{6n} S_{\alpha\gamma\eta n} C_\beta =$$
$$-\lambda_{1n}(z_{6n} - d_{1n}) C_{\eta n} + \lambda_{2n}(z_{6n} - d_{1n}) S_{\eta n}$$

$$m_{sn} z_{6n}\{\ddot{\eta}_n z_{6n} + 2\dot{\eta}_n \dot{z}_{6n} + \ddot{\alpha}(z_{6n} + E_1) + 2\dot{\alpha} \dot{z}_{6n} + \quad (187)$$
$$\ddot{\beta} a_{1n} S_{\alpha\gamma\eta n} + \dot{\alpha}^2 E_2 + \dot{\beta}^2 B_1 S_{\alpha\gamma\eta n} - g S_{\alpha\gamma\eta n} C_\beta\} =$$
$$-\lambda_{1n}(z_{6n} - d_{1n}) C_{\eta n} + \lambda_{2n}(z_{6n} - d_{1n}) S_{\eta n}$$

$$\therefore$$

$$m_{sn} z_{6n}\{\ddot{\eta}_n z_{6n} + 2\dot{\eta}_n \dot{z}_{6n} + \quad (188)$$
$$\ddot{\alpha}(z_{6n} + E_1 + 2\dot{\alpha} \dot{z}_{6n} + \ddot{\beta} a_{1n} S_{\alpha\gamma\eta n} + \dot{\alpha}^2 E_2 +$$

$$\lambda_{1n} = \frac{\dot{\beta}_2 B_1 S_{\alpha\gamma\eta n} - g S_{\alpha\gamma\eta n} C_\beta\} - \lambda_{2n}(z_{6n} - d_{1n}) S_{\eta n}}{-(z_{6n} - d_{1n}) C_{\eta n}}$$

$$\frac{d}{dt}\left(\frac{\partial L}{\partial \dot{\theta}_n}\right) - \frac{\partial L}{\partial \theta_n} = \frac{\partial F}{\partial \dot{\theta}_n} + \sum_{l,n} \lambda_{ln} a_{ln4} \quad (189)$$

$$l = 1, 2, 3 \quad n = i, ii$$

$$\ddot{\theta}_n m_{aw2ln} + \ddot{\alpha}[m_{aw2ln} - m_{awln}\{c_{2n} \sin\theta_n - b_{2n} \cos(\gamma_n + \theta_n)\} - \quad (190)$$
$$\dot{\alpha} \dot{\theta}_n m_{awln}\{c_{2n} \cos\theta_n + b_{2n} \sin(\gamma_n + \theta_n)\} - \ddot{\beta} m_{awln} a_{1n}$$
$$\cos(\alpha + \gamma_n + \theta_n) + \dot{\beta}(\dot{\alpha} + \dot{\theta}_n) m_{awln} a_{1n} \sin(\alpha + \gamma_n + \theta_n) - [$$
$$k_{zi} e_{0i}^2\{\sin(\gamma_i + \theta_i) - \sin(\gamma_{ii} + \theta_{ii})\} \cos(\gamma_n + \theta_n) X_s -$$
$$\dot{\alpha}^2 m_{awln}\{c_{2n} \cos\theta_n + b_{2n} \sin(\gamma_n + \theta_n)\} +$$
$$\dot{\beta}^2\} m_{an}\{e_{1n} \sin(\alpha + \gamma_n + \theta_n) + c_{2n} \cos(\alpha + \gamma_n) +$$

-continued $$b_{2n}\sin\alpha\}e_{1n}\cos(\alpha+\gamma_n+\theta_n)+m_{wn}$$

$$\{e_{3n}\sin(\alpha+\gamma_n+\theta_n)+c_{2n}\cos(\alpha+\gamma_n)+b_{2n}\sin\alpha\}e_{3n}\cos(\alpha+\gamma_n+\theta_n)\{-\dot\theta\dot\alpha m_{awIn}\{c_{2n}\cos\theta_n+b_{2n}\sin(\gamma_n+\theta_n)\}+$$

$$\dot\theta\dot\beta m_{awIn}a_{1n}\sin(\alpha+\gamma_n+\theta_n)+$$

$$\dot\alpha\dot\beta a_{1n}m_{awIn}\sin(\alpha+\gamma_n+\theta_n)-$$

$$gm_{awIn}\cos(\alpha+\gamma_n+\theta_n)\cos\beta]=$$

$$\lambda_{1n}e_{2n}\sin\theta_n+\lambda_{2n}e_{2n}\cos\theta_n+\lambda_{3n}e_{3n}\cos(\alpha+\gamma_n+\theta_n)\cos\beta$$

$$\ddot\theta_n m_{aw2In}+\ddot\alpha(m_{aw2In}-m_{awIn}H_1)-\dot\alpha\dot\theta_n m_{awIn}H_2- \qquad (191)$$

$$\ddot\beta m_{awIn}a_{1n}C_{\alpha\gamma\theta n}+\dot\beta(\dot\alpha+\dot\theta_n)m_{awIn}a_{1n}S_{\alpha\gamma\theta n}-[$$

$$-k_{zi}e_{0i}^2\{\sin(\gamma_i+\theta_i)+\sin(\gamma_{ii}+\theta_{ii})\}\cos(\gamma_n+\theta_n)X_s-\dot\alpha^2 m_{awIn}H_2+$$

$$\dot\beta^2(m_{an}B_2e_{1n}C_{\alpha\gamma\theta n}+m_{wn}B_3e_{3n}C_{\alpha\gamma\theta n})-\dot\theta\dot\alpha m_{awIn}H_2+$$

$$\dot\theta\dot\beta m_{awIn}a_{1n}S_{\alpha\gamma\theta n}+\dot\alpha\dot\beta a_{1n}m_{awIn}S_{\alpha\gamma\theta n}-gm_{awIn}C_{\alpha\gamma\theta n}C_\beta]=$$

$$\lambda_{1n}e_{2n}S_{\theta n}+\lambda_{2n}e_{2n}C_{\theta n}+\lambda_{3n}e_{3n}C_{\alpha\gamma\theta n}C_\beta$$

$$\ddot\theta_n m_{aw2In}+\ddot\alpha(m_{aw2In}-m_{awIn}H_1)-\ddot\beta m_{awIn}a_{1n}C_{\alpha\gamma\theta n}+\dot\alpha^2 m_{awIn}H_2- \qquad (192)$$

$$\dot\beta^2(m_{an}B_2e_{1n}C_{\alpha\gamma\theta n}+m_{wn}B_3e_{3n}C_{\alpha\gamma\theta n})+gm_{awIn}C_{\alpha\gamma\theta n}C_\beta+$$

$$k_{zi}e_{0i}^2\{\sin(\gamma_i+\theta_i)+\sin(\gamma_{ii}+\theta_{ii})\}\cos(\gamma_n+\theta_n)=$$

$$\lambda_{1n}e_{2n}S_{\theta n}+\lambda_{2n}e_{2n}C_{\theta n}+\lambda_{3n}e_{3n}C_{\alpha\gamma\theta n}C_\beta$$

$$\therefore$$

$$\ddot\theta_n = \frac{\begin{array}{c}\ddot\alpha(m_{aw2In}-m_{awIn}H_1)-\ddot\beta m_{awIn}a_{1n}C_{\alpha\gamma\theta n}+\\ \dot\alpha^2 m_{awIn}H_2-\dot\beta^2(m_{an}B_2e_{1n}C_{\alpha\gamma\theta n}+m_{wn}B_3e_{3n}C_{\alpha\gamma\theta n})+\\ gm_{awIn}C_{\alpha\gamma\theta n}C_\beta-\lambda_{1n}e_{2n}S_{\theta n}-\\ \lambda_{2n}e_{2n}C_{\theta n}-\lambda_{3n}e_{3n}C_{\alpha\gamma\theta n}C_\beta+\\ k_{zi}e_{0i}^2\{\sin(\gamma_i+\theta_i)+\sin(\gamma_{ii}+\theta_{ii})\}\cos(\gamma_n+\theta_n)\end{array}}{-m_{aw2In}} \qquad (193)$$

$$\frac{d}{dt}\left(\frac{\partial L}{\partial \dot z_{6n}}\right)-\frac{\partial L}{\partial z_{6n}}=\frac{\partial F}{\partial \dot z_{6n}}+\sum_{l,n}\lambda_{ln}a_{ln5} \qquad (194)$$

$$l=1,2,3 \quad n=i,ii$$

$$m_{sn}\ddot z_{6n}+\ddot\alpha m_{sn}\{c_{1n}\sin\eta_n+b_{2n}\cos(\gamma_n+\eta_n)\}+ \qquad (195)$$

$$\dot\alpha\dot\eta_n m_{sn}\{c_{1n}\cos\eta_n-b_{2n}\sin(\gamma_n+\eta_n)\}-$$

$$\ddot\beta m_{sn}a_{1n}\cos(\alpha+\gamma_n+\eta_n)+\dot\beta(\dot\alpha+\dot\eta_n)m_{sn}a_{1n}\sin(\alpha+\gamma_n+\eta_n)-$$

$$\langle m_{sn}\dot\eta_n^2 z_{6n}+\dot\alpha^2 m_{sn}[z_{6n}+\{c_{1n}\cos\eta_n-b_{2n}\sin(\gamma_n+\eta_n)\}]\rangle+\dot\beta^2 m_{sn}$$

$$\{z_{6n}\cos(\alpha+\gamma_n+\eta_n)+c_{1n}\cos(\alpha+\gamma_n)+b_{2n}\sin\alpha\}\cos(\alpha+\gamma_n+\eta_n)+\dot\eta_n\dot\alpha m_{sn}\{2\dot z_{6n}+c_{1n}\cos\eta_n-b_{2n}\sin(\gamma_n+\eta_n)\}+$$

$$\dot\eta_n\dot\beta m_{sn}a_{1n}\sin(\alpha+\gamma_n+\eta_n)+\dot\alpha\dot\beta a_{1n}m_{sn}\sin(\alpha+\gamma_n+\eta_n)-$$

$$gm_{sn}\cos(\alpha+\gamma_n+\eta_n)\cos\beta-k_{sn}(z_{6n}-l_{sn})\}=$$

$$-c_{sn}\dot z_{6n}-\lambda_{1n}\sin\eta_n-\lambda_{2n}\cos\eta_n$$

$$m_{sn}\{\ddot z_{6n}+\ddot\alpha E_2-\ddot\beta a_{1n}C_{\alpha\gamma\eta n}-\dot\eta_n^2 z_{6n}- \qquad (196)$$

$$\dot\alpha^2(z_{6n}+E_1)-\dot\beta^2 B_1 C_{\alpha\gamma\eta n}-2\dot\eta_n\dot\alpha z_{6n}+gC_{\alpha\gamma\eta n}C_\beta\}+$$

$$k_{sn}(z_{6n}-l_{sn})=-c_{sn}\dot z_{6n}-\lambda_{1n}S_{\eta n}-\lambda_{2n}C_{\eta n}$$

$$m_{sn}\{\ddot z_{6n}+\ddot\alpha E_2-\ddot\beta a_{1n}C_{\alpha\gamma\eta n}-\dot\eta_n^2 z_{6n}-\dot\alpha^2(z_{6n}-E_1)- \qquad (197)$$

$$\dot\beta^2 B_1 C_{\alpha\gamma\eta n}-2\dot\eta_n\dot\alpha z_{6n}+gC_{\alpha\gamma\eta n}C_\beta\}+$$

$$\lambda_{2n}=\frac{k_{sn}(z_{6n}-l_{sn})+c_{sn}\dot z_{6n}+\lambda_{1n}S_{\eta n}}{-C_{\eta n}}$$

$$\frac{d}{dt}\left(\frac{\partial L}{\partial \dot z_{12n}}\right)-\frac{\partial L}{\partial z_{12n}}=\frac{\partial F}{\partial \dot z_{12n}}+\sum_{l,n}\lambda_{ln}a_{ln6} \qquad (198)$$

$$l=1,2,3 \quad n=i,ii$$

$$k_{wn}(z_{12n}-l_{wn})=-c_{wn}\dot z_{12n}+\lambda_{3n}\cos\alpha\cos\beta$$

$$=-c_{wn}\dot z_{12n}+\lambda_{3n}C_\alpha C_\beta$$

$$\therefore$$

$$\lambda_{3n}=\frac{c_{wn}\dot z_{12n}+k_{2n}(z_{12n}-l_{wn})}{C_\alpha} \qquad (199)$$

From the differentiated constraints it follows that:

$$\dot\theta_n e_{2n}\sin\theta_n-\dot z_{6n}\sin\eta_n-\dot\eta_n(z_{6n}-d_{1n})\cos\eta_n=0$$

$$\dot\theta_n e_{2n}\cos\theta_n-\dot z_{6n}\cos\eta_n+\dot{}_n(z_{6n}-d_{1n})\sin\eta_n=0 \qquad (200)$$

and $$\{\dot z_{12n}\cos\alpha-\dot\alpha z_{12n}\sin\alpha+(\dot\alpha+\dot\theta_n)e_{3n}\cos(\alpha+\gamma_n+\theta_n)$$

$$-\dot\alpha c_{2n}\sin(\alpha+\gamma_n)+\dot\alpha b_{2n}\cos\alpha\}\cos\beta$$

$$-\dot\beta[\{z_{12n}\cos\alpha+e_{3n}\sin(\alpha+\gamma_n+\theta_n)$$

$$+c_{2n}\cos(\alpha+\gamma_n)+b_{2n}\sin\alpha\}\sin\eta+a_{1n}\cos\beta]-\dot R_n(t)=0 \qquad (201)$$

Second order of differentiation of equation (200) yields:

$$\ddot\theta_n e_{2n}S_{\theta n}+\dot\theta_n^2 e_{2n}C_{\theta n}-\ddot z_{6n}S_{\eta n}-\dot z_{6n}\dot\eta_n C_{\eta n}- \qquad (202)$$

$$\ddot\eta_n(z_{6n}-d_{1n})C_{\eta n}-\dot\eta_n\dot z_{6n}C_{\eta n}+\dot\eta_n^2(z_{6n}-d_{1n})S_{\eta n}=0$$

$$\ddot\theta_n e_{2n}C_{\theta n}-\dot\theta_n^2 e_{2n}S_{\theta n}-\ddot z_{6n}C_{\eta n}+\dot z_{6n}\dot\eta_n S_{\eta n}+$$

$$\ddot\eta_n(z_{6n}-d_{1n})S_{\eta n}+\dot\eta_n\dot z_{6n}S_{\eta n}+\dot\eta_n^2(z_{6n}-d_{1n})C_{\eta n}=0$$

$$\therefore$$

$$\ddot\eta_n = \frac{\ddot\theta_n e_{2n}S_{\theta n}+\dot\theta_n^2 e_{2n}C_{\theta n}-\ddot z_{6n}S_{\eta n}-}{(z_{6n}-d_{1n})C_{\eta n}} \qquad (203)$$

$$\ddot\eta_n = \frac{2\dot\eta_n\dot z_{6n}C_{\eta n}+\dot\eta_n^2(z_{6n}-d_{1n})S_{\eta n}}{(z_{6n}-d_{1n})C_{\eta n}}$$

$$\ddot z_{6n} = \frac{\ddot\theta_n e_{2n}C_{\theta n}-\dot\theta_n^2 e_{2n}S_{\theta n}+\ddot z_n(z_{6n}-d_{1n})S_{\eta n}+}{C_{\eta n}} \qquad (204)$$

$$\ddot z_{6n} = \frac{2\dot\eta_n\dot z_{6n}S_{\eta n}+\dot\eta_n^2(z_{6n}-d_{1n})C_{\eta n}}{C_{\eta n}}$$

and $$\dot{z}_{12n} = \frac{\{\dot{\alpha}z_{12n}S_\alpha - (\dot{\alpha}+\dot{\theta}_n)e_{3n}C_{\alpha\gamma\theta n} + \dot{\alpha}c_{2n}S_{\alpha\gamma n} - \dot{\alpha}b_{2n}C_\alpha\}}{(C_\alpha C_\beta)}$$

$$C_\beta + \dot{\beta}[\{z_{12n}C_\alpha + e_{3n}S_{\alpha\gamma\theta n} + c_{2n}C_{\alpha\gamma n} + b_{2n}S_\alpha\}$$

$$S_\beta + \alpha_{1n}C_\beta] + \dot{R}_n(t)$$ (205)

Supplemental differentiation of equation (199) for the later entropy production calculation yields:

$$k_{wn}\dot{z}_{12n} = -c_{wn}\ddot{z}_{12n} + \dot{\lambda}_{3n}C_\alpha C_\beta - \dot{\alpha}\lambda_{3n}S_\alpha C_\beta - \dot{\beta}\lambda_{3n}C_\alpha S_\beta$$ (206)

therefore $$\ddot{z}_{12n} = \frac{\lambda_{3n}C_\alpha C_\beta - \dot{\alpha}\lambda_{3n}S_\alpha C_\beta - \dot{\beta}\lambda_{3n}C_\alpha S_\beta - k_{wn}\dot{z}_{12n}}{c_{wn}}$$ (207)

or from the third equation of constraint:

$$\{\ddot{z}_{12n}\cos\alpha - \dot{z}_{12n}\dot{\alpha}\cos\alpha - \dot{\alpha}z_{12n}\sin\alpha - \dot{\alpha}\dot{z}_{12n}\sin\alpha - \dot{\alpha}^2 z_{12n}\cos\alpha + (\dot{\alpha}+\dot{\theta}_n)e_{3n}\cos(\alpha+\gamma_n+\theta_n)$$

$$-(\dot{\alpha}+\dot{\theta}_n)^2 e_{3n}\sin(\alpha+\gamma_n+\theta_n) - \dot{\alpha}c_{2n}\sin(\alpha+\gamma_n) - \dot{\alpha}c_{2n}\cos(\alpha+\gamma_n) + \dot{\alpha}b_{2n}\cos\alpha - \dot{\alpha}^2 b_{2n}\sin\alpha\}\cos\beta$$

$$-\dot{\beta}\{\dot{z}_{12n}\cos\alpha - \dot{\alpha}z_{12n}\sin\alpha + (\dot{\alpha}+\dot{\theta}_n)e_{3n}\cos(\alpha+\gamma_n+\theta_n) - \dot{\alpha}c_{2n}\sin(\alpha+\gamma_n) + \dot{\alpha}b_{2n}\cos\alpha\}\sin\beta$$

$$-\ddot{\beta}[\{z_{12n}\cos\alpha + e_{3n}\sin(\alpha+\gamma_n+\theta_n) + c_{2n}\cos(\alpha+\gamma_n) + b_{2n}\sin\alpha\}\sin\beta + \alpha_{1n}\cos\beta]$$

$$-\dot{\beta}[\{\dot{z}_{12n}\cos\alpha - \dot{\alpha}z_{12n}\sin\alpha + (\dot{\alpha}+\dot{\theta}_n)\cos(\alpha+\gamma_n+\theta_n) - (\dot{\alpha}+\dot{\gamma}_n)c_{2n}\sin(\alpha+\gamma_n) + \dot{\alpha}b_{2n}\cos\alpha\}\sin\beta$$

$$+\dot{\beta}\{z_{12n}\cos\alpha + e_{3n}\sin(\alpha+\gamma_n+\theta_n) + c_{2n}\cos(\alpha+\gamma_n) + b_{2n}\sin\alpha\}\cos\beta - \dot{\beta}\alpha_{1n}\sin\beta\} - \ddot{R}_n(t) = 0$$ (208)

$$\ddot{z}_{12n} = \frac{\{-\dot{z}_{12n}\dot{\alpha}\cos\alpha - \dot{\alpha}z_{12n}\sin\alpha - \ddot{\alpha}z_{12n}\sin\alpha - \dot{\alpha}^2 z_{12n}\cos\alpha + (\ddot{\alpha}+\ddot{\theta}_n)e_{3n}\cos(\alpha+\gamma_n+\theta_n) - (\dot{\alpha}+\dot{\theta}_n)^2 e_{3n}\sin(\alpha+\gamma_n+\theta_n) - \ddot{\alpha}c_{2n}\sin(\alpha+\gamma_n) - \dot{\alpha}^2 c_{2n}\cos(\alpha+\gamma_n) + \ddot{\alpha}b_{2n}\cos\alpha - \dot{\alpha}^2 b_{2n}\sin\alpha\}\cos\beta - \dot{\beta}\{\dot{z}_{12n}\cos\alpha - \dot{\alpha}z_{12n}\sin\alpha + (\dot{\alpha}+\dot{\theta}_n)e_{3n}\cos(\alpha+\gamma_n+\theta_n) - \dot{\alpha}c_{2n}\sin(\alpha+\gamma_n) + \dot{\alpha}b_{2n}\cos\alpha\}\sin\beta - \ddot{\beta}[\{\dot{z}_{12n}\cos\alpha - \dot{\alpha}z_{12n}\sin\alpha + (\dot{\alpha}+\dot{\theta}_n)e_{3n}\cos(\alpha+\gamma_n+\theta_n) - (\dot{\alpha}+\dot{\gamma}_n)c_{2n}\sin(\alpha+\gamma_n) + \dot{\alpha}b_{2n}\cos\alpha\}\sin\beta + \dot{\beta}\{z_{12n}\cos\alpha + e_{3n}\sin(\alpha+\gamma_n+\theta_n) + c_{2n}\cos(\alpha+\gamma_n) + b_{2n}\sin\alpha\}\cos\beta - \dot{\beta}\alpha_{1n}\sin\beta] - \ddot{R}_n(t)}{(-\cos\alpha\cos\beta)}$$ (209)

5. Summarization for simulation.

$$\ddot{\beta} = \frac{2\dot{\beta}[\dot{\alpha}m_b A_1 A_2 + m_{sn}B_1}{-(m_{saw2n} + m_{bal} + m_b A_1^2 + m_{sn}B_1^2 + m_{an}B_2^2 + m_{wn}B_3^2)}$$

$$\{\ddot{z}_{6n}C_{\alpha\gamma\eta n} - (\dot{\alpha}+\dot{\eta}_n)\dot{z}_{6n}S_{\alpha\gamma\eta n} - \dot{\alpha}A_4\} + m_{an}B_2\{(\dot{\alpha}+\dot{\theta}_n)e_{1n}C_{\alpha\gamma\theta n} - \dot{\alpha}A_5\} + m_{wn}B_3\{(\dot{\alpha}+\dot{\theta}_n)e_{3n}S_{\alpha\gamma\theta n} - \dot{\alpha}A_6\}] - \ddot{\alpha}m_{ba}A_2 + \dot{\alpha}^2 m_{ba}A_1 - \ddot{z}_{6n}m_{sn}a_{1n}C_{\alpha\gamma\eta n} + 2\dot{z}_{6n}(\dot{\alpha}+\dot{\eta}_n)m_{sn}a_{1n}S_{\alpha\gamma\eta n} + \ddot{\eta}_n m_{sn}z_{6n}a_{1n}S_{\alpha\gamma\eta n} + \dot{\eta}_n(2\dot{\alpha}+\dot{\eta}_n)m_{sn}z_{6n}a_{1n}C_{\alpha\gamma\eta n} - \ddot{\theta}_n m_{awln}a_{1n}C_{\alpha\gamma\theta n} + \dot{\theta}_n(2\dot{\alpha}+\dot{\theta}_n)m_{awln}a_{1n}S_{\alpha\gamma\theta n} + \ddot{\alpha}a_{1n}\{m_{sawcn}S_{\alpha\gamma n} - m_{sawbn}C_\alpha + m_{sn}z_{6n}S_{\alpha\gamma\eta n} - m_{awln}C_{\alpha\gamma\theta n}\} + \dot{\alpha}^2 a_{1n}\{m_{sawcn}C_{\alpha\gamma n} + m_{sawbn}S_\alpha + m_{sn}z_{6n}C_{\alpha\gamma\eta n} + m_{awln}S_{\alpha\gamma\theta n}\} - g[m_{ba}C_\beta + m_b A_1 S_\beta + \{m_{sn}z_{6n}C_{\alpha\gamma\eta n} + m_{awln}S_{\alpha\gamma\theta n} + m_{sawcn}C_{\alpha\gamma n} + m_{sawbn}S_\alpha\}S_\beta + m_{sawan}C_\beta] - \{(z_{12n}C_\alpha + e_{3n}S_{\alpha\gamma\theta n} + c_{2n}C_{\alpha\gamma n} + \lambda_{3n}b_{2n}S_\alpha)S_\beta - a_{1n}C_\beta\}$$ (210)

*Sign of $\lambda_{3n}$ is modified judging from
the behavior of the model.

$$\alpha = \frac{m_{sn}(2\dot{\alpha}\dot{z}_{6n} + \ddot{\eta}_n z_{6n} + 2\dot{\eta}_n \dot{z}_{6n})(z_{6n} + E_{1n}) - 2\dot{\alpha}(m_{sn}z_{6n}\dot{\eta}_n E_{2n} + \dot{\theta}_n m_{awln}H_{2n}) + \ddot{z}_{6n}m_{sn}E_{2n} - \dot{\eta}_n^2 m_{sn}z_{6n}E_{2n} + \ddot{\theta}(m_{aw2ln} - m_{awln}H_{1n}) - \dot{\theta}_n^2 m_{awln}H_{2n} + \dot{\beta}a_{1n}(m_{sawcn}S_{\alpha\gamma n} - m_{sawbn}C_\alpha + m_{sn}z_{6n}S_{\alpha\gamma\eta n} - m_{awln}C_{\alpha\gamma\theta n}) - \dot{\beta}^2\{m_b A_2 A_1 - m_{sn}B_1(z_{6n}S_{\alpha\gamma\eta n} + A_4) + m_{an}B_2(e_{1n}C_{\alpha\gamma\theta n} - A_6) + m_{wn}B_3(e_3 C_{\alpha\gamma\theta n} - A_6)\} + gm_b A_2 C_\beta - g\{m_{sn}z_{6n}S_{\alpha\gamma\eta n} - m_{awln}C_{\alpha\gamma\theta n} + m_{sawcn}S_{\alpha\gamma n} - m_{sawbn}C_\alpha\}C_\beta - \ddot{\beta}m_{ba}A_2 + \lambda_{3n}(z_{12n}S_\alpha - e_{3n}C_{\alpha\gamma\theta n} + c_{2n}S_{\alpha\gamma n} - b_{2n}C_\alpha)C_\beta}{-\{m_{bb1} + m_{sawln} + m_{sn}z_{6n}(z_{6n} + 2E_{1n}) - 2m_{awln}H_{1n}\}}$$ (211)

$$\lambda_{1n} = \frac{m_{sn}z_{6n}\{\ddot{\eta}_n z_{6n} + 2\dot{\eta}_n\dot{z}_{6n} + \ddot{\alpha}(z_{6n} + E_1) + 2\dot{\alpha}\dot{z}_{6n} + \dot{\beta}a_{1n}S_{\alpha\gamma\eta n} + \dot{\alpha}^2 E_2 + \dot{\beta}^2 B_1 S_{\alpha\gamma\eta n} - gS_{\alpha\gamma\eta n}C_\beta\} - \lambda_{2n}(z_{6n} - d_{1n})S_{\eta n}}{-(z_{6n} - d_{1n})C_{\eta n}}$$ (212)

$$\theta_n = \frac{\ddot{\alpha}(m_{aw2ln} - m_{awln}H_1) - \dot{\beta}m_{awln}a_{1n}C_{\alpha\gamma\theta n} + \dot{\alpha}^2 m_{awln}H_2 - \dot{\beta}^2(m_{an}B_2 e_{1n}C_{\alpha\gamma\theta n} + m_{wn}B_3 e_{3n}C_{\alpha\gamma\theta n}) + gm_{awln}C_{\alpha\gamma\theta n}C_\beta - \lambda_{1n}e_{2n}S_{\theta n} - \lambda_{2n}e_{2n}C_{\theta n} - \lambda_{3n}e_{3n}C_{\alpha\gamma\theta n} + C_\beta + \frac{1}{2}k_{zi}e_{0i}^2\{\sin(\gamma_i + \theta_i) + \sin(\gamma_{ii} + \theta_{ii})\}\cos(\gamma_n + \theta_n)}{-m_{aw2ln}}$$ (213)

In the above expression, the potential energy of the stabilizer is halved because there are left and right portions of the stabilizer.

$$\lambda_{2n} = \frac{\begin{aligned}m_{sn}\{\ddot{z}_{6n} + \ddot{\alpha}E_2 - \ddot{\beta}a_{1n}C_{\alpha\gamma\eta n} - \\ \dot{\eta}_n^2 z_{6n} - \dot{\alpha}^2(z_{6n} + E_1) - \dot{\beta}^2 B_1 C_{\alpha\gamma\eta n} - \\ 2\dot{\eta}_n \dot{\alpha} z_{6n} + gC_{\alpha\gamma\eta n}C_\beta\} + \\ k_{sn}(z_{6n} - l_{sn}) + c_{sn}\dot{z}_{6n} + \lambda_{1n}S_{\eta n}\end{aligned}}{-C_{\eta n}} \quad (214)$$

$$\lambda_{3n} = \frac{c_{wn}\dot{z}_{12n} + k_{wn}(z_{12n} - l_{wn})}{C_\alpha} \quad (215)$$

$$\ddot{\eta}_n = \frac{\begin{aligned}\ddot{\theta}_n e_{2n} S_{\theta n} + \dot{\theta}_n^2 e_{2n} C_{\theta n} - \ddot{z}_{6n} S_{\eta n} - \\ 2\dot{\eta}_n \dot{z}_{6n} C_{\eta n} + \dot{\eta}_n^2 (z_{6n} - d_{1n}) S_{\eta n}\end{aligned}}{(z_{6n} - d_{1n})C_{\eta n}} \quad (216)$$

$$\ddot{z}_{6n} = \frac{\begin{aligned}\ddot{\theta}_n e_{2n} C_{\theta n} - \dot{\theta}_n^2 e_{2n} S_{\theta n} + \ddot{\eta}_n (z_{6n} - d_{1n})S_{\eta n} + \\ 2\dot{\eta}_n \dot{z}_{6n} S_{\eta n} + \dot{\eta}_n^2 (z_{6n} - d_{1n})C_{\eta n}\end{aligned}}{C_{\eta n}} \quad (217)$$

$$\ddot{z}_{12n} = \frac{\begin{aligned}\{\ddot{\alpha}z_{12n}S_\alpha - (\dot{\alpha} + \dot{\theta}_n)e_{3n}C_{\alpha\gamma\theta n} + \dot{\alpha}c_{2n}S_{\alpha\gamma n} - \dot{\alpha}b_{2n}C_\alpha\} \\ C_\beta + \dot{\beta}[\{z_{12n}C_\alpha + e_{3n}S_{\alpha\gamma\theta n} + c_{2n}C_{\alpha\gamma n} + b_{2n}S_\alpha\} \\ S_\beta + a_{1n}C_\beta] + \dot{R}_n(t)\end{aligned}}{C_\alpha C_\beta} \quad (218)$$

where $n = i, ii$ (219)
$m_{ba} = m_b(a_0 + a_1)$
$m_{bb1} = m_b(b_0^2 + c_0^2) + I_{bx}$
$m_{ba1} = m_b(a_0 + a_1)^2 + I_{by}$
$m_{sawan} = (m_{sn} + m_{an} + m_{wn})a_{1n}$
$m_{sawbn} = (m_{sn} + m_{an} + m_{wn})b_{2n}$
$m_{sawcn} = m_{sn}c_{1n} + (m_{an} + m_{wn})c_{2n}$
$m_{saw2n} = (m_{sn} + m_{an} + m_{wn})a_{1n}^2$
$m_{sawIn} = m_{an}e_{1n}^2 + m_{wn}e_{3n}^2 + m_{sn}(c_{1n}^2 + b_{2n}^2 - 2c_{1n}b_{2n}\sin\gamma_n) + (m_{an} + m_{wn})(c_{2n}^2 + b_{2n}^2 - 2c_{2n}b_{2n}\sin\gamma_n) + I_{axn}$
$m_{aw2In} = m_{an}e_{1n}^2 + m_{wn}e_{3n}^2 + I_{axn}$
$m_{awIn} = m_{an}e_{1n} + m_{wn}e_{3n}$
$m_{aw2n} = m_{an}e_{1n}^2 + m_{wn}e_{3n}^2$
$A_1 = b_0 \sin\alpha + c_0 \cos\alpha$
$A_2 = b_0 \cos\alpha - c_0 \sin\alpha$
$A_{4n} = c_{1n} \sin(\alpha + \gamma_n) - b_{2n} \cos\alpha$
$A_{6n} = c_{2n} \sin(\alpha + \gamma_n) - b_{2n} \cos\alpha$
$B_{1n} = z_{6n} \cos(\alpha + \gamma_n + \eta_n) + c_{1n}\cos(\alpha + \gamma_n) + b_{2n}\sin\alpha$
$B_{2n} = e_{1n} \sin(\alpha + \gamma_n + \theta_n) + c_{2n}\cos(\alpha + \gamma_n) + b_{2n}\sin\alpha$
$B_{3n} = e_{3n} \sin(\alpha + \gamma_n + \theta_n) + c_{2n}\cos(\alpha + \gamma_n) + b_{2n}\sin\alpha$
$E_{1n} = c_{1n} \cos\eta_n - b_{2n}\sin(\gamma_n + \eta_n)$
$E_{2n} = c_{1n} \sin\eta_n + b_{2n}\cos(\gamma_n + \eta_n)$
$H_{1n} = c_{2n} \sin\theta_n - b_{2n}\cos(\gamma_n + \theta_n)$
$H_{2n} = c_{2n} \cos\theta_n + b_{2n}\sin(\gamma_n + \theta_n)$ $S_\alpha = \sin\alpha, \ S_\beta = \sin\beta, \ S_{\alpha\gamma n} = \sin(\alpha + \gamma_n),$ (220)
$S_{\alpha\gamma\eta n} = \sin(\alpha + \gamma_n + \eta_n), \ S_{\alpha\gamma\theta n} = \sin(\alpha + \gamma_n + \theta_n)$
$C_\alpha = \cos\alpha, \ C_\beta = \cos\beta, \ C_{\alpha\gamma n} = \cos(\alpha + \gamma_n),$
$C_{\alpha\gamma\eta n} = \cos(\alpha + \gamma_n + \eta_n), \ C_{\alpha\gamma\theta n} = \cos(\alpha + \gamma_n + \theta_n)$ The initial conditions are:

$\dot{\beta} = \dot{\alpha} = \dot{\eta}_n = \dot{\theta}_n = \dot{z}_{6n} = \dot{z}_{12n} = 0$ (221)

$\beta = \alpha = 0$ (222)

$z_{6n} = l_{sn} + l_{s0n}$ (223)

$l_{s0n} \cong \frac{0.6 \, m_b}{2k_{sn}}$ $z_{12n} = l_{wn} + l_{w0n}$ $l_{w0n} \cong \frac{0.6(m_b + m_{sn} + m_{an} + m_{wn})}{2k_{wn}}g$ $\eta_n = \cos^{-1}(z_{6n} - d_{1n})^2 + (c_{1n} - c_{2n})^2 - \frac{e_{2n}^2}{-2(c_{1n} - c_{2n})(z_{6n} - d_{1n})}$ (224)

$\theta_n = \sin^{-1}(z_{6n} - d_{1n})^2 - e_{2n}^2 - \frac{(c_{1n} - c_{2n})^2}{-2e_{2n}(c_{1n} - c_{2n})}$ (225)

$R_n(0) = z_{12n}\cos\alpha + e_{3n}\sin(\alpha + \gamma_n + \theta_n) + c_{2n}\cos(\alpha + \gamma_n) + b_{2n}\sin\alpha_n$ (226)

where $l_{sn}$ is free length of suspension spring, $l_{s0n}$ is initial suspension spring deflection at one g, $l_{wn}$ is free length of spring component of wheel and $l_{w0n}$ is initial wheel spring deflection at one g.

IV. Equations for Entropy Production

Minimum entropy production (for use in the fitness function of the genetic algorithm) is expressed as:

$$\frac{d_\beta S}{dt} = \frac{\begin{aligned}-2\dot{\beta}^2[\dot{\alpha}m_b A_1 A_2 + m_{sn}B_1\{\dot{z}_{6n}C_{\alpha\gamma\eta n} - \\ (\dot{\alpha} + \dot{\eta}_n)z_{6n}S_{\alpha\gamma\eta n} - \dot{\alpha}A_4\} + \\ m_{an}B_2\{(\dot{\alpha} + \dot{\theta}_n)e_{1n}C_{\alpha\gamma\theta n} - \dot{\alpha}A_6\} + \\ m_{wn}B_3\{(\dot{\alpha} + \dot{\theta}_n)e_{3n}S_{\alpha\gamma\theta n} - \dot{\alpha}A_6\}]\end{aligned}}{m_{saw2n} + m_{bal} + m_b A_1^2 + m_{sn}B_1^2 + m_{an}B_1^2 + m_{wn}B_3^2} \quad (227)$$

$$\frac{d_\alpha S}{dt} = \frac{-2\dot{\alpha}^2\{m_{sn}\dot{\alpha}\dot{z}_{6n}(z_{6n} + E_{1n}) + m_{sn}z_{6n}\dot{\eta}_n E_{2n} + \dot{\theta}_n m_{awIn}H_{2n}\}}{m_{bb1} + m_{sawIn} + m_{sn}z_{6n}(z_{6n} + 2E_{1n}) - 2m_{awIn}H_{1n}} \quad (228)$$

$$\frac{d_{\eta_n}S}{dt} = \dot{\eta}_n^3 tg\eta_n - \frac{2\dot{\eta}_n^2 \dot{z}_{6n}}{z_{6n} - d_{1n}} \quad (229)$$

$$\frac{d_{z_{6n}}S}{dt} = 2\dot{\eta}_n \dot{z}_{6n}^2 tg\eta_n \quad (230)$$

$$\frac{d_{z_{12n}}S}{dt} = \dot{z}_{12n}^2(\dot{\alpha} + \dot{\alpha}tg\alpha + 2\dot{\beta}tg\beta) \quad (231)$$

Other Embodiments

Although the foregoing has been a description and illustration of specific embodiments of the invention, various modifications and changes can be made thereto by persons skilled in the art, without departing from the scope and spirit of the invention as defined by the following claims.

What is claimed is:

1. A method for controlling an internal combustion engine comprising the steps of: measuring first information from said engine by using a first plurality of sensors; providing said first information to a first engine control system, said first engine control system configured to provide a desired accuracy for said engine, said first control system providing a first control signal; measuring second information from said engine by using a second plurality of sensors, where said second plurality of sensors comprises fewer sensors that said first plurality of sensors, providing said second information to a second engine control systems said second engine control system providing a second control signal; and configuring said second engine control system using said first engine controls signal and said second engine control signal by generating a physical criteria and an information criteria, wherein said physical criteria is calculated by an entropy model based on thermodynamic properties of said engine.

2. The method of claim 1, wherein said physical criteria is calculated by an entropy model that calculates an entropy production rate.

3. The method of claim 2, wherein said second control system is adapted to reduce an entropy production in said second control system and said engine.

4. The method of claim 3, wherein said thermodynamic model is based on engine air temperature and engine water temperature.

5. A method for controlling an internal combustion engine, comprising the steps of: measuring first information from said engine by using a first plurality of sensors; providing said first information to a first engine control system said first engine control system configured to provide a desired accuracy for said engine, said first control system providing a first control signal; measuring second information from said engine by using a second plurality of sensors, where said second plurality of sensors comprises fewer sensors that said first plurality of sensors, providing said second information to a second engine control system, said second engine control system providing a second control signal; and confining said second engine control system using said first engine controls signal and said second engine control signal by generating a physical criteria and an information criteria, wherein said optimizer uses a genetic algorithm having a fitness function, wherein a portion of said fitness function is based on entropy.

6. A method for controlling an internal combustion engine, comprising the steps of: measuring first information from said engine by using a first plurality of sensors; providing said first information to a first engine control system, said first engine control system configured to provide a desired accuracy for said engine, said first control system providing a first control signal; measuring second information from said engine by using a second plurality of sensors, where said second plurality of sensors comprises fewer sensors that said first plurality of sensors, providing said second information to a second engine control system, said second engine control system providing a second control signal; and configuring said second engine control system using said first engine controls signal and said second engine control signal be generating a physical criteria and an information criteria, wherein said step of configuring further comprises providing said physical criteria and said information criteria to a genetic algorithm having a fitness function, said fitness function based on entropy.

7. A control system adapted to control an engine, comprising: a first plurality of sensors configured to measure first information about said engine, a first engine controller configured to receive at least a portion of said first information, said first engine controller trained to produce a first control signal, where said first engine controller is trained to use relatively more of said at least a portion of said first information signal in order to reduce an entropy production of said engine, wherein said first engine controller comprises a fuzzy neural network configured to be trained by a genetic analyzer having a first fitness function, said first fitness function configured to increase mutual information between said first control signal and a second control signal, said second control signal provided by a second controller configured to receive information from a second plurality of sensors, wherein said second plurality of sensors is greater than said first plurality of sensors.

8. The apparatus of claim 7, wherein said genetic analyzer further comprises a second fitness function configured to reduce entropy production rate of said engine.

9. The apparatus of claim 8, wherein said genetic analyzer is configured to use said second fitness function to realize a node correction in said fuzzy neural network.

10. The apparatus of claim 7, wherein said first plurality of sensors comprises a temperature sensor.

11. The apparatus of claim 7, wherein said second plurality of sensors comprises an oxygen sensor.

12. The apparatus of claim 7, wherein said first plurality of sensors comprises a water temperature sensor, an air temperature sensor, and an airflow sensor.

13. The apparatus of claim 7, wherein said first plurality of sensors comprises a water temperature sensor, an air temperature sensor, an airflow sensor, and an oxygen sensor.

14. The apparatus of claim 7, wherein said first control signal comprises an injector control signal configured to control a fuel injector.

* * * * *

UNITED STATES PATENT AND TRADEMARK OFFICE
CERTIFICATE OF CORRECTION

PATENT NO. : 6,216,083 B1
DATED : April 10, 2001
INVENTOR(S) : Sergei V. Ulyanov, Shigeki Hashimoto and Masashi Yamaguchi Page 1 of 1

It is certified that error appears in the above-identified patent and that said Letters Patent is hereby corrected as shown below:

Column 59, claim 5,
Line 36, change "and confining" to -- and configuring --.

Column 60, claim 6,
Line 6, change "signal be" to -- signal by --.

Signed and Sealed this

Twelfth Day of March, 2002

Attest:

Attesting Officer

JAMES E. ROGAN
Director of the United States Patent and Trademark Office